(12) United States Patent
Shibaike et al.

(10) Patent No.: US 6,472,794 B1
(45) Date of Patent: Oct. 29, 2002

(54) MICROACTUATOR

(75) Inventors: Narito Shibaike, Osaka; Satoshi Matsumoto, Kobe, both of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 08/082,956

(22) Filed: Jun. 29, 1993

(30) Foreign Application Priority Data

| Jul. 10, 1992 | (JP) | 4-183351 |
| Dec. 11, 1992 | (JP) | 4-331533 |
| Dec. 28, 1992 | (JP) | 4-347984 |
| Feb. 4, 1993 | (JP) | 5-017251 |

(51) Int. Cl.$^7$ .............................. H01L 41/08
(52) U.S. Cl. ..................................... 310/309
(58) Field of Search ........................ 310/309

(56) References Cited

U.S. PATENT DOCUMENTS

| 4,107,519 A | | 8/1978 | Bicek | 250/199 |
| 4,567,451 A | | 1/1986 | Greenwood | 331/155 |
| 5,013,954 A | * | 5/1991 | Shibaike et al. | 310/309 |
| 5,043,043 A | * | 8/1991 | Howe et al. | 310/309 X |
| 5,051,790 A | | 9/1991 | Hammer | 357/19 |
| 5,113,117 A | * | 5/1992 | Brooks et al. | 310/309 X |
| 5,124,879 A | | 6/1992 | Goto | 361/233 |
| 5,180,940 A | * | 1/1993 | Paratte et al. | 310/309 X |
| 5,191,251 A | * | 3/1993 | Paratte | 310/309 |
| 5,237,234 A | * | 8/1993 | Jebens et al. | 310/309 |
| 5,252,881 A | * | 10/1993 | Muller et al. | 310/309 |
| 5,296,775 A | * | 3/1994 | Cronin et al. | 310/309 |

FOREIGN PATENT DOCUMENTS

| EP | 0 441 269 | 8/1991 |
| EP | 0 480 645 | 4/1992 |
| JP | 60-210459 | 4/1984 |
| JP | 3-287006 | 4/1990 |
| JP | 5-116787 | 10/1991 |
| WO | WO90/09058 | 8/1990 |
| WO | PCT/CH91/00030 | 8/1991 |
| WO | WO92/09133 | 5/1992 |

OTHER PUBLICATIONS

R. Howe, "Microsensor and Microactuator Applications of Thin Films", 2194 Thin Solid Films, pp. 235–43 (Dec. 10, 1989).

(List continued on next page.)

*Primary Examiner*—Mark O. Budd
(74) *Attorney, Agent, or Firm*—McDermott, Will & Emery

(57) ABSTRACT

The present invention relates to a microactuator that can be produced by utilizing the IC fabrication processes such as etching, lithography or the like and that can be used as a micropositioner in a multi probe head for scanning probe microscopy and a pickup head for recording and reproducing equipment.

The microactuator comprises a plurality of electrodes arranged around the circumference of a circle, a ring-like displacement plate located inside said electrodes, beams which support said displacement plate elastically at one ends and at the same time are fixed at the other ends to a point located towards the inside of said displacement plate on a substrate and a voltage supply means to apply voltages to said electrodes in order for said electrodes to attract said displacement plate electrostatically.

An extremely small, long life and high reliability microactuator that is excellent in mass-producibility and capable of high precision positioning can be realized.

8 Claims, 42 Drawing Sheets

OTHER PUBLICATIONS

W. Tang et al., "Laterally Driven Polysilicon Resonant Micro-structures", 8253 Sensors and Actuators, pp. 25–32 (Nov. 15, 1989).

Y. Gianchandani et al., "A Bulk Silicon Dissolved Wafer Process For Microelectromechanical Systems", IEEE International Electron Devices Meeting, pp. 29.5.1–4 (Dec. 8–11, 1991).

M. Mehregany et al., "Operation of Microfabricated Harmonic and Ordinary Side–Drive Motors", IEEE Workshop on Micro Electro Mechanical System, pp. 1–8 (Feb. 1990).

S. Akamine et al., "A Planar Process for Microfabrication of a Scanning Tunneling Microscope", Sensors & Actuators, A21–23, pp. 964–970, (1990).

R. Barrett et al., "Charge Storage in a Nitride–Oxide–Silicon Medium by Scanning Capacitance Microscope", J. Appl. Phys., vol. 70, No. 5, pp. 2725–33, (Sep. 1, 1991).

M. Mehregany et al., "Surface Micromachined Mechanisms and Micro–motors", J. Micromech. Microeng., vol. 1, pp. 73–85 (1991).

* cited by examiner

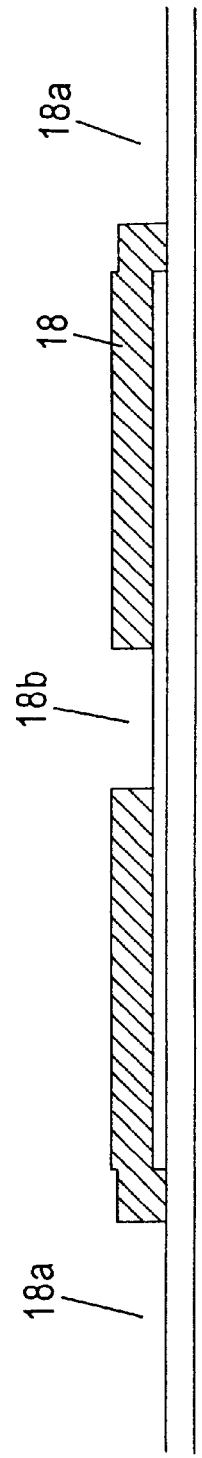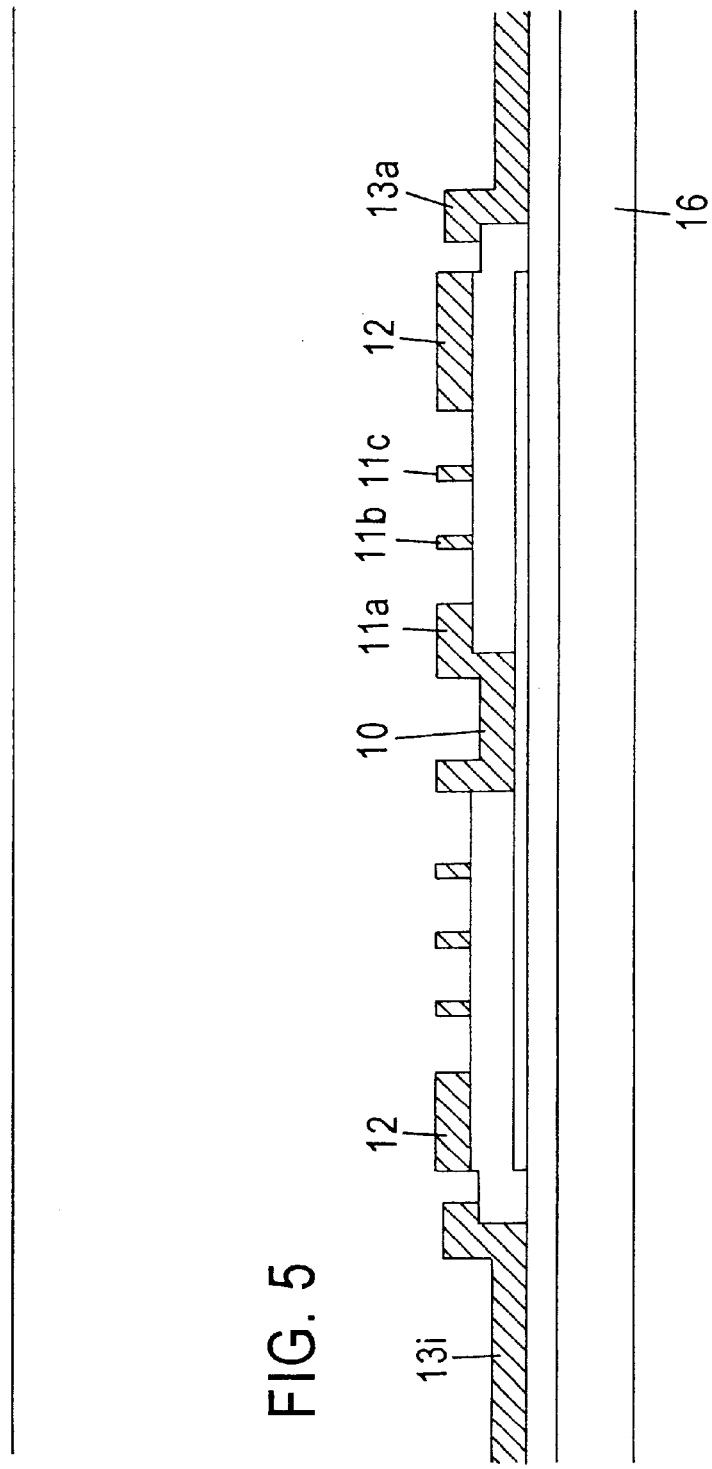

MICROACTUATOR

II. BACKGROUND OF THE INVENTION

The present invention relates to a microactuator that can be fabricated according to the IC fabrication processes characterized by etching and lithography, for example, and can be used as a micropositioner for the multiple probe head of a scanning probe microscope and the pickup head for a signal recording and reproduction equipment.

As a first prior art example of a microactuator, there is an electrostatic micro wobble motor introduced in a paper authored by Mehregany et al. ("Operation of microfabricated harmonic and ordinary side-drive motors", Proceedings of the third IEEE Workshop on Micro Electro Mechanical Systems, Napa Valley, Calif., USA, Feb. 11–14, 1990, pp. 1–8)

FIG. 50 is a schematic plan view to show how this prior art electrostatic micro wobble motor is structured and FIG. 51 is a cross-sectional view of the foregoing motor.

In FIG. 50 and FIG. 51, item 1 is a bearing, item 2 is a rotor of about 100 μm in diameter and items 3a through 3h are eight electrodes arranged around the Periphery of the rotor 2. (On a photograph of the motor in the above referenced paper, there are 12 static poles observed.) Although not shown in the drawings, these electrodes are connected by wires with a voltage supply source and can be applied with voltages arbitrarily selected.

As indicated in FIG. 50, the rotor 2 is shaped like a ring and between the inner circumference thereof and the bearing 1 there exists a clearance C. Therefore, in contrast to an ordinary motor, the rotor 2 does not rotate around the bearing 1 with the bearing serving as the axis of rotation. As voltages are applied to electrodes 3a through 3h in succession, the rotor 2 revolves since it is attracted sequentially towards the excited electrodes 3a through 3h.

At the same time, however, since the rotor 2 moves while it is in rolling contact with the bearing 1 at the contact point of 2a, the rotor 2 rotates by the difference between the outer circumference of the bearing 1 and the inner circumference of the rotor 2. A detailed description on this performance will be made later.

The rotor 2 is held by a flange 1a so that it does not slip off from the bearing 1. The electrodes 3a through 3h (only 3a and 3e are shown in FIG. 51) are almost of the same height as the rotor 2. On the bottom surface of the rotor 2, there are a plurality dot-like mounds 2b, not a ring-like mound, which slide on and contact electrically with a shield layer 4.

FIG. 52 through FIG. 56 are the cross-sectional illustrations to show the fabrication processes (a) through (e), respectively, for the electrostatic micro wobble motor, which will be described hereunder. The fabrication processes employ the ordinary IC fabrication methods such as etching, lithography or the like.

(a) As illustrated in FIG. 52, an insulating layer 6 is first formed on a silicon substrate 5 by depositing in succession an oxide layer of 1 μm in thickness grown thermally and a silicon nitride layer of 1 μm in thickness formed by means of a low pressure chemical vapor deposition method (LPCVD).

Then, a polysilicon thin film of 3500 Å thick with phosphorus diffused sufficiently therein is formed by LPCVD and patterning is applied thereto to complete an electric shield layer 4.

Further, a low temperature oxide layer (LTO) 7 of 2.2 μm thick is deposited to make a first sacrificial layer and then patterning is applied by 2 steps, the one for forming a base 7a of the electrodes 3a through 3h and the other for forming a hollow 7b in preparation of creating a mound 2b on the bottom of the rotor 2.

(b) As illustrated in FIG. 53, a polysilicon layer of 2.5 μm thick diffused with phosphorus sufficiently is deposited by LPCVD and then the rotor 2 and the electrodes 3a through 3h (only 3a and 3e are shown here) as indicated in FIG. 50 and FIG. 51 were formed by means of a reactive ion etching method (RIE). As shown in FIG. 53, the electrodes 3a through 3h are fixed on the silicon substrate 5 and a plurality of the mound 2b are formed on the bottom of the rotor 2. On account of a thermal oxidation layer after patterning used as the mask for the reactive ion etching of the foregoing polysilicon layer, the thickness of the rotor 2 as well as the electrodes 3a through 3h is approximately 2.2 μm at this stage.

(c) As illustrated in FIG. 54, an LTO layer 8 to make a second sacrificial layer of about 0.3 μm thick is deposited for retaining the clearance C between the bearing 1 and the rotor 2. At the same time, an anchor 8a for the bearing 1 is formed by patterning.

Although the diameter of the bearing 1 is about 36 μm, the smallest possible diameter is 26 μm due to the restrictions imposed by the process employed here.

(d) As illustrated in FIG. 55, a polysilicon layer of 1 μm thick with phosphorus diffused sufficiently is deposited by LPCVD and the bearing 1 provided with the flange 1a is formed.

(e) As illustrated in FIG. 56, the LTO layers 7 and 8 serving as the first and second sacrificial layers respectively are dissolved by buffered hydrogen fluoride (HF) and the rotor is released completely to realize the structure as shown in FIG. 51.

The operational principle of the prior art electrostatic micro wobble motor having a structure as described above will be explained in the following with the help of FIG. 50. As stated before, the rotor 2 does not rotate around the bearing 1 with the bearing serving as the axis of rotation. Instead, the rotor revolves as it is attracted by the excited electrodes 3a through 3h sequentially and at the same time it rotates by the difference between the outer circumference of the bearing 1 and the inner circumference of the rotor 2 while it is in rolling contact with the bearing 1 at the contact point 2a.

In other words, suppose the electrodes are excited in the direction X as indicated in FIG. 50 in an order of the electrodes 3a, 3b, 3c and so forth, then the rotor 2 is first attracted by the excited electrode 3a. Next, it will be attracted by the electrode 3b and then by the electrode 3c and so forth, resulting in revolving of the rotor 2 also in the direction X.

Since the clearance C between the rotor 2 and the bearing 1 is set up to be smaller than the gap between the rotor 2 and the electrodes 3a through 3h, there will be the contact point 2a where the rotor 2 will come into contact with the bearing 1. Besides, the correct gap between the rotor 2 and the electrodes 3a through 3h corresponds to G+E as indicated in FIG. 50, where the E means an effective gap length that produces the motor's torque, and the following relationship is established inherently from the structure of the motor:

$$E = G - C > 0$$

(This is obvious when the state of the electrode 3e being excited has been observed.) As the gap between the rotor 2 and the electrodes 3a through 3h, G will be dealt with for convenience because of the possibilities in reducing the effective gap length E to the minimum.

Now, as the rotor 2 revolves in the direction X, the contact point 2a also is to move likewise in the direction X. Since the bearing 1 is fixed in position, slipping at the contact point 2a by the amount of the difference between the outer circumference of the bearing 1 and the inner circumference of the rotor 2 is taking place unless the rotor 2 revolves. However, attracting force is applied to the rotor 2 in the direction of pressing the bearing 1 and practically any slipping hardly occurs at the contact point 2a.

Therefore, as the rotor 2 revolves in the same direction as the shifting direction (the direction of X) of the voltages applied to the electrodes 3a through 3h, the rotor 2 is consequently to rotate in the same direction (the X direction of FIG. 50) by the amount corresponding to the difference between the outer circumference of the bearing 1 and the inner circumference of the rotor 2. It is needless to say that the contact point 2a is to move in the direction X while it is in the state of rolling contact.

The feature of this electrostatic micro wobble motor is in that the revolution frequency of the revolving rotor 2 is determined by the outer diameter B of the bearing 1 and the inner diameter R of the rotor 2, and the revolution frequency S of the revolving rotor 2 is to become extremely small against the shifting frequency F of the input voltages (the physically shifting frequency of the voltages applied to the electrodes 3a through 3h for the present prior art example) when compared with the case of an ordinary motor.

In case wherein the revolution frequency of the revolving motor 2 is equal to the shifting frequency F of the input voltages, the revolution frequency S of the revolving rotor 2 is expressed by the following equation:

$$S=F\times(R-B)/R=F\times C/R$$

Since the revolution speed is reduced to S/F, e.g. C/R, the torque will be increased, instead, to R/C times in contrast to the case of an ordinary motor. In addition, by reducing the clearance C, the slippage at the contact point 2a can be eliminated, resulting in advantageously suppressing the wobbling of the rotor 2 caused by its revolution.

As a result, a motor of low speed and high torque has been realized without using any speed reduction means in particular and greatly expected to be used as the motive force or the like for micromachines.

On the other hand, the scanning probe microscopes, typically represented by STM (Scanning Tunneling Microscope), have been prevailing widely and rapidly in recent years as a means to observe minute objects on the surface of specimens for the high resolution and the feature that the microscopes can be used under any measurement environments in principle. Especially, the progress in development of the STM has been remarkable and many research studies have been made on the methods to produce probing needles and cantilevers by fine fabrication processing of silicon. These efforts have been aiming at down-sizing of the equipment by micro-miniaturizing the mechanical parts involved and also improvement of the vibration resistant characteristics by increasing the resonant frequencies of the mechanical parts.

These probing needles and cantilevers are generally referred to as probes and usually driven finely by piezo elements separately prepared. Therefore, the dimensions of the whole mechanical parts are mostly accounted for by the dimensions of piezo elements even when the probes are reduced in size.

Studies have been recently started to create a thin film piezo element on a cantilever for micro-deforming the cantilever itself and some study results have already been made public.

As a second prior art example of a microactuator. there is a thin film probe which has been used as a probe head for scanning probe microscopes and was introduced by a paper authored by Akamine et al. ("A Planar Process for Microfabrication of a Scanning- Tunneling Microscope", Sensors & Actuators, A21–23, pp. 964–970, 1990)

FIG. 57 shows how the aforementioned prior art thin film probe is structured.

In FIG. 57, item 101 is a silicon substrate and item 102 is a cantilever, on the end point of which a probing needle 103 is being attached. The cantilever 102 measures 8 in thickness by 200 in width by 1000 $\mu$m in length.

The cantilever 102 is fundamentally of a bimorph structure consisting of thin film piezo elements 104 and 105. On the upper surface of the thin film piezo element 104 are formed electrodes 106a through 106c and on the bottom surface of the thin film piezo element 105 are formed electrodes 107a and 107b, which are almost identical in configuration with the electrodes 106a and 106b, respectively. Besides, an electrode 108 is formed between the thin film piezo elements 104 and 105 and also the probing needle 103 is fixed on the electrode 106c.

As illustrated in FIG. 57, electrical wirings are provided to connect each of the electrodes 106a through 106c, 107a, 107b and 108 respectively with pads, through which arbitrary voltages can be applied to the electrodes.

FIG. 58 through FIG. 62 are cross-sectional illustrations of the fabrication processes (a) through (b) for the above thin film probe, wherein the generally known semiconductor processes such as etching, lithography or the like are utilized. With the help of the foregoing illustrations, the fabrication processes will be explained briefly hereunder.

(a) As shown in FIG. 58, a membrane 109 of 50 to 70 $\mu$m thick is formed through an application of anisotropic etching to the bottom surface of the silicon substrate 101.

(b) As shown in FIG. 59, electrodes 107a and 107b (not shown in FIG. 59) are formed by deposition of a first Al thin layer to a thickness of 0.5 $\mu$m by means of electron beam evaporation and then by patterning thereof.

(c) As shown in FIG. 60, a thin film piezo element 105 is formed by successive deposition of a first nitride layer of 0.2 $\mu$m thick by means of plasma-enhanced chemical vapor deposition (PECVD), a first zinc oxide layer of 3 $\mu$m thick by reactive sputtering and then a second nitride layer of 0.2 $\mu$m thick on the electrodes 107a and 107b. Patterning is performed with the nitride layer by means of Plasma etching and with the zinc oxide layer by wet etching, respectively.

(d) As shown in FIG. 61, a thin film piezo element 104 is formed by successive deposition of a second Al thin layer serving as electrode 108 according to the same steps as (b), and a third nitride layer, a second zinc oxide layer and a fourth nitride layer by means of PECVD and reactive sputtering according to the same steps as (c) on the foregoing thin film piezo element 105. Further, electrodes 106a through 106c (only 106a is shown in FIG. 61) are formed by deposition of a third Al layer according to the same steps as (b) on the thin film piezo element 105.

(e) As shown in FIG. 62, the membrane 109 is lastly removed from the bottom surface of the substrate by plasma etching to complete the structure as indicated in FIG. 57.

Next, how this thin film probe operates will be explained briefly with the help of FIG. 63 through FIG. 66.

As is generally known, a piezo element has a property of expansion or contraction depending on the direction of the electric field applied thereto. Therefore, by applying an appropriate voltage of either positive or negative polarity to the electrodes 106a, 106b, 107a and 107b while the electrode 108 is kept grounded, the cantilever 102 can be freely deformed through a control of the electric field that is applied to the thin film piezo elements 104 and 105.

As illustrated in FIG. 63 for example, when voltages of the same polarity are applied to the electrodes 106a, 106b, 107a and 107b and also electric fields of the same direction are applied to the thin film piezo elements 104 and 105, the cantilever 102 as a whole will show expansion or contraction in the longitudinal direction. (X direction in FIG. 63)

Also, as illustrated in FIG. 64 through FIG. 66 by hatched lines (indicating that closely spaced diagonal lines rising towards right mean the applied voltage to be positive, for example, and loosely spaced lines rising towards left mean the applied voltage to be negative), when the electric fields applied to the thin film piezo elements 104 and 105 are controlled by applying a positive or a negative voltage to each respective electrode, it will be possible to provide the end of the cantilever 102 with such motions of high freedom as moving in the horizontal direction (the Y direction in FIG. 64) or in the vertical direction (the Z direction in FIG. 65) or twisting as indicated by an arrow M in FIG. 66.

Accordingly, the probing needle 103 attached to the end of the cantilever can be precisely moved for the purpose of scanning a specimen since the piezo elements have extremely high resolution.

Thus, a thin film probe for the scanning probe microscopy can be made by depositing piezo elements on a silicon substrate through semiconductor fabrication processes and it is expected that the employment of this probe will greatly contribute to the production of an extremely small and high performance scanning probe microscope.

Also, magnetic heads for VTR and magnetic disc equipment and optical heads for optical disc equipment are generally known as the conventional pickup heads for recording and reproducing equipment. Efforts have been always made to make the recording and reproducing equipment smaller in size and larger in recording capacity. For that purpose, development and progress of the precision mechanism technology as typically applied to high density recording and pickup heads is absolutely necessary.

There is a probe recording method among many new approaches proposed at present for the high density recording. This method is to use a probing needle as used with a STM or the like as a head for mechanical scanning.

The probing needle type charge storage recording, for example, as described in a paper authored by Barrett et al. ("Charge storage in a nitride-oxide-silicon medium by scanning capacitance microscopy", J. Appl. Phys. Vol. 70, No. 5, pp. 2725–2733, Sep. 1, 1991) proves the possibility of high density and non-destructive recording and reproducing.

The principle of operation thereof will be explained here briefly. When an electro-conductive Probing needle mounted on a cantilever of an AFM (Atomic Force Microscope) is kept in contact with a dielectrics layer (silicon nitride), which is placed on an electro-conductive body, and applied with a bias voltage, electric charges will be trapped by the dielectrics layer and information will be stored therein. Reproduction of the information is performed by detecting capacitance existent between the probing needle and the substrate by means of a sensor. It is possible to erase the information by applying a reversed bias voltage and also perform recording repeatedly.

The recording medium is prepared by depositing an oxide layer and a nitride layer on a polysilicon substrate which was added with boron. By having a probing tip of tungsten placed in contact with the above recording medium and a voltage of −25 V applied for 20 $\mu$sec., information of 75 nm bits have been recorded. The recording density has reached as many as 180 bits/$\mu m^2$, more than 200 times the conventional recording.

The first prior art structure as exemplified in the foregoing tends to have torque loss due to rolling friction since the dot-like mounds on the rotor bottom are in contact with the shield layer and also the flange is in contact with the rotor while the rotor is revolving. Besides, various parts of the motor suffer from mechanical wears due to friction over a long period, resulting in a considerable reduction in the life of the motor.

Further, the rotor and the shield layer tend to fail in having the respective potentials kept at the same level in a stable manner since the electrical contact between them is performed through a sliding action between the dot-like mounds under the rotor bottom and the shield layer surface, resulting in deteriorated reliability.

Furthermore, since the rotational characteristics of the motor are governed by the dimensional accuracy of the outer diameter of the bearing, the outer and inner diameters of the rotor, and the inner diameter of the electrode lay-out, it is difficult to gain stable rotational accuracy.

In addition, the difficulty in taking out the torque of the rotor for possible utilization in a micropositioner on account of the rotor moving only in the inner space inside the boundary formed by the electrode lay-out has presented a problem.

Also, It is required according to the second prior art structure as exemplified in the foregoing to move either the entire thin film probe including the silicon substrate 101 or the specimen in order to perform a measurement of a different place of the specimen.

Besides, there has been a problem of not being able to observe a particular surface of a specimen multi-purposely by not only an STM but also, for example, an AFM or a MFM (Magnetic Force Microscope).

The conventional precision mechanism technology has been mostly involved with component parts in the areas of how to put them together, realizing higher accuracy of them, making them smaller in dimension, laying them out effectively as a whole and so forth. The problem has been in that even when an innovative progress was made in the recording principle or in the recording medium such innovation was not utilized to the fullest extent in achieving the ultimate miniaturization and performance of the recording and reproducing equipment.

III. SUMMARY OF THE INVENTION

The object of the present invention is to provide a microactuator that can be produced by semiconductor processes, which excel in micro-miniaturization and mass-producibility, is capable of high accuracy positioning and also in possession of long life and high reliability.

The structure disclosed by the present invention comprises:

a plurality of electrodes arranged along a circumference on a substrate;

a ring-like displacement plate located inside said electrodes;

beams, each of which is fixed at one end to an anchor solidly formed on said substrate and at the other end to a specified place of the inner circumference of said displacement plate in support of said displacement plate elastically; and a voltage application means whereby voltages are selectively applied to said respective electrodes to have said displacement plate attracted electrostatically towards said electrodes, which have been applied with said voltages, and moved.

The foregoing structure as disclosed by the present invention has made it possible to bring about the following effects:

Since the displacement plate to be driven electrostatically is securely in electrical contact through the beams, reliability in the driving characteristics of the displacement plate has been greatly enhanced.

The adverse effect due to friction at the time when the displacement plate comes into contact with the electrodes has been made extremely small, resulting in longer life.

It has been made possible to control the position and angle of the displacement plate very accurately with resultant realization of an excellent positioning mechanism.

High torque has been obtainable.

It has become possible to design a microactuator for the most suitable configuration with abundant freedom.

With the use of semiconductor processes, it has become possible to achieve micro-miniaturization and secure mass-producibility.

Besides, by employing the microactuator of the present invention in a multi-head probe for a scanning probe microscope, a plurality of movable thin film probes can be simultaneously manipulated to realize equipment whereby a surface of a specimen is observed in a diversified manner without moving the specimen.

Furthermore, by utilizing the microactuator of the present invention in a pickup head of recording and reproducing equipment, it has become possible to provide a microactuator produced by an entirely new fabrication method based on a concept that has not been existent before.

IV. BRIEF DESCRIPTION OF THE DRAWINGS

FIG. 3 through FIG. 7 are cross-sectional illustrations to show the fabrication processes of the microactuator of Example 1.

V. DESCRIPTION OF THE PREFERRED EMBODIMENTS

Details of the present invention will be described by referring to exemplary embodiments hereunder.

EXAMPLE 1

Figure 1:
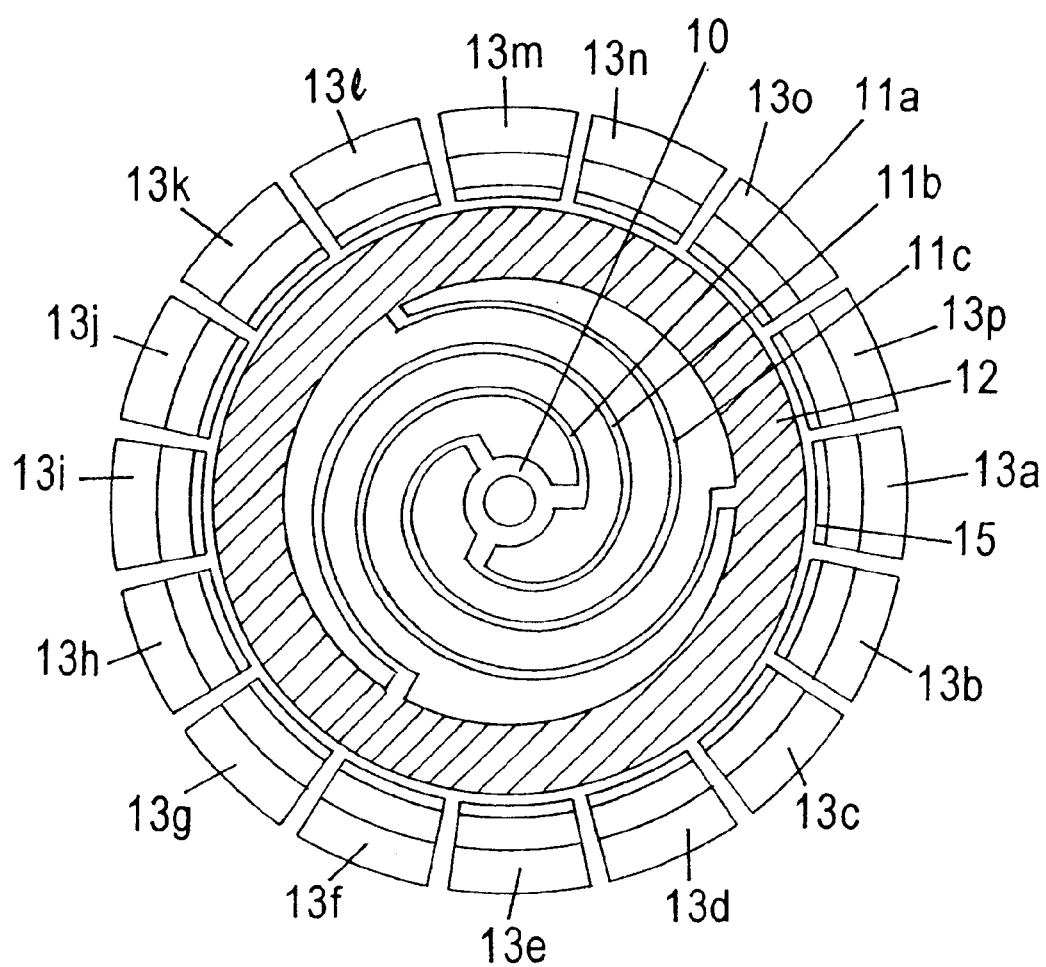
FIG. 1 is a schematic plan view to show the structure of a microactuator as a first exemplary embodiment (Example 1) of the present invention.
Figure 2:
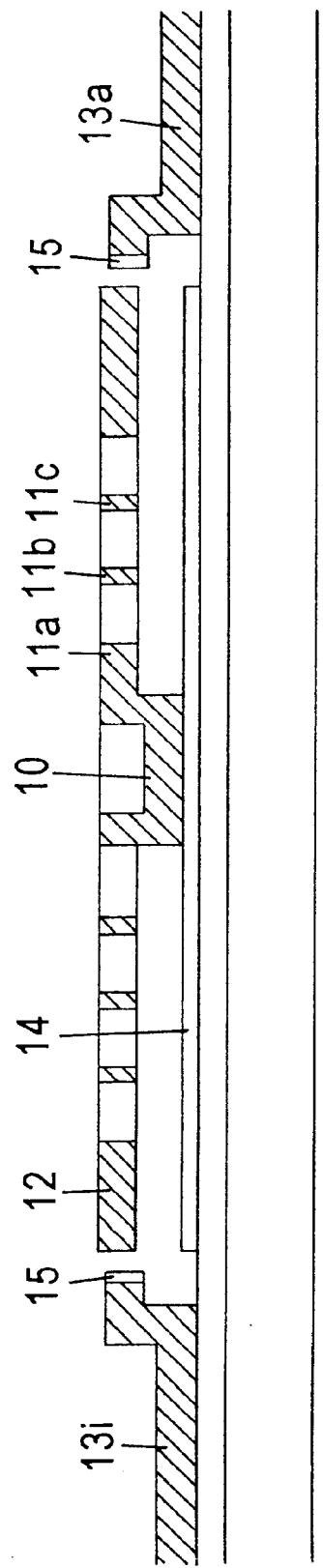
FIG. 2 is a cross-sectional illustration to show the structure of the microactuator of Example 1.

FIG. 1 is a schematic plan view to show the structure of a microactuator as a first exemplary embodiment of the present invention and FIG. 2 is a cross-sectional illustration of said microactuator.

In FIG. 1 and FIG. 2, item 10 is an anchor, items 11a through 11c are spiral shaped beams, item 12 is a ring-like displacement plate and items 13a through 13p are 16 electrodes arranged along the circumference of the displacement plate 12. These respective electrodes 13a through 13p can be applied in the same way as was in the prior art examples with arbitrary voltages through connecting wires from a voltage supply means.

As indicated by hatched lines in FIG. 1, the displacement plate 12 is a ring-like plate measuring approximately 100 μm in outer diameter and 75 μm in inner diameter and being supported by the anchor 10, which is about 15 um in outer diameter and located concentrically with the electrodes 13a through 13p, by means of the three beams 11a through 11c of an identical configuration attached to the inner circumference of the displacement plate 12 at three different positions thereof separated from each other by 120 degrees. These beams 11a through 11c are spiral shaped, each measuring several um in width, and located symmetrically from each other with respect to the center of the electrodes 13a through 13p that are laid out along a circumference.

The inner diameter of the circumference laid out by the electrodes 13a through 13p (only the electrodes 13a and 13i are shown in FIG. 2) is made larger than the outer diameter of the displacement plate 12 by several um. Also, the electrodes are situated at lower positions than the displacement plate and so, when the electrodes are excited, the displacement plate 12 will be attracted downwards for its stabilized motion.

Besides, the displacement plate 12 is constructed so as to be kept electrically in contact with a shield layer 14 by means of the beams 11a through 11c and the anchor 10. In addition an insulating layer 15 is formed on each respective inner edge of the electrodes 13a through 13p in order to prevent the electrodes from making a direct electrical contact with the displacement plate 12.

FIG. 3 through FIG. 7 are schematic cross-sectional illustrations to explain the fabrication processes (a) through (b) of this microactuator respectively, wherein the general IC fabrication methods such as etching, lithography or the like are utilized. The fabrication processes will be explained by referring to the respective illustrations hereunder.

Figure 3:
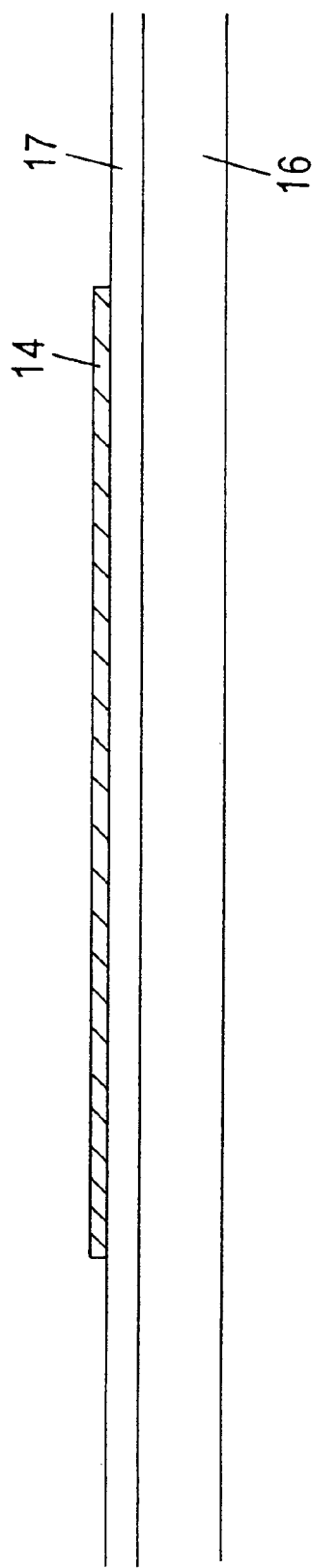

(a) As shown in FIG. 3, an insulating layer 17 is formed on a silicon substrate 16 by depositing in succession an oxide layer of 1 μm in thickness grown thermally and a silicon nitride layer of 1 μm in thickness formed by means of LPCVD.

Then, a polysilicon thin film of 3500 Å thick with phosphorus diffused sufficiently therein is formed by LPCVD and patterning is applied thereto to complete an electric shield layer 14.

(b) As shown in FIG. 4, a low temperature oxide layer (LTO) 18 of 2.2 um thick is deposited to make a sacrificial layer and then patterning is applied for forming a fixed portion 18a of the electrodes 13a through 13p and a hollow 18b in preparation of creating the anchor 10 for the displacement plate 12.

(c) As shown in FIG. 5, a polysilicon layer of 2.5 μm thick diffused with phosphorus sufficiently is deposited by LPCVD and then the displacement plate 12, the electrodes 13a through 13p (only the electrodes 13a and 13i are shown in FIG. 5), the beams 11a through 11e and the anchor 10 as illustrated in FIG. 1 and FIG. 2 are formed by means of a reactive ion etching method (RIE). At this time, the electrodes 13a through 13p and the anchor 10 are fixed on the silicon substrate 16.

On account of a thermal oxidation layer after patterning used as the mask for the reactive ion etching of the foregoing polysilicon layer, the thickness of the displacement plate 12 as well as the beams 11a through 11c and the electrodes 13a through 13p is approximately 2.2 μm at this stage.

Besides, the inner diameter of the circumference laid out by the electrodes 13a through 13p is made larger by the thickness of the insulating layer 15 which will be formed at a later step of the fabrication processes.

Figure 6:
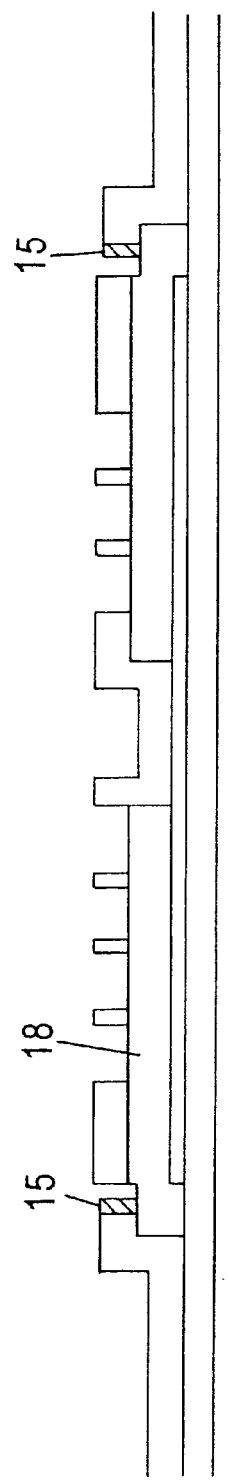

(d) As shown in FIG. 6, a deposit of a thermal oxidation layer to a thickness of 0.1 μm and another deposit thereupon of a silicon nitride to a thickness of 0.34 μm are formed and then patterning is applied thereto to create an insulating layer 15 on the inner circumference of each respective electrode of 13a through 13p. At this stage of the fabrication processes, a clearance is left between the outer diameter of the displacement plate 12 and each of the electrodes 13a through 13p.

Figure 7:
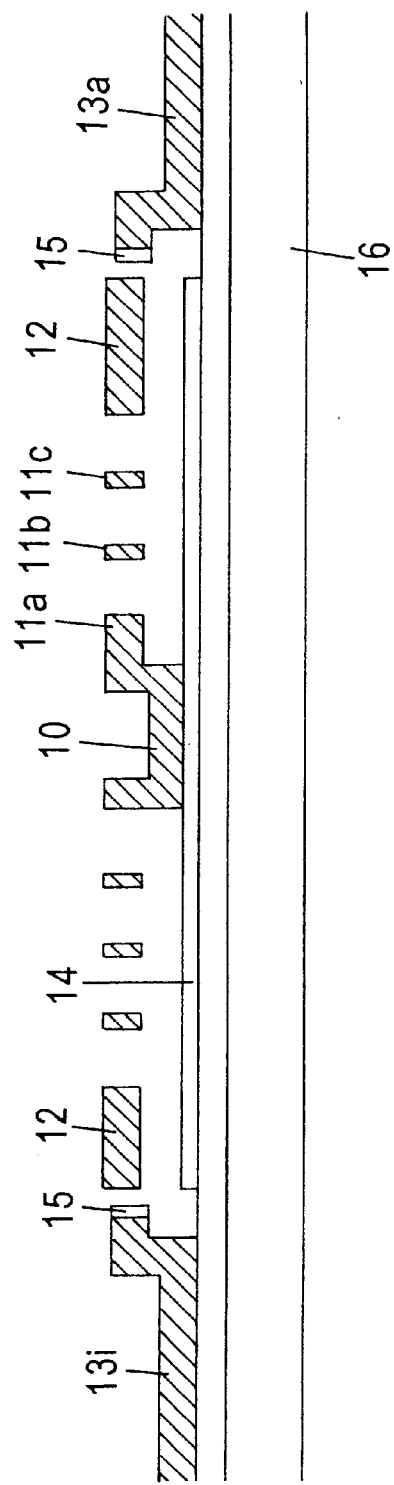

(e) As shown in FIG. 7, the LTO layer 18 serving as the sacrificial layer is lastly dissolved by buffered hydrogen fluoride (HF) and the displacement plate 12 and the beams 11a through 11c are released to realize the structure as illustrated in FIG. 2.

Next, the operation of the microactuator produced according to the foregoing exemplary embodiment of the present invention will be explained by the help of FIG. 8 and FIG. 9.

Figure 8:
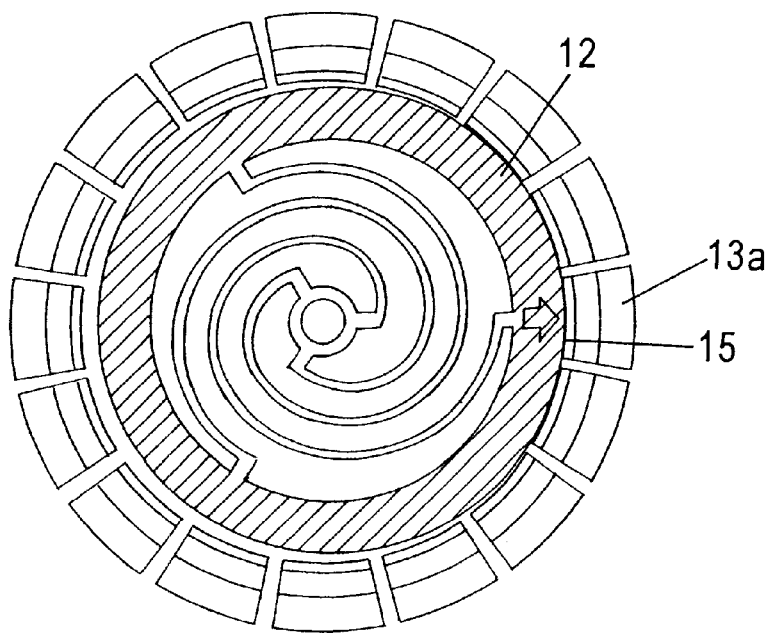
FIG. 8 and FIG. 9 are schematic plan views to explain the operation of the microactuator of Example 1.

As illustrated in FIG. 8, when the electrode 13a is excited, the displacement plate 12 will be electrostatically attracted and come into contact with the insulating layer 15 on the inner circumference of the electrode 13a.

Figure 9:
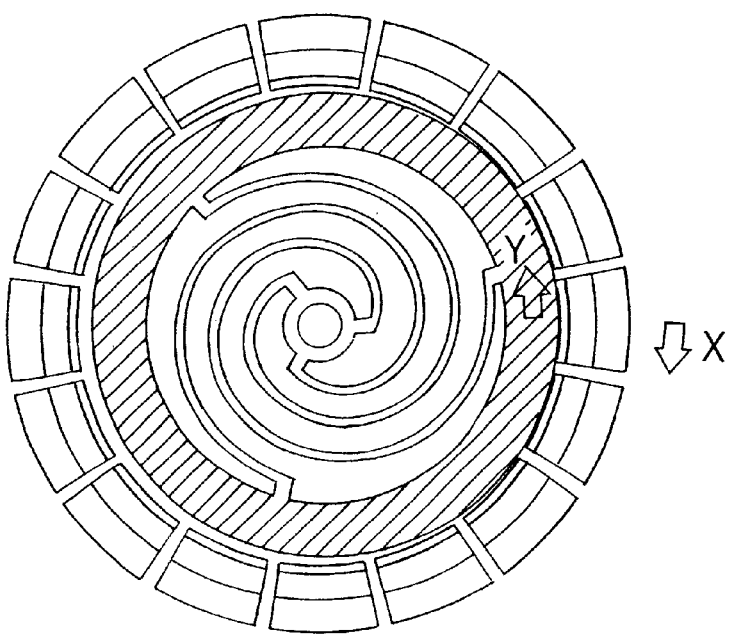

Then, as illustrated in FIG. 9, as voltages are applied sequentially to the electrodes 13a through 13p, the displacement plate 12 will revolve in the direction of arrow X, being attracted by the excited electrodes 13a through 13p in succession.

However, since the displacement plate 12 and the electrodes 13a through 13p move at that time while both are in rolling contact with each other at the common contact point, the displacement plate 12 will rotate by the difference between the inner circumference laid out by the electrodes 13a through 13p and the outer diameter of the displacement plate 12. The rotation of the displacement plate 12 is in the direction of arrow Y, which is opposite to the direction of its revolution.

At this time, although the displacement plate 12 is fixed in position to the substrate 16 by means of the beams 11a through 11c and the anchor 10, the displacement plate 12 can be rotated by a specified angle through the elastic deformation of the beams 11a through 11c, which are formed in configuration to extend over some length by having them made narrow in width and spiral in shape.

Conversely, upon removing the excitation from the electrodes 13a through 13p even while the displacement plate 12 is in motion, it will be possible to have the displacement plate 12 returned readily to the initial position on account of the rebounding force of the elastically deformed beams 11a through 11c.

What the present exemplary embodiment differs from the first prior art example is in the fact that the displacement plate 12 revolving and rotating on account of the attracting force caused by the excited electrodes 13a through 13p is linked to and also supported elastically by the anchor 10 by means of a plurality of the spiral beams 11a through 11c and additionally the displacement plate 12 is arranged to contact on its outer circumference with the electrodes 13a through 13p through the insulating layer 15.

Therefore, the contact between the rotating displacement plate 12 and the electrodes 13a through 13p is limited to the rolling contact only and the adverse effect caused by friction is made extremely small, resulting in a reduction of the deterioration in motional characteristics caused by wear and realization of a long life microactuator.

Besides, the electrostatically driven replacement plate 12 is put together with the shield layer 14 through the beams 11a through 11c and the anchor 10 and the electrical contact between the two is securely established, enabling to enhance the reliability in the motional characteristics.

Further, since the rotational accuracy of the displacement plate 12 is determined only by the roundness of the inner circumference laid out by the electrodes 13a through 13p and the outer circumference of the displacement plate 12, control of the accuracy in the fabrication processes can be easier when compared with that of the prior art example. Also, since the displacement plate 12 can be readily returned to its initial position by the rebounding force of the beams 11a through 11c upon removing the excitation off the electrodes 13a through 13p, the position and angle of the displacement 12 can be controlled accurately and with good reproducibility, resulting in a good possibility of using it as an actuator for positioning.

Furthermore, the microactuator of the present exemplary embodiment makes it possible to utilize the feature of high torque which a wobble motor has possessed inherently.

This is because the frequency of rotation Q of the displacement plate 12 becomes smaller by far than the rotational frequency F of the input voltages (the physical rotational frequency of the voltages applied to the electrodes 13a through 13p for the present exemplary embodiment) when compared with that of the ordinary motor in the same way as was already observed with the prior art example since the rotational frequency of the displacement plate 12 is determined by the inner diameter A of the circumference laid out by the electrodes 13a through 13p and also by the outer diameter D of the displacement plate 12.

In case where the frequency of revolution of the displacement plate 12 is the same as the rotational frequency F of input voltages, the frequency of revolution Q of the displacement plate 12 can be expressed by:

$$Q=F\times(A-D)/D$$

Suppose the difference between the inner diameter of the circumference laid out by the electrodes 13a through 13p and the outer diameter of the displacement Plate (about 100 um) is 2 um, for example, the rotational frequency of the displacement plate becomes as small as about one fiftieth of that of the input voltage. However, since the generated torque is inversely proportional to the ratio of the rotational frequencies, torque of as high as 50 times the torque from an ordinary electrostatically driven motor turning around a fixed axis can be generated.

Thus, according to the present exemplary embodiment, it is possible to obtain a longer life and higher reliability microactuator compared with the first prior art example, having little adverse effect of friction and realizing secure electrical contact at time of electrostatic motion.

In addition, since the control of accuracy in fabricating the displacement plate is simplified and the displacement plate can be returned to the initial state by the rebounding force of the electrically deformed beams, a positioning mechanism having high accuracy and excellent reproducibility can be realized.

Besides, it is needless to say that torque as high as that from a wobble motor can be obtained.

Moreover, since each respective component part is laid out on a plane, the notional characteristics can not be governed by the thickness of the sacrificial layer, there is a possibility of performing the most suitable designing with abundant freedom and also the semiconductor processes can be utilized for easy fabrication, it will become possible to provide a microactuator characterized by small dimensions and light weight and also mass-producibility.

By having the microactuator of the foregoing utilized in building a magnetic head, for example, according to a fine processing on the displacement plate, an integrated type head, whereby both the fine positioning and azimuth adjustment are facilitated, can be realized. Also, when it is applied to construction of a semiconductor laser, a hologram element or the like, its wider applications that are worth using as various pickups and optical devices can be created.

In the present invention's exemplary embodiment as above, it is possible to employ a construction wherein an insulating layer is formed on the outer circumference of the displacement plate 12 instead of the inner circumference of each of the electrodes 13a through 13p, achieving the same effect.

As explained in the foregoing, the structure of the first exemplary embodiment of the present invention comprises:

a plurality of electrodes arranged on a substrate along a circumference;

a ring-like displacement plate located inside said electrodes;

beams located inside the inner circumference of said displacement plate, each of which is connected at one end with an anchor formed solidly on said substrate and at the other end with a specified place of the inner circumference of said displacement plate to support said displacement plate elastically; and a voltage application means for applying voltages selectively to each of said electrodes in order to have said displacement plate attracted electrostatically towards said electrodes, to which said voltages have been applied, and moved.

The present invention has the effects as stated in the following:

According to the present invention, by having voltages applied selectively to a plurality of electrodes arranged in a circular form on a substrate, a ring shaped displacement plate situated inside said electrodes will be revolved and also rotated by electrostatic attracting force. At this time, the displacement plate is elastically supported by beams which are fixed at the fixing ends thereof to said substrate. The displacement plate shows enhanced reliability in its motional characteristics on account of the secure electrical contacting achieved with the electrostatically driven displacement plate through the beams. Besides, on account of the rotating displacement plate being in rolling contact with the electrodes, the effect of friction has become extremely small and it has been made possible to realize a long life microactuator. Further, since the rotational accuracy of the displacement plate is determined only by the roundness of the electrodes and the displacement plate, accuracy controlling in the fabrication processes can be made easier when compared with that in the prior art example. Still further, since the displacement plate is supported by the beams and moved while these beams are being deformed elastically, the displacement plate will be readily returned to its initial position upon removal of the excitation from the electrodes by the rebounding force of the beams and able to start to rotate again from there. Therefore, it has become possible to control the position and angle of the displacement plate with high accuracy and excellent reproducibility, leading to realization of an excellent positioning mechanism. Further, the feature of high torque which a wobble motor has inherently can be naturally utilized. In addition, since all the component elements are laid out on a plane and the actuator's performance is not affected by the thickness of a sacrificial layer, it has become possible to conduct a designing work with abundant freedom for achieving the most suitable diameters of respective parts, numbers of electrodes and shapes of beams. Also, on account of the semiconductor processes utilized readily for fabrication, it has become possible to provide a microactuator having small dimensions, light weight and mass-producibility.

EXAMPLE 2

The structure of a microactuator as a second exemplary embodiment of the present invention is explained briefly with the help of drawings.

Figure 10:
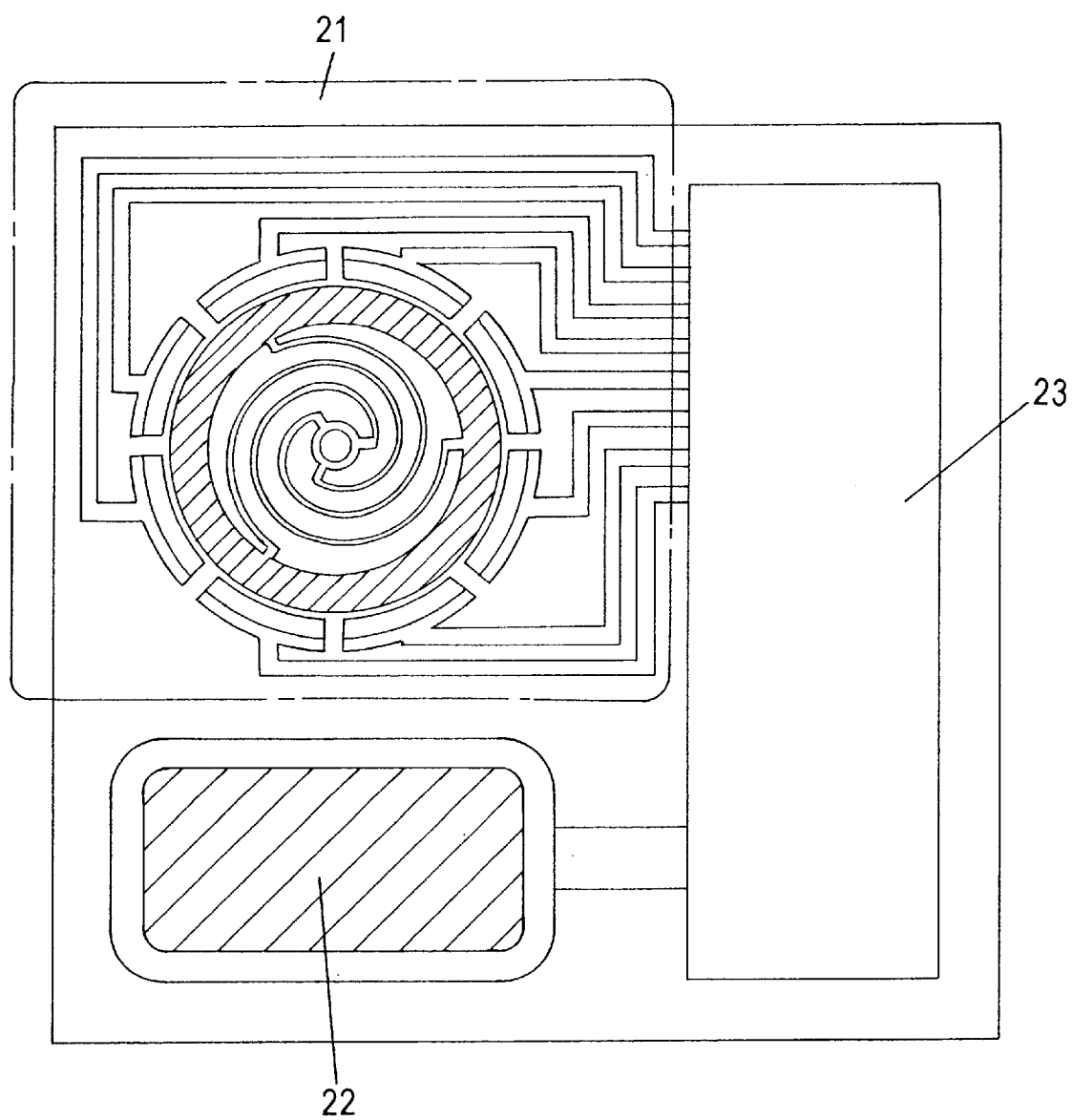
FIG. 10 is a schematic plan view to show the structure of a microactuator as a second exemplary embodiment (Example 2) of the present invention.

FIG. 10 is a schematic plan view of said microactuator. What differs from the first exemplary embodiment of the present invention is in having a microactuator together with a drive control circuit, a signal processing circuit and a signal detector formed all on one substrate.

The structure and the fabrication method of the area of FIG. 10, which is surrounded by a one dotted broken line to show the microactuator 21 comprising a ring-like displacement plate and electrodes arranged on a circular layout are the same as described in the foregoing first exemplary embodiment and the explanation thereof will not be given here. The signal detector 22 uses photodiodes, for example, to convert the optical signals received directly from outside to electrical signals.

A signal processor 23 consists of the signal processing circuit and the drive control circuit. Electrical signals from the signal detector 22 are processed in the signal processing circuit for controlling the magnitude and timing of the voltages to be applied to the actuator 21 through the drive control circuit, whereby the displacement plate 12 is controlled in turning on and off, speed of rotation, direction of rotation, rotational angle or the like.

The signal processor 23 is connected electrically with an outside supply source (not shown in FIG. 10) and the energy to drive the displacement plate into motion is fed from this outside supply source through the signal processor 23. The signal detector 22 and the signal processor 23 are formed in an about 300 μm square area of the substrate as shown in FIG. 10 according to the same semiconductor process as employed in fabrication of the actuator 21.

Figure 11:
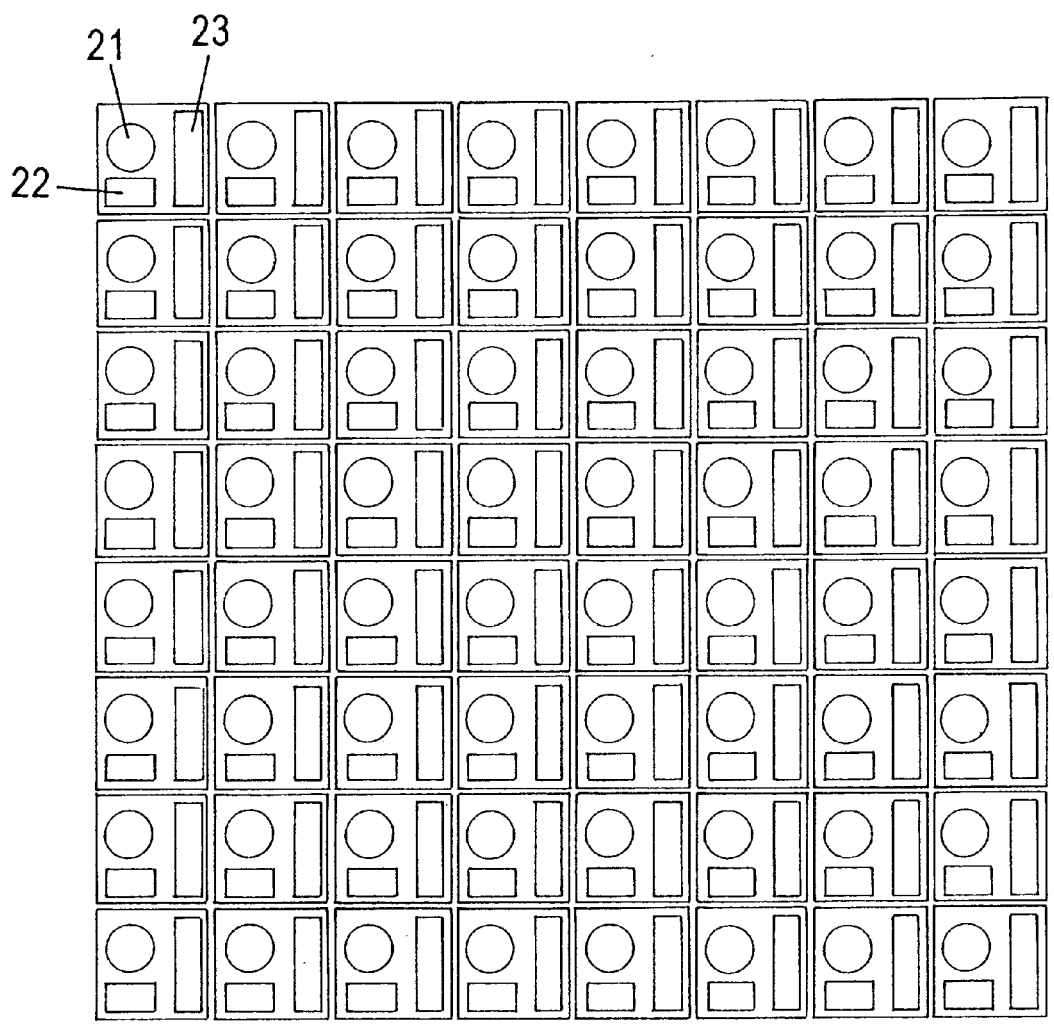
FIG. 11 is a plan view to show a plurality of the microactuator as shown in FIG. 10 laid out in a matrix formation on a single substrate.

As indicated in FIG. 11, a plurality of the actuators can be put together in a matrix formation on one substrate. A system including 64 actuators, for example, can be realized by an arrangement of 8 by 8 matrix on a substrate of about 2.5 mm square.

Thus, by having the signal detector 22 and signal processor 23 integrated with the actuator 21 for its intelligent performance, it has become possible to obtain a very compact microactuator of excellent response characteristics. Also, by having a plurality of the actuators put in position and driven into controlled motion separately, it is possible to realize a microactuator which can be operated either in a distributed or concerted mode.

In this example, photo diodes are used in the signal detector 22 in converting the optical signals into electrical signals. However, providing the signals from outside get to the signal detector directly, the signals cannot necessarily be optical signals.

With this systematized microactuator, it is possible to expand its applications to an optical computer, various types of recording or display equipment and the like because, as mentioned before, various devices formed on the displacement plate make it possible to accept or release information while the processing of data is performed within the system to realize an integrated type device of extremely high capability.

As explained in the foregoing, the structure of the second exemplary embodiment of the present invention includes a unit comprising:

a plurality of electrodes arranged on a substrate along a circumference;

a ring-like displacement plate located inside said electrodes;

beams located inside the inner circumference of said displacement plate, each of which is connected at one end with an anchor formed solidly on said substrate and at the other end with a specified place of the inner circumference of said displacement plate to support said displacement plate elastically;

a drive control circuit for controlling voltages to be applied to said electrodes;

a signal detector for converting signals from outside to electrical signals; and a signal processing circuit for processing said electrical signals and transmitting control signals to said drive control circuit, all being put together, and also a plurality of the above unit formed on a single substrate.

The present invention has the effects as stated in the following:

According to the present invention, signals from outside are converted into electrical signals in a signal detector and then the electrical signals are processed in a signal processing circuit into control signals which are outputted to a drive control circuit for controlling the motion of a ring-like displacement plate, which is located inside of electrodes arranged in a circular lay-out, through controlling the voltages applied to the electrodes in the same way as was in the first exemplary embodiment of the present invention. The present invention further covers a microactuator produced by laying out a plurality of the foregoing system treated as unit on one substrate in a matrix formation. Therefore, by having the signal detector and signal processor integrated with the actuator for its intelligent performance, it has become possible to obtain a very compact microactuator of excellent response characteristics and at the same time, by having a plurality of the actuators driven into controlled motion separately, it is possible to realize a microactuator which can be operated either in a distributed or concerted mode.

EXAMPLE 3

A third exemplary embodiment of the present invention is explained here. Since there are many similarities in construction between the present example and the first exemplary embodiment, a more detailed description given to this example will be resulting in a little excessive redundancy in explanation.

Figure 12:
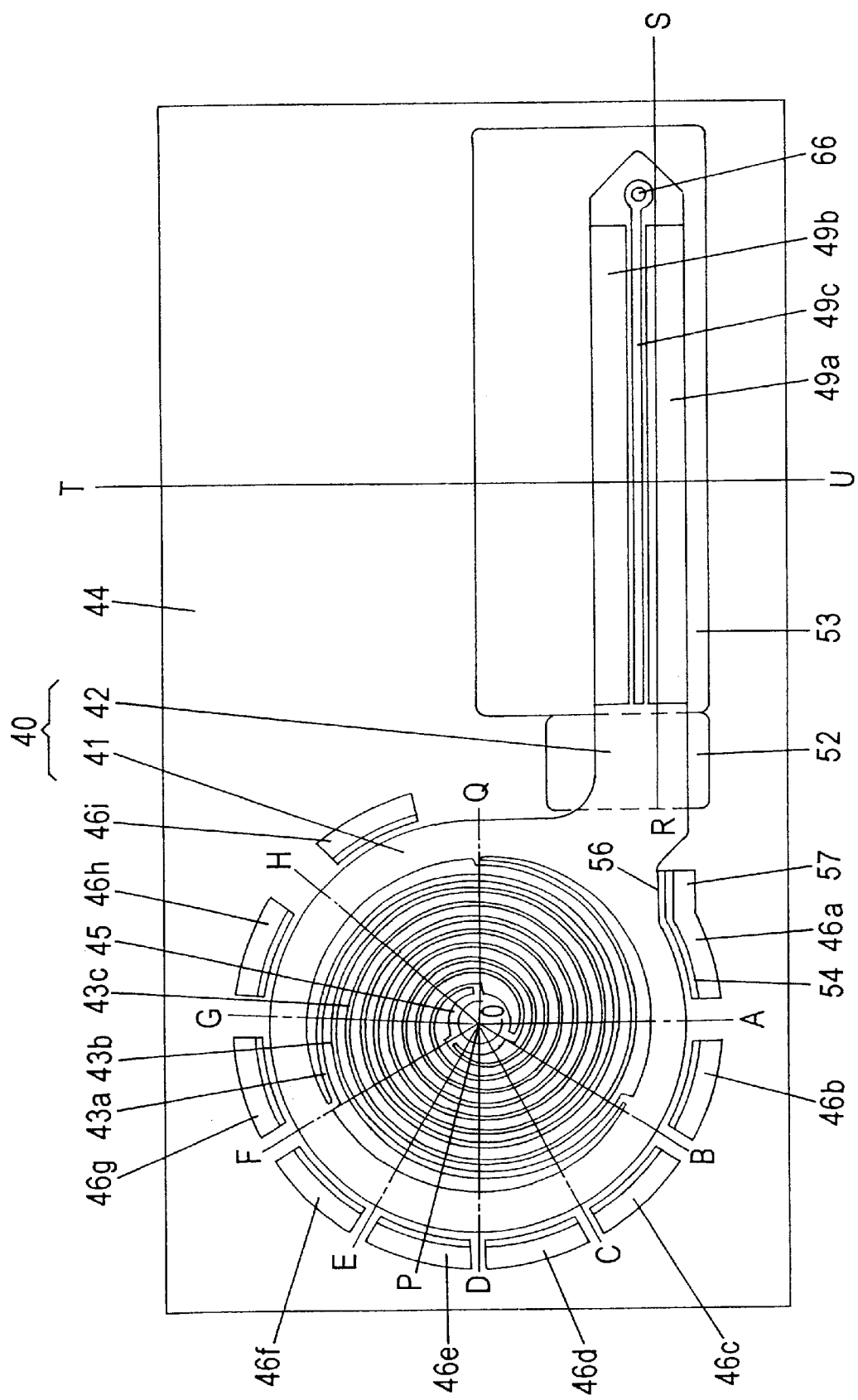
FIG. 12 is a schematic plan view to show the structure of a microactuator as a third exemplary embodiment (Example 3) of the present invention.
Figure 13:
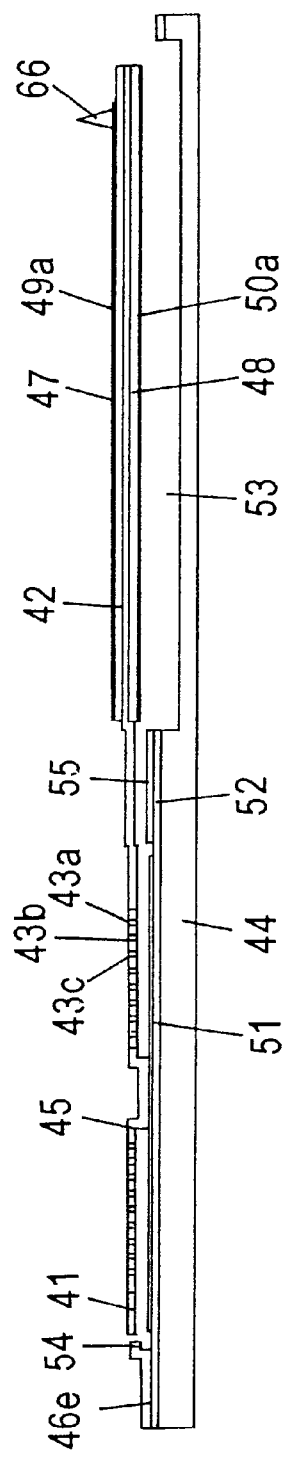
FIGS. 13 and FIG. 14 are cross-sectional illustrations to show the structure of the microactuator of Example 3.
Figure 14:
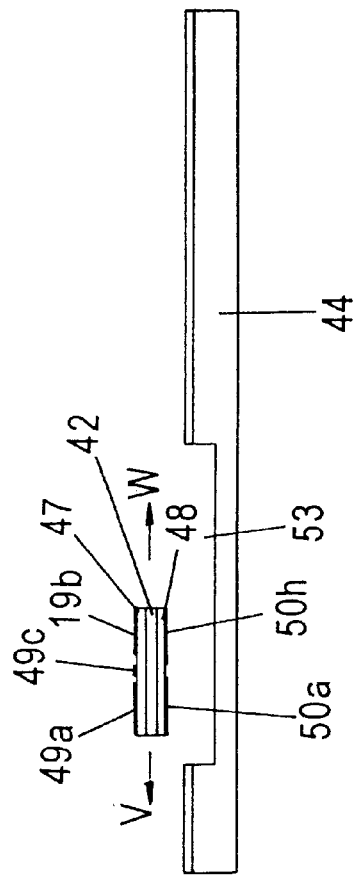

FIG. 12 is a schematic plan view to show the structure of a microactuator as an exemplary embodiment of the present invention. FIG. 13 is a longitudinal sectional view of said microactuator along the broken line of POQRS as shown in FIG. 12. FIG. 14 is a traverse sectional view of said microactuator along the broken line of TU as shown in FIG. 12.

As illustrated in those drawings, a displacement plate 40 is formed of an electroconducting thin plate-like material consisting of a ring member 41 and an arm member 42. As described later in detail, the displacement plate 40 is as a whole driven electrostatically into rotational motion by the ring member 41 and also the arm member 42 thereof is piezoelectrically driven by a bimorph.

First, the structure of the ring member 41 and the vicinity thereof will be explained. There are three narrow beams 43a through 43c of an identical spiral configuration attached to the inner circumference of the ring member 41 at three different positions thereof separated from each other by 120 degrees and located symmetrically from each other. One end of these beams is fixed to an anchor 45 which is mounted on a substrate 44 and standing thereupon. In other words, the displacement plate 40 is supported by the anchor 45 elastically by means of the beams 43a through 43c.

On an area of the substrate 44 extending beyond the outer circumference of the ring member 41, nine electrodes 46a through 46i (only the electrode 46e is shown in FIG. 13) are laid out along a circumference with a small gap left between them and the ring member 41. The inner circumference of each respective electrode except for the electrode 46a is of one identical arc configuration. However, each respective electrode is not located at an equal spacing from each other. Lines OB through OH express reference lines, with respect to which the two neighboring electrodes are symmetric and the spacing pitch angles ∠AOB, ∠BOC, ∠COD, ∠DOE, ∠EOF, ∠FOG and ∠GOH are not the same.

Also, the electrodes 46a through 46i are connected by wiring with a voltage supply means, although not indicated in FIG. 12, in the same way as was in the prior art example so that arbitrarily selected voltages can be applied to the electrodes.

The displacement plate 40 has a concave position restricting member 56 at the place opposite to the electrode 46a. The electrode 46a, instead, has a convex guide member 57 which comes together with the position restricting member 56 and directs the motion of the displacement plate 40.

Besides, there is an insulating layer 54 formed on the inner circumference of each of the electrodes 46a through 46i to prevent the electrodes from making direct electrical contact with the ring member 41. Also, there is an electroconducting shield layer 51 of the same shape as the ring member 41 placed between the anchor 45 and the substrate 44 so as to maintain an electrical connection with the ring member 41 at all times.

Next, the structure around the arm member 42 will be explained. The tip of the arm member 42 is located outside of the circumference laid out by the electrodes 46a through 46i. As illustrated in FIG. 12 and FIG. 14, the arm member 42 is sandwiched between piezoelectric layers 47 and 48 almost over its entire length. In addition, electrodes 49a through 49c are formed on the piezoelectric layer 47 and electrodes 50a and 50b of almost the same shape as the electrodes 49a and 49b are formed on the piezoelectric layer 48. Further, a cone shaped metal electrode 66 is created on the electrode 49c.

Furthermore, an electrode 52 is formed on the substrate 44 opposite to the arm member 42. An insulating layer 55 is formed on the electrode 52 so that the electrode 52 does not come into a direct electrical contact with the arm member 42. Also, there is a cavity 53 formed at the area opposite to the electrode 50a and 50b.

Besides, the electrodes 49a through 49c, the electrodes 50a and 50b, the electrode 52 and the electrode 66 can be applied with arbitrarily selected voltages through connecting wires from a voltage application means although not shown in the drawings.

FIGS. 15 through 29 are cross-sectional illustrations to explain the fabrication processes (a) through (o) of said microactuator. The fabrication processes use the general semiconductor processes such as etching, lithography or the like. The fabrication processes will be explained briefly according to the fabrication process illustrations hereunder.

Figure 15:
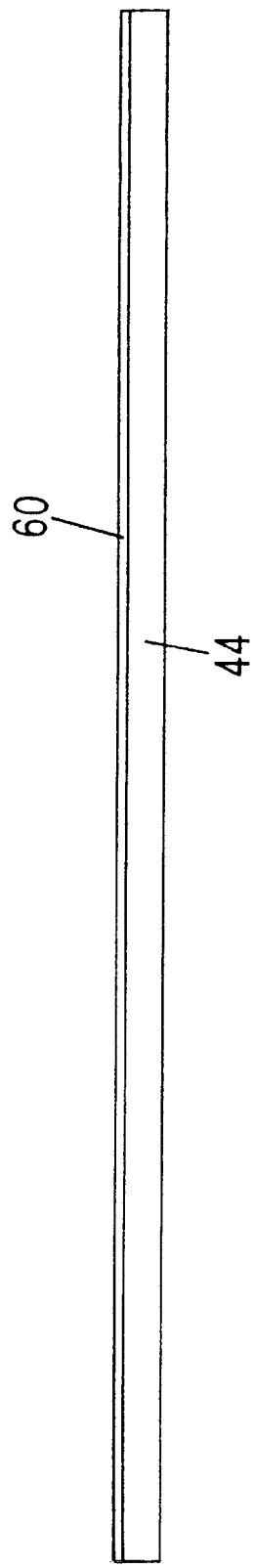
FIG. 15 through FIG. 29 are cross-sectional illustrations to show the fabrication processes of the microactuator of Example 3.

(a) As shown in FIG. 15, an insulating layer 60 is formed on a silicon substrate 44 by depositing in succession an oxide silicon layer of 1 μm thick grown thermally and a silicon nitride layer of 1 μm thick formed by means of plasma CVD.

Figure 16:
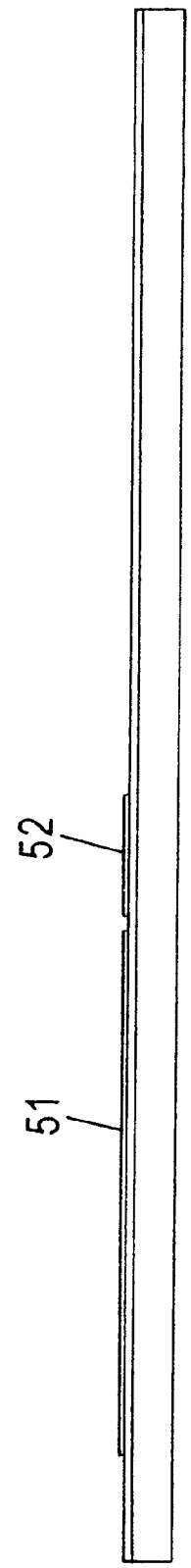

(b) As shown in FIG. 16, an LPCVD polysilicon thin film of 0.35 μm thick with phosphorus diffused sufficiently therein is formed on said insulating layer 60 and patterning is applied thereto to complete an electrode 52.

Figure 17:
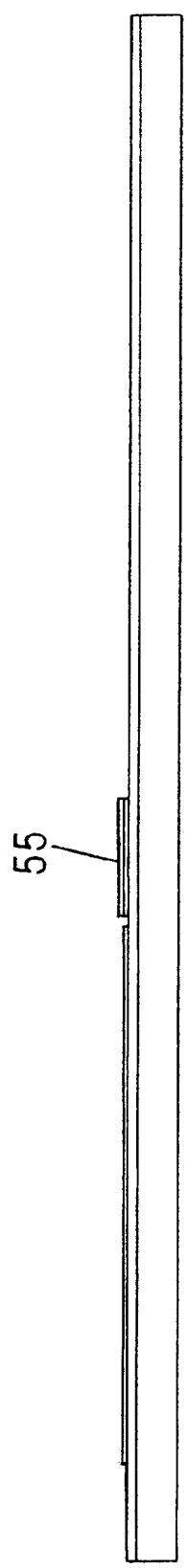

(c) As shown in FIG. 17, an insulating layer 55 is formed on the electrode 52 by deposition of a silicon oxide layer of 0.1 μm thick and also depositing a silicon nitride layer of 0.34 μm thick by plasma CVD and then by application of patterning thereto.

Figure 18:
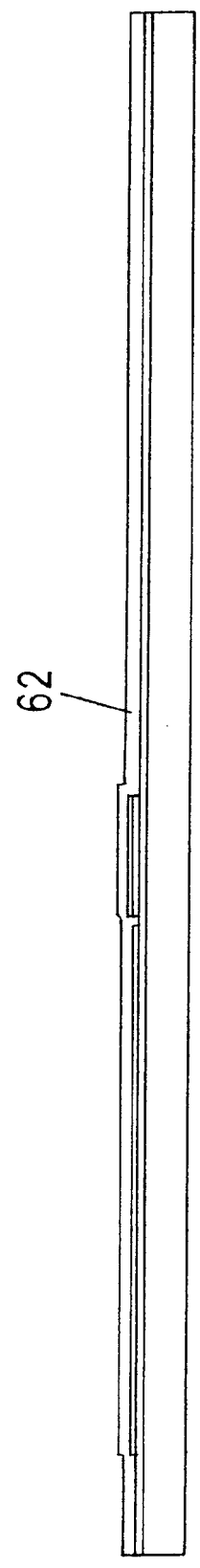

(d) As shown in FIG. 18, a silicon oxide layer 62 of 2.2 μm thick to serve as a sacrificial layer is deposited.

Figure 19:
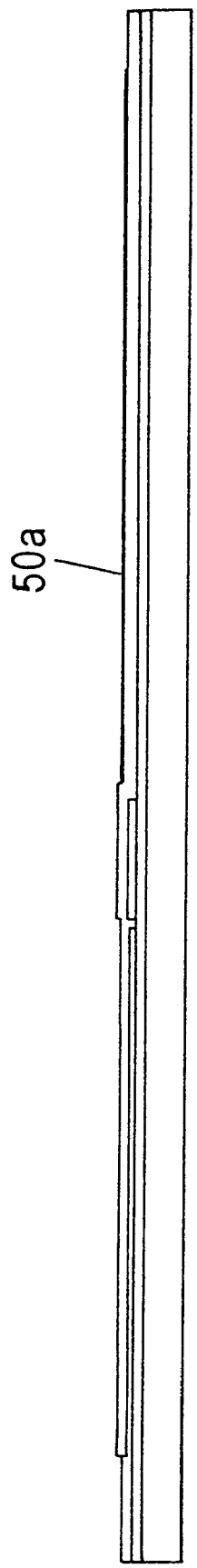

(e) As shown in FIG. 19, Al is deposited by electron beam deposition to a thickness of 0.5 μm and then patterning is applied to create electrodes 50a and 50b for driving an arm member 42.

Figure 20:
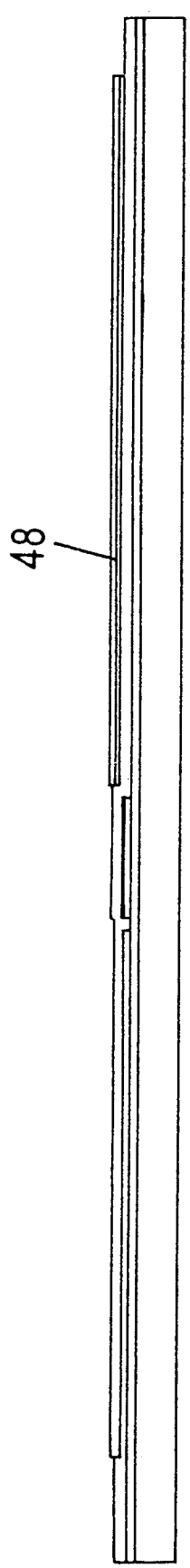

(f) As shown in FIG. 20, a nitride layer of 0.2 μm thick by plasma CVD, a zinc oxide layer of 3 μm thick by reactive sputtering and another nitride layer of 0.2 μm by plasma CVD are deposited alternatingly over the foregoing electrodes to form a piezoelectric layer 48. Patterning is applied to the nitride layers by plasma etching and to the zinc oxide layer by wet etching, respectively.

Figure 21:
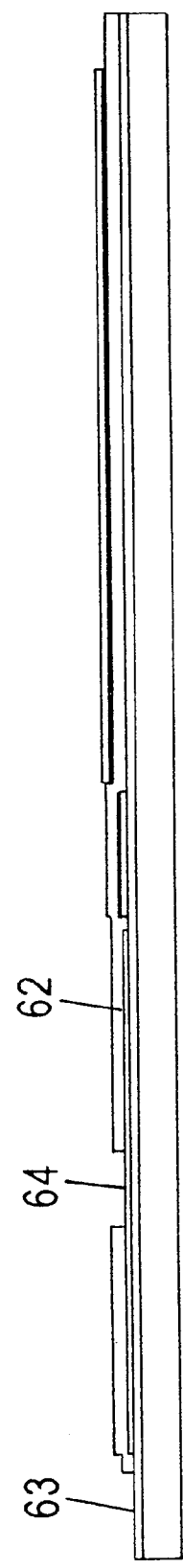

(g) As shown in FIG. 21, patterning for an electrode fixing member 63 and an anchor fixing member 64 is applied to the silicon oxide layer 62 serving as a sacrificial layer.

Figure 22:
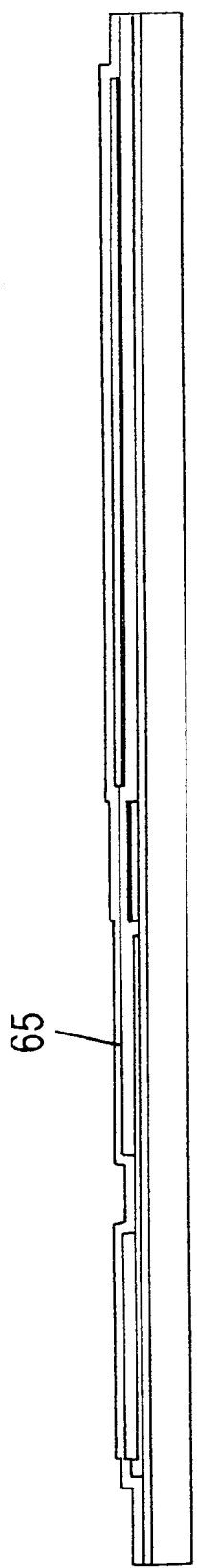

(h) As shown in FIG. 22, an LPCVD polysilicon layer 65 of 2.5 μm thick diffused with phosphorus sufficiently is then deposited.

Figure 23:
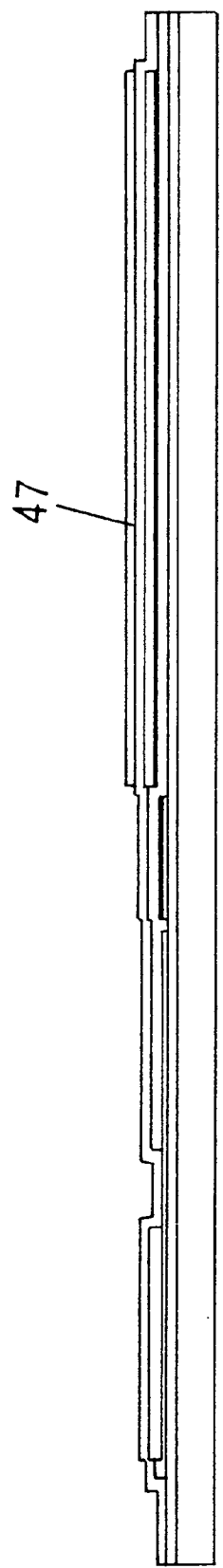

(i) Then, as shown in FIG. 23, a nitride layer of 0.2 μm, a zinc oxide of 3 um and a nitride layer of 0.2 μm are again deposited alternatingly by either plasma CVD or reactive sputtering to form a piezoelectric layer 47. Also, patterning is applied by plasma etching or wet etching in the same way as before.

Figure 24:
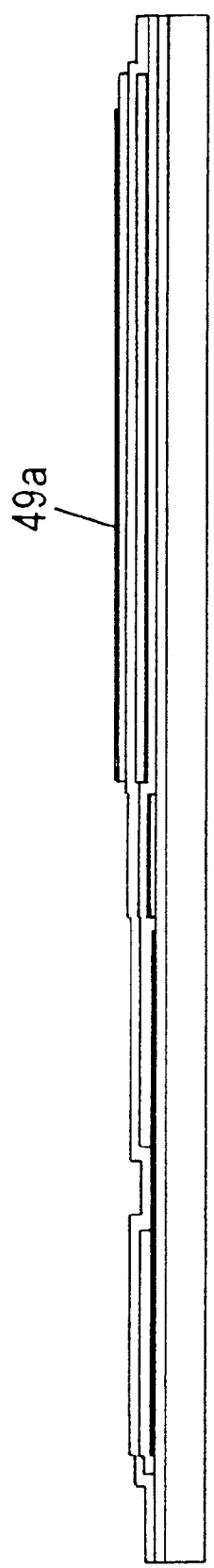

(j) As shown in FIG. 24, an Al layer of 0.5 μm thick is formed and patterning is applied thereto to create electrodes 49a and 49b (not shown in FIG. 24) for driving the arm member 42 and also an electrode 49c (not shown in FIG. 24) for mounting an electrode 66.

Figure 25:
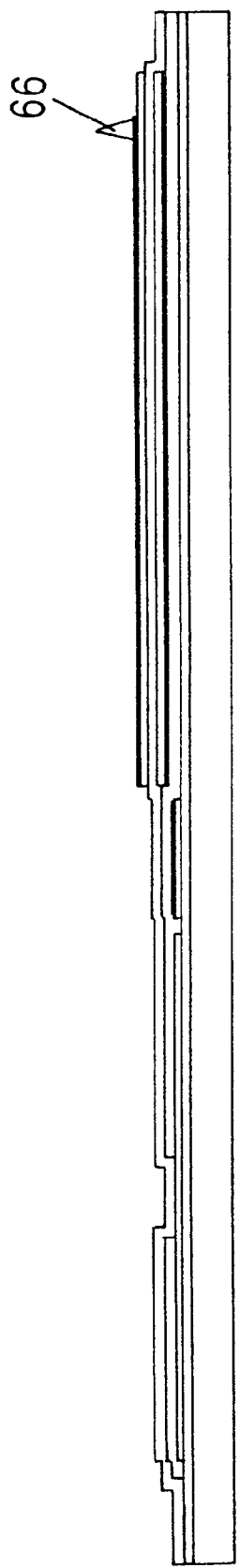

(k) As shown in FIG. 25, a cone-shaped electrode 66 is created on the tip of the electrode 49c by means of a lift off method.

Figure 26:
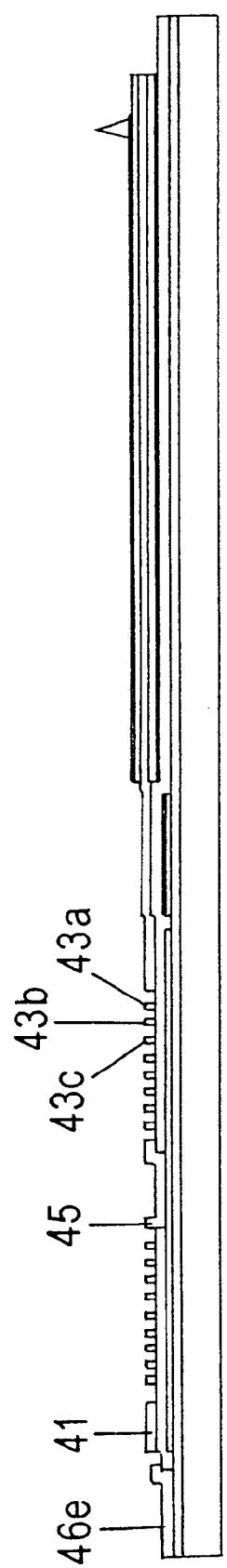

(l) As shown in FIG. 26, a displacement plate 40, beams 43a through 43c, an anchor 45 and electrodes 46a through 46i (only the electrode 46e is shown in FIG. 26) that were indicated in FIG. 12 and FIG. 13 are formed by reactive ion etching (RIE). At this time, the anchor 45 and the electrodes 46a through 46i are fixed on the silicon substrate 44. Since a thermal oxidation layer after patterning is used as the mask for reactive ion etching of said polysilicon layer, the thickness of the displacement plate 40, the beams 43a through 43c and the electrodes 46a through 46i measures about 2.2 µm at this time. The inner circumference laid out by the electrodes 46a through 46i is made larger by the length of an insulating layer 54 to be formed at a later stage of the fabrication processes.

Figure 27:
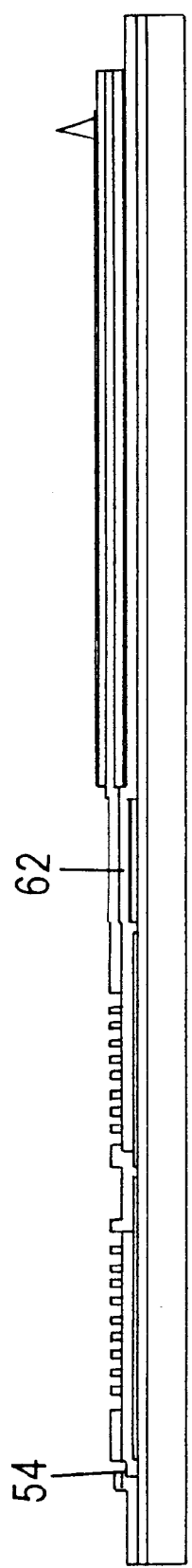

(m) As shown in FIG. 27, a high temperature oxidation layer of 0.1 µm and a silicon nitride layer of 0.34 µm are deposited successively and then patterning by RIE is applied thereto so as to have the insulating layer 54 formed on the inner circumference of each of the electrodes 46a through 46i. At this stage of the fabrication processes, a clearance is created between the outer diameter of a ring member 41 of the displacement plate 40 and the electrodes 46a through 46i.

Figure 28:
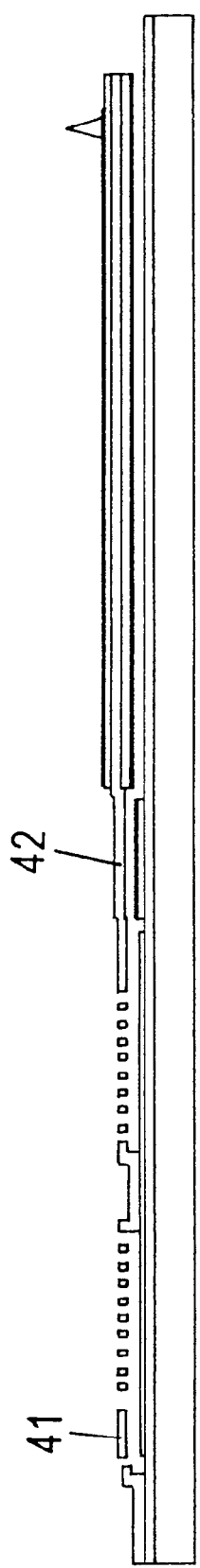

(n) As shown in FIG. 28, the silicon oxide layer 62 serving as the sacrificial layer is dissolved by buffered hydrogen fluoride (HF) and the displacement plate 40 and the beams 43a through 43c are released off the substrate 44. At this time, the piezoelectric layers 47 and 48 and also the vicinity of the insulating layer 54 are covered by a protective coating and dissolving thereof by the buffered hydrogen fluoride is prevented from occurring in advance, although any detailed explanation thereof is omitted here.

Figure 29:
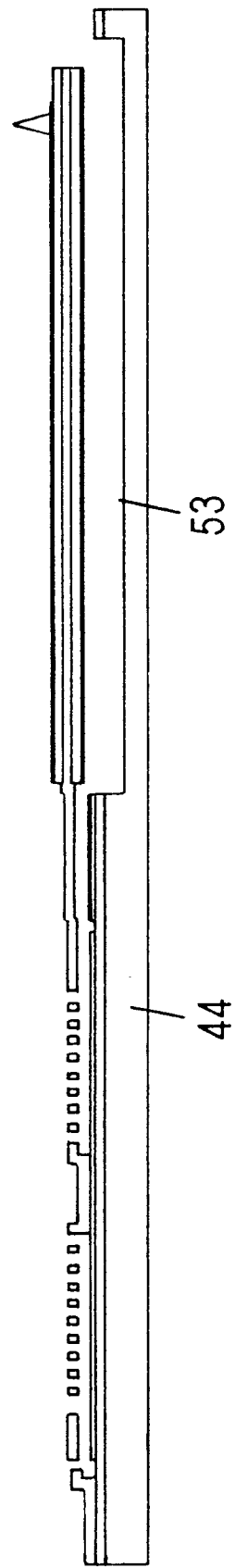

(o) As shown in FIG. 29, a cavity 53 is lastly formed on the silicon substrate 44 in the place situated directly under the arm member 42 by etching to complete the structure as illustrated in FIG. 13, although any detailed explanation is not given here.

Next, the operation of the microactuator produced according to the foregoing exemplary embodiment of the present invention will be explained by the help of FIG. 30 through FIG. 33.

Figure 30:
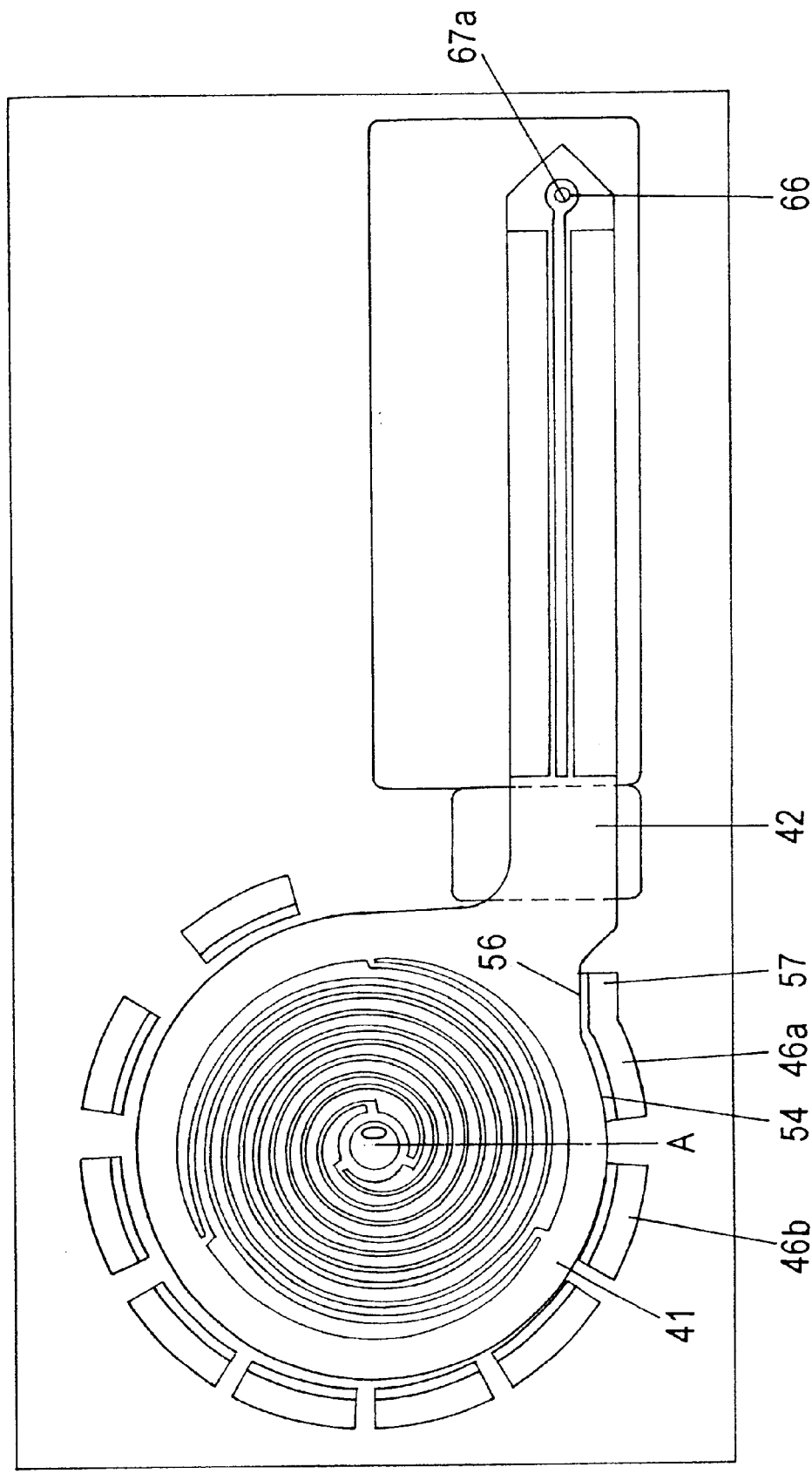
FIG. 30 through FIG. 33 are illustrations to explain the operation of the microactuator of Example 3.

When the electrodes 46a and 46b are excited by application of voltages of the same magnitude, the ring member 41 of the displacement plate 40 will be attracted electrostatically by said electrodes and moved in the direction of OA as indicated in FIG. 30 until it comes into contact with the insulating layer 54. At this time, the position restricting member 56 of the displacement plate 40 hits and comes into contact with the guide member 57 of the electrode 46a and also the periphery of the ring member 41 will come into close contact with the electrodes 46a and 46b. As a result, the displacement plate 40 will be led to a specified position for assured initialization in terms of its position. At the same time, the electrode 66 mounted at the tip of the arm member 42 will be guided to a position 67a as indicated in FIG. 30.

Figure 31:
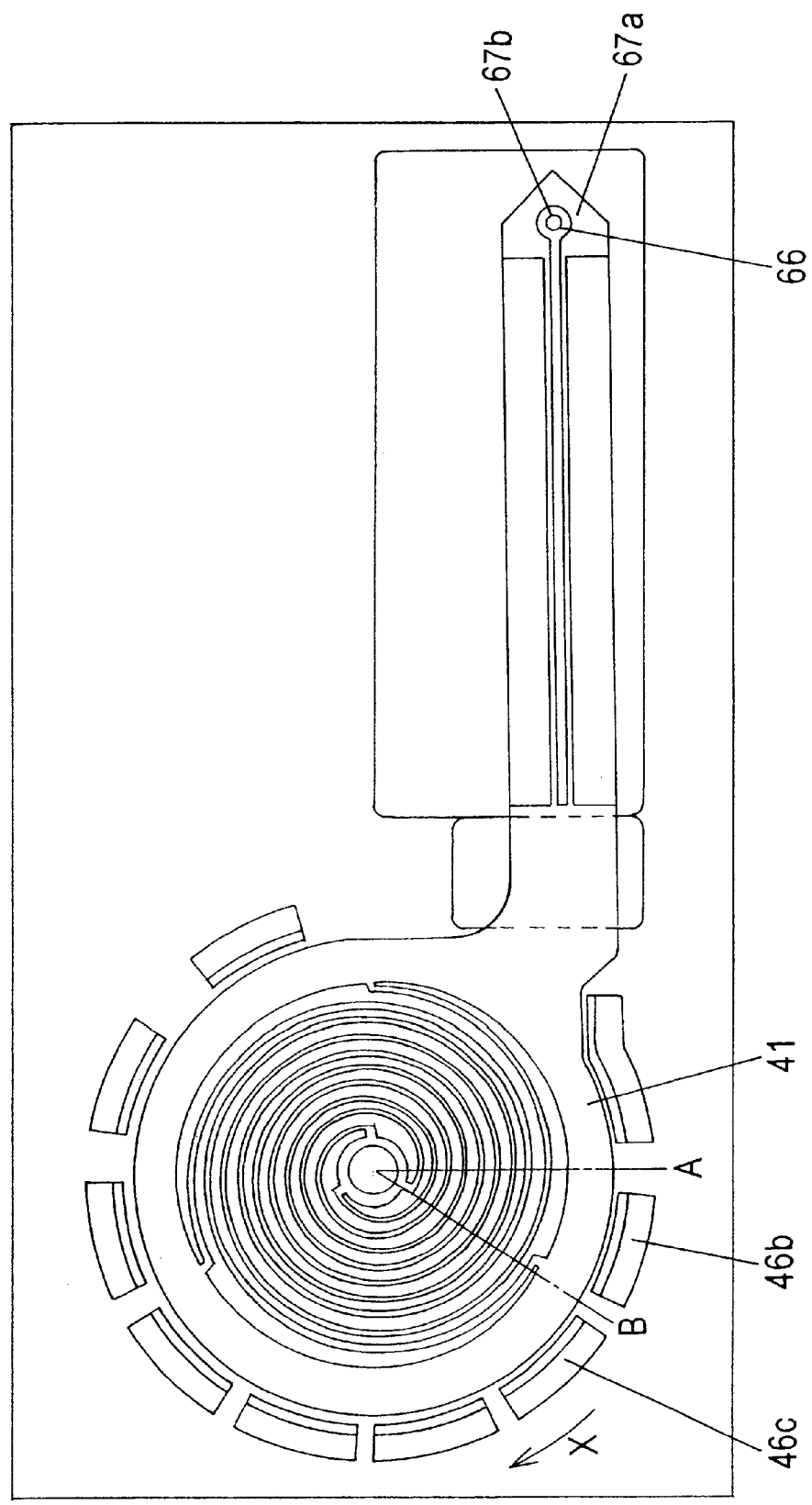

Next, when the excitation of the electrode 46a is removed and voltages are applied to the electrodes 46b and 46c, the ring member 41 will be attracted electrostatically by the two electrodes newly excited as shown in FIG. 31 and moved by rotating to a position which is symmetric with respect to the line OB. Then, the electrode 66 mounted on the tip of the arm member 42 will be guided to a position 67b as indicated in FIG. 31.

Figure 32:
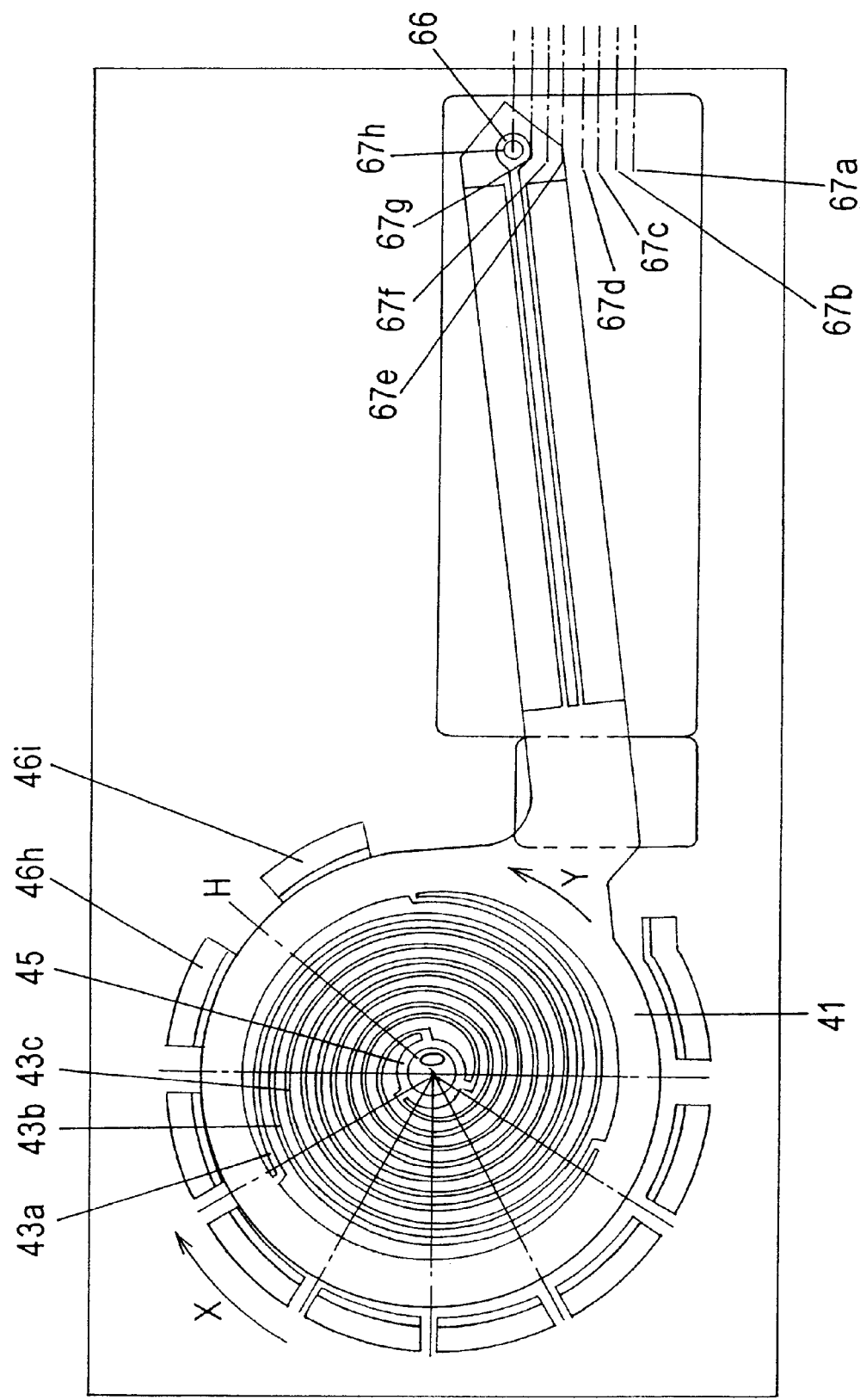

As the pair of electrodes to be excited is shifted by one electrode length alternatingly, the ring member 41 will be revolving in the direction of an arrow X by being attracted by the excited two electrodes successively. When voltages are lastly applied to the electrodes 46h and 46i, the ring member 41 will be moved to the position which is symmetric with respect to the line OH. Then, the electrode 66 mounted on the tip of the arm member 42 will be guided to a position 67h as indicated in FIG. 32.

Besides, as the ring member 41 is moved while it is in rolling contact with the electrodes 46a through 46i, it will be rotating by the difference in length between its outer circumference and the inner circumference laid out by the electrodes 46a through 46i. The direction of its rotation will be in the opposite direction of its revolution as indicated by an arrow Y in FIG. 32.

On account of the same arc configuration that each respective circumference of the electrodes 46b through 46i assumes, the ring member 41 will be attracted electrostatically to the center of two neighboring electrodes upon application of voltages to said two electrodes. Therefore, by shifting the electrode pairs to be excited by one electrode alternatingly, it will be possible to give a step-like rotating motion to the ring member 41. Further, by having the rotational angle of the ring member 41 varied most suitably through alteration of spacing pitch angles between two neighboring electrodes, it will be possible to have the tip of the arm member 42 shifted at an equal pitch. Accordingly, it will be possible to realize a high accuracy and highly dependable positioning mechanism whereby the electrode 66 of the tip of the arm member 42 can be guided at an equal pitch from the position 67a to the position 67h as illustrated in FIG. 32.

Although the ring member 41 is fixed the anchor 45 through the beams 43a through 43c, it can be rotated by a specified angle due to elastic deformation of the beams 43a through 43c. As shown in the drawings, by having the beams 43a through 43c designed to have narrow width for smaller stiffness and length of some magnitude through employing a spiral shape, it will become possible to realize the aforementioned elastic deformation with the beams 43a through 43c.

Also, when a voltage is applied to the electrode 52 on the substrate 44 after the ring member 41 has been rotated by a specified angle, the arm member 42 will be attracted electrostatically towards the substrate 44 and drawn by said electrode 52. Then, even if the excitation on the electrodes 46a through 46i is removed, the position of the arm member 42 will be kept for assuring a precise positioning.

After having fixed the position of the displacement plate 40 as a whole through a rotational motion of the ring member 41 by a specified angle, fine positional adjustments of the tip of the arm member 42 will be performed by means of piezo bimorphs. With the help of FIG. 14 and FIG. 33, this operation will be explained hereunder.

By having the arm member 42 grounded and the voltages to be applied to the electrodes 49a, 49b, 50a and 50b varied, the piezoelectric layers 47 and 48 can be deformed freely for adjusting the position of the electrode 66 mounted on the tip of the arm member 42.

Figure 33:
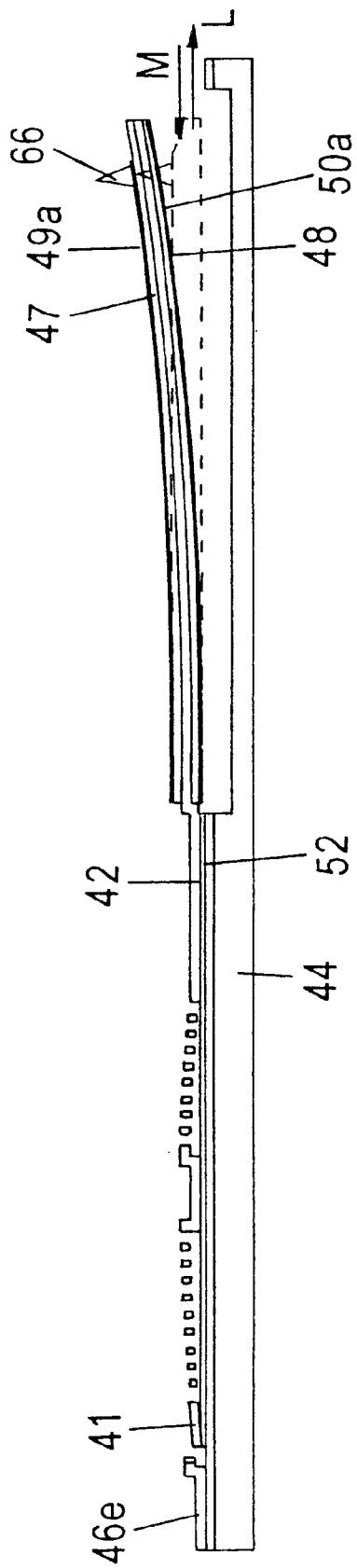

Suppose two different electric fields of opposing directions, for example, are applied to the piezoelectric layers 47 and 48, respectively, the arm member 42 will be warped vertically since the two piezoelectric layers situated on the upper and bottom surfaces of the arm member 42, respectively, have an expansion and contraction performance different from each other and, in addition, the arm member 42 is fixed at its one end only. Therefore, as illustrated in FIG. 33, the position of the electrode 66 at the tip of the arm member 42 can be adjusted very accurately along the direction vertical to the substrate 44.

When electric fields of the same direction are applied to the piezoelectric layers 47 and 48, respectively, the expansion and contraction performance of the piezoelectric layers as a whole will become the same and the arm member 42 will be expanding or contracting in the longitudinal direction thereof. Therefore, the position of the electrode 66 can be adjusted very accurately in either the arrow L or arrow M directions which are both in parallel with the substrate 44.

Further, on each of the piezoelectric layers 47 and 48 as shown in FIG. 14, electric fields of opposing directions are applied to the right and left sections, respectively. Then, since the expansion and contraction performance differs between the right and left sections of the arm member 42, the arm member 42 will be showing a right and left deformation to make it possible to adjust finely the position of the electrode 66 additionally in the directions of arrow V or arrow W, which are both in parallel with the substrate 44.

Lastly, when the excitation is removed at the same time from the electrodes 46a through 46i and the electrode 52, the ring member 41 will be readily returned to the initial position as shown in FIG. 12 due to the rebounding force of the elastically deformed beams 43a through 43c.

The features of the microactuator so far explained in the above exemplary example of the present invention will be described hereunder.

First, the rotational motion of the ring member 41 is efficiently converted to and expanded in the almost linear motion of the tip of the arm member 42, leading to realization of a high accuracy positioning mechanism.

Besides, since the ring member 41 is in rolling contact with the electrodes 46a through 46i and in rotation motion, the adverse effects due to friction are extremely small when compared with the first prior art example and the deterioration in performance caused by the mechanical wear is minimized for a longer life.

Since good electrical conduction between the displacement plate 40 and the shield layer on the substrate 44 is achieved securely through the beams 43a through 43c, the displacement plate 40 and the shield layer 44 are kept at the same potential at all times, resulting in highly reliable motional characteristics.

When the displacement plate 40 starts to move, its position restricting member 56 and the guide member 57 of the electrode 46a are electrostatically coupled and closely brought into contact with each other enabling the displacement plate 40 to return to its initial position securely.

On account of each respective electrode having the same circular arc configuration, the ring member 41 can be rotated in a step-like motion by exciting the neighboring electrodes through application of the same voltages and by shifting its position successively by the distance equal to one electrode spacing.

Further, by having the spacing pitch angles between two neighboring electrodes changed properly, it becomes possible to shift the position of the tip of the arm member 42 at an equal pitch, leading to realization of a higher accuracy positioning mechanism.

When the displacement plate 40 stops its motion, the arm member 42 can be attracted electrostatically by exciting the electrode 52 on the substrate 44 for enabling the arm member 42 to keep its position securely and enhancing the positioning reliability.

By having the arm member 42 of the displacement plate 40 constructed by piezoelectric bimorphs, it is possible to adjust finely the position of the arm member 42 in the directions vertical to the substrate 44. As a result, it is made possible to realize a positioning mechanism of a simple structure, yet having high accuracy.

When the displacement plate comes to an end of its motion, the displacement plate 40 can be readily returned to its initial position due to the rebounding force of the beams 43a through 43c simply upon removing the excitation from the electrodes 46a through 46i and the electrode 52.

Accordingly, the displacement plate 40 can be controlled with excellent reproducibility.

Furthermore, the high torque feature inherent to the wobble motion as described in the prior art example can be utilized. Also, every component element is laid out on a plane and the whole structure can be fabricated by the semiconductor processes for a design of reduced size and weight and also for excellent mass-producibility.

Moreover, it is possible to design a structure wherein an arm member is supported by an axis by means of a free joint, electrodes each having a circular arc configuration are arranged opposing to the tip of the arm member, said electrodes are excited alternatingly and the arm member's rotational motion is controlled for a positioning purpose. However, with this kind of structure, the speed reduction effect of the wobble driving will be lost, resulting in a problem of a reduced torque for driving the arm member.

Also, it is possible to think of a structure wherein the diameters of the ring member and the electrodes are made larger and inside thereof are arranged the arm member and its tip. When this structure is employed, a higher torque will be obtained but compactness can not possibly be achieved. The structure as described in the above exemplary embodiment of the present invention, wherein displacement due to rolling revolution is converted to almost linear displacement and also expanded, is more desirable for achieving compactness.

As explained in the foregoing, a first structure of the third exemplary embodiment of the present invention comprises a displacement plate which is provided with a ring member and an arm member put together, a plurality of electrodes arranged along the outer circumference of said ring member and a driving means whereby the position of the tip of said arm member put together with said ring member can be adjusted by having said ring member drawn to said electrodes alternatingly and rotated.

The foregoing structure has the operational effects as follows:

According to the present invention, a plurality of electrodes arranged along the circumference of a ring member of a displacement plate are applied with voltages selectively, said ring member is alternatingly attracted to said electrodes electrostatically and rotated to move the displacement plate as a whole. At this time, an arm member put together with the ring member is also moved and its tip follows an almost linear trace on account of its position situated outside said electrodes. Therefore, the rotational motion of the ring member is efficiently converted to an almost linear motion of the tip of the arm member, enabling said motion to realize a high accuracy positioning mechanism.

Also, a second structure of the third exemplary embodiment of the present invention comprises:

a displacement plate which is provided with a ring member and an arm member extending outwards from said ring member, both being put together;

a plurality of spiral beams located inside said ring member at positions symmetric with respect to the center of said ring member, each of which is connected at one end with an anchor formed solidly on a substrate and at the other end with a specified place of the inner circumference of said ring member to support said displacement plate elastically;

a plurality of electrodes arranged along the outer circumference of the substrate except for the area occupied by said arm member of said ring member; and a voltage application means whereby voltages are applied selectively to said respective electrodes to have said ring member attracted electrostatically and rotated for controlling the position of the tip of said arm member.

The foregoing structure has the operational effects as follows:

According to the present invention, the ring member of the displacement plate is fixed onto the substrate by means of beams for securely connecting electrically with said substrate, resulting in realizing a highly reliable motional performance. Also, on account of the rolling contact existing between the electrodes and the ring member while the latter is rotating, friction is made extremely small for achieving a longer life. Besides, the motion of the displacement plate causes the spiral beams to be deformed elastically and once the excitation imposed on the electrodes is removed the displacement plate will be readily returned to its initial position due to the rebounding force of the beams. Therefore, a positioning mechanism with high accuracy and excellent reproducibility can be realized. In addition, every component element can be laid out on a plane and semiconductor processes can be utilized in fabricating the actuator which excels in achieving a smaller size and light weight as well as mass-producibility.

Also, a third structure of the third exemplary embodiment of the present invention is the same as the second structure except for having additionally an electrode formed on the substrate at a place opposite to at least one portion of the arm member in order to have the position of said arm member maintained.

The foregoing structure has the operational effects as follows:

The arm member is attracted electrostatically towards the substrate through excitation of the electrodes, which are formed on the substrate and located at the position opposing to the arm member of the displacement plate, and held securely at that particular position for achieving highly reliable positioning.

Also, a fourth structure of the third exemplary embodiment of the present invention comprises:

a displacement plate provided with a ring member and an arm member deposited with piezo elements, both being put together;

a plurality of electrodes arranged along the outer circumference of said ring member;

a voltage application means whereby voltages are applied selectively to said respective electrodes to have said ring member attracted electrostatically and rotated for controlling the position of the tip of said arm member; and a means to drive said piezo elements for fine adjustment in position of the tip of said arm member.

The foregoing structure has the operational effects as follows:

Positioning of the entire displacement plate including the arm member can be first performed by electrostatic driving of the ring member and then finer positioning of the tip of the arm member and further positioning thereof in the directions vertical to the substrate can be performed through deformation of the arm member caused by driving the piezo elements which are deposited on the arm member. Thus it becomes possible to realize a fine positioning mechanism of a simple structure.

EXAMPLE 4

The structure of a microactuator as a fourth exemplary embodiment of the present invention will be briefly explained with the help of drawings in the following:

What differs from Example 3 is in having both the outer circumference of the ring member 41 and the inner circumference of the electrodes 46a through 46i prepared so as to show undulating contours.

Figure 34:
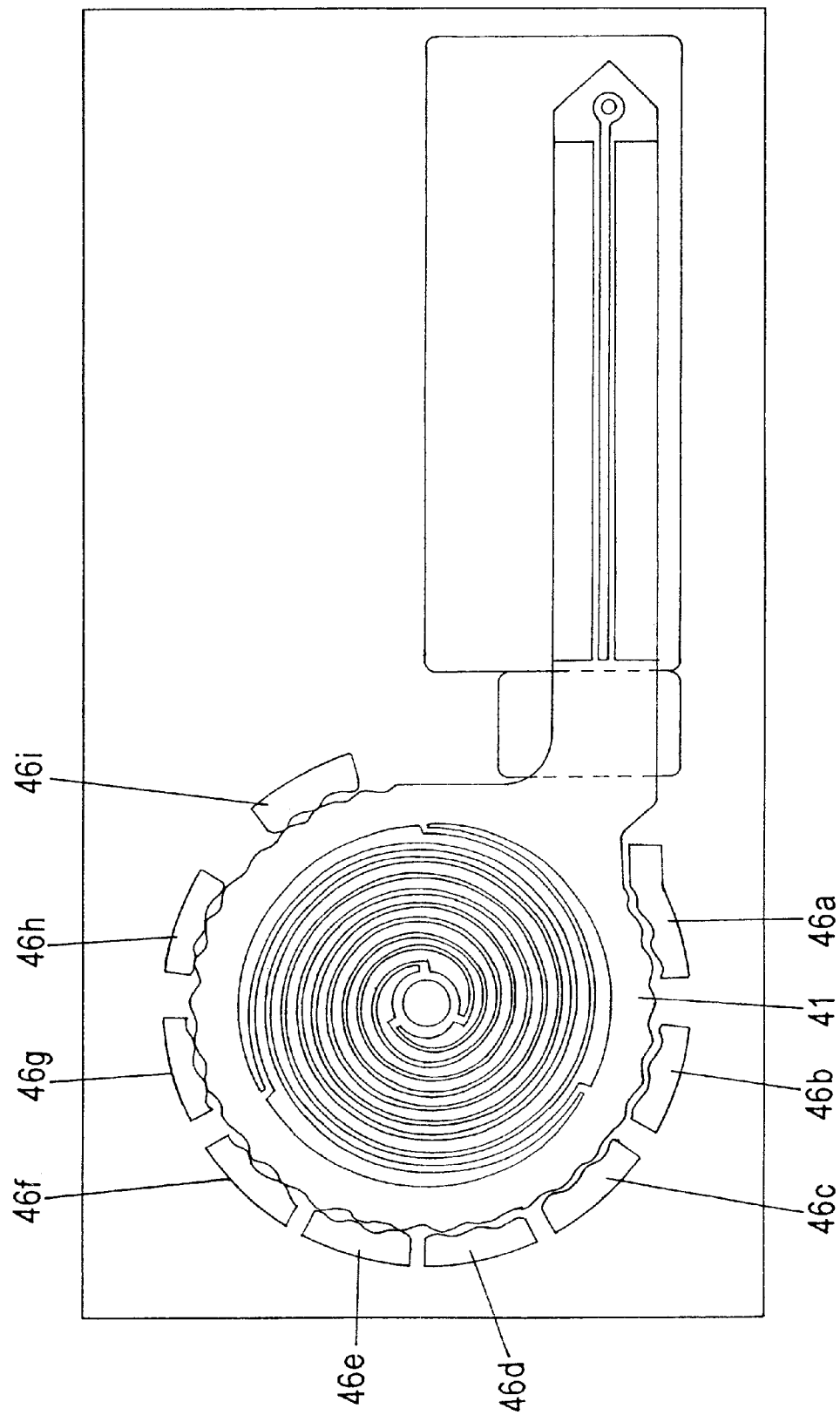
FIG. 34 is a schematic plan view to show the structure of a microactuator as a fourth exemplary embodiment (Example 4) of the present invention.

FIG. 34 is a plan view of said microactuator. Both the outer circumference of the ring member 41 and the inner circumference of the electrodes 46a through 46i show sinusoidal wave-like contours of the same wave length and amplitude against the respective reference circles. In addition, an insulating layer is formed on the inner circumference of each of the electrodes 46a through 46i in the same way as was in Example 3 but it is not shown in FIG. 34 because of the complexity involved with its expression.

Suppose the reference circles for the outer circumference of the ring member 41 and for the inner circumference of the electrodes 46a through 46i are 272 µm and 280 µm in diameter respectively, for example. Since there is a gap of 4 µm between the two reference circles, there will not be any contacting points between the two kinds of circumference as long as the amplitude of the sinusoidal wave is 1.5 µm. Also, by splitting the circumference of the two reference circles into 34 and 35 sections respectively, sinusoidal wave forms having the same wave length (25.1 µm) can be realized.

The fabrication processes of the microactuator of this exemplary embodiment are the same as employed in Example 3 except for the process (1) as shown in FIG. 26, wherein the mask pattern to be used in patterning by reactive ion etching (RIE) has to be changed.

Next, the operational performance of the microactuator as described in the present exemplary embodiment will be explained with the help of FIG. 35 and FIG. 36. FIG. 32 also has to be referred to.

Figure 35:
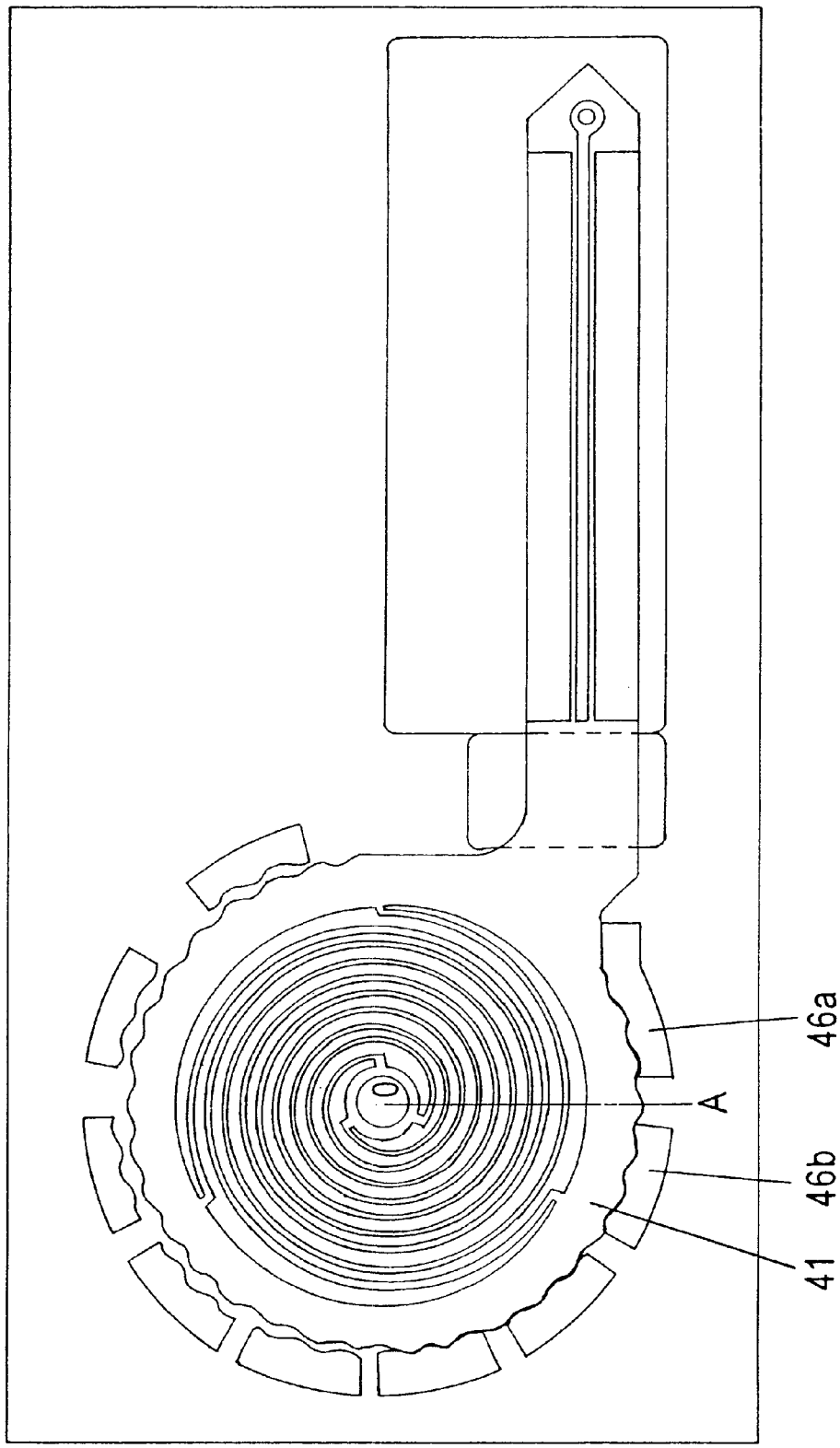
FIG. 35 and FIG. 36 are schematic plan views to explain the operation of the microactuator of Example 4.
Figure 36:
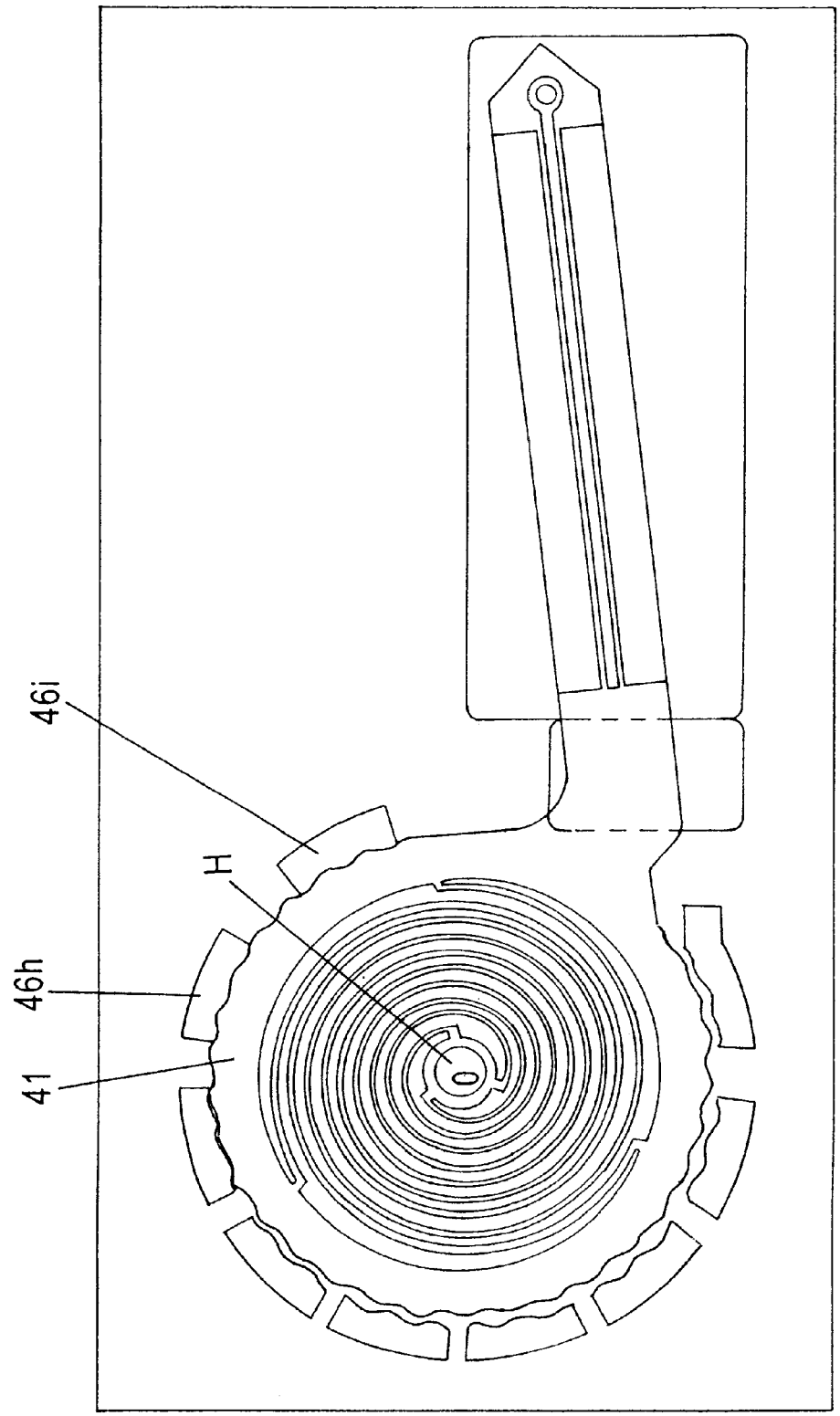

First, upon application of the same voltage to the electrodes 46a and 46b, the ring member 41 will be attracted electrostatically towards said electrodes and moved in the direction OA as indicated in FIG. 35 until it comes into contact with the insulating layer (not shown in FIG. 35) of the electrode surface. At this moment, the position restricting member 56 of the displacement plate 40 hits and stays in contact with the guide member 57 of the electrode 46a and also the outer circumference of the ring member 41 comes closely into contact with the electrode 46b, thus enabling the displacement plate 40 to be guided to a specified position for its initialization. Also, the electrode 66 mounted on the tip of the arm member 42 is guided to the position 67a as indicated in FIG. 31.

According to the same way as was in Example 3, as the pair of electrodes to be excited is shifted by one electrode length alternatingly, the ring member 41 will be revolving in the direction of an arrow X by being attracted by the excited two electrodes successively. When voltages are lastly applied to the electrodes 46h and 46i, the electrode 66 mounted on the tip of the arm member 42 will be guided to a position 67h as indicated in FIG. 32.

As the ring member 41 is moved by rotating, the extent of deformation of the beams 43a through 43c will be increasing and the rebounding energy to push back the ring member 41 will be becoming greater. As a result, slipping will be likely to occur at the contacting place between the ring member 41 and the electrodes 46a through 46i.

In the case of the microactuator of the present exemplary embodiment, the displacement plate 40 is moved while the undulated outer circumference of its ring member is engaged with the undulated inner circumference of the electrodes. Therefore, slipping does not occur between the contacting surfaces of the ring member 41 and the electrodes 46a through 46*i* and the displacement plate 40 can be moved accurately and securely.

Also, the electrostatic force working as the prime motive force is proportional to surface areas. By employing an undulated contour as the inner circumference of the electrodes, the contacting surfaces will be increasing, also resulting in securing the surest driving of the displacement plate 40.

Therefore, according to the present exemplary embodiment, the features on top of the ones as described in Example 3 can contribute to realization of a microactuator of much higher reliability.

EXAMPLE 5

A fifth exemplary embodiment of the present invention, which corresponds to claims 16 and 17 will be explained hereunder.

Figure 37:
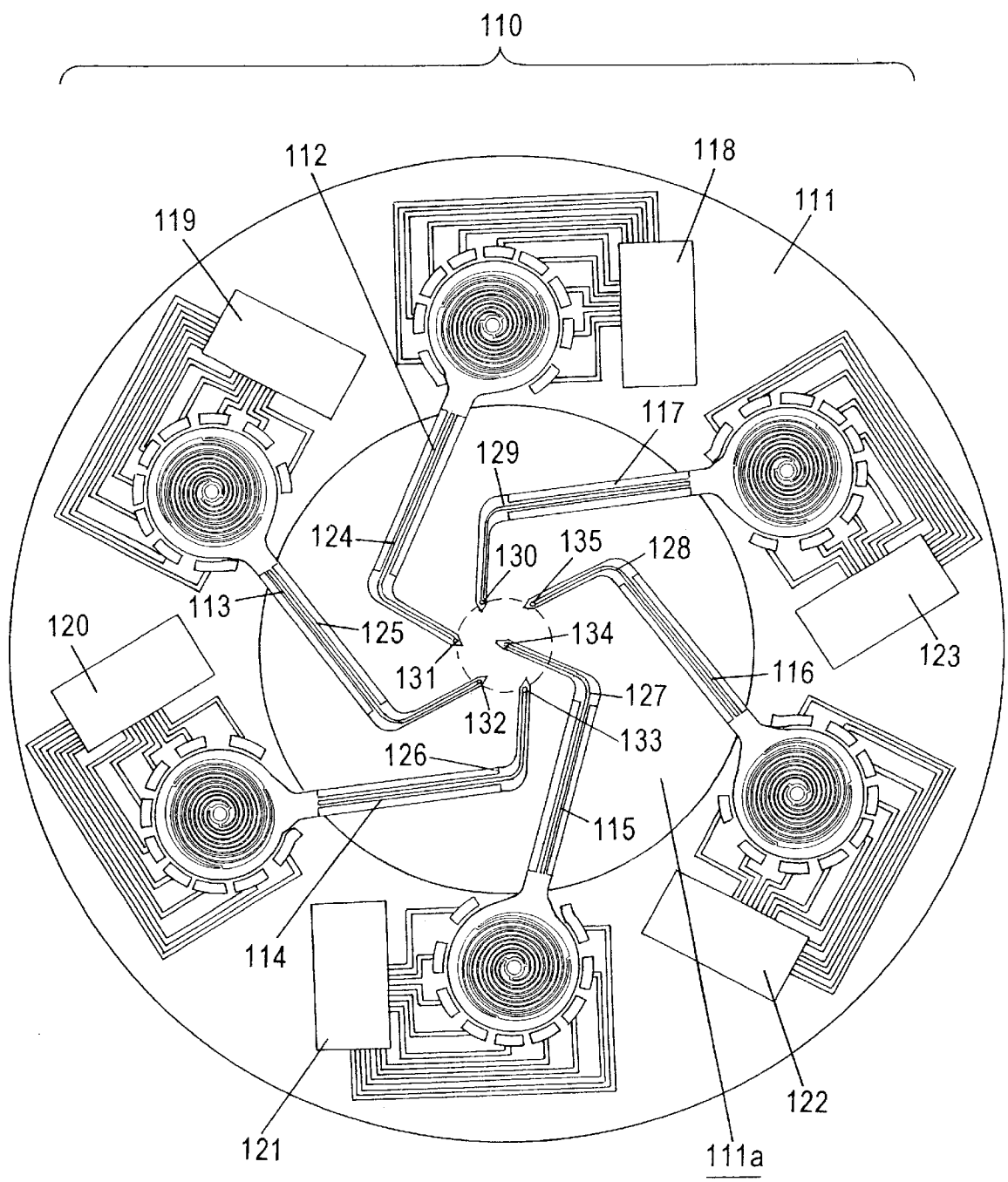
FIG. 37 is a schematic plan view to show the structure of a multi-probe head for a scanning probe microscope as a fifth exemplary embodiment (Example 5) of the present invention's microactuator.
Figure 38:
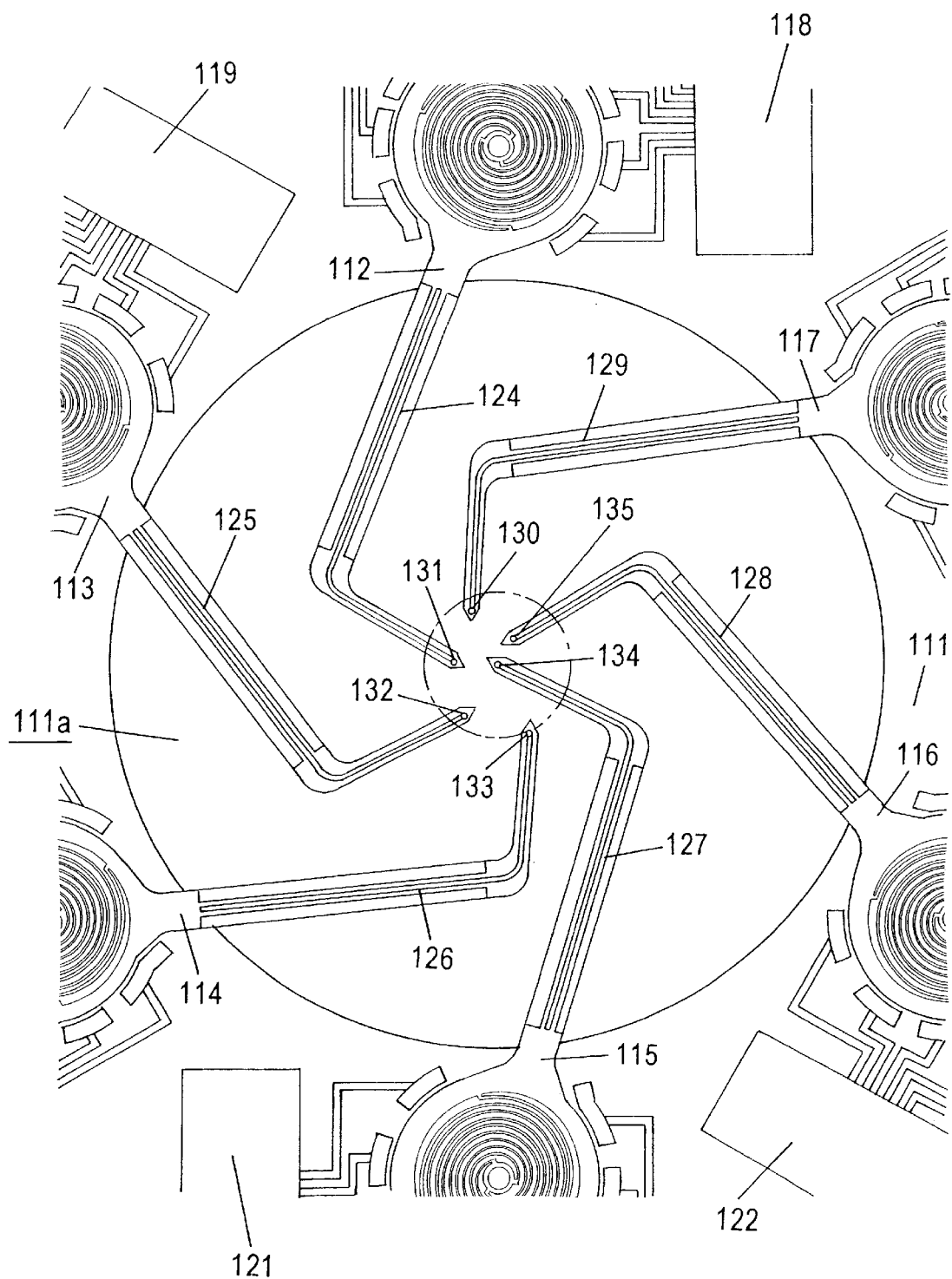
FIG. 38 is an enlarged view to explain the operation of the microactuator of Example 5.

FIG. 37 is a schematic plan view to show the structure of a multi-probe head for a scanning probe microscope as an exemplary embodiment of the present invention's microactuator and FIG. 38 is an expanded plan view for explaining how it is operated. The dimension of the whole structure is very small measuring 2 to 3 mm in outer diameter.

As shown in FIG. 37, a multi-probe head 110 is constructed in such a way that six probes 112 through 117 are arranged along the circumference of a silicon substrate 111. Each of the probes 112 through 117 is provided with one of the driving circuits 118 through 123, which are created on the silicon substrate 111 together with wirings and also the probes 112 through 117 by the semiconductor processes.

Item 111*a* is a cavity situated in the central portion of the silicon substrate 111, which is structured so as not to interfere with the motion of arms 124 through 129 of the probes 112 through 117, respectively. Also, probing needles 130 through 135 are mounted on the tip of the arms 124 through 129, respectively.

As shown in FIG. 37, the probes 112 through 117 are located at positions which are symmetric with respect to the center of the substrate 111 and, in addition, are able to rotate a little. In FIG. 37, the probe 115 only is shown to have rotated counter-clock wise by about 8 degrees. As a result, the probing needle 134 at the tip of the arm 127 is located just at the center of the cavity 111. At this position, measurement of a specimen (not shown in the drawings) can be conducted by means of the probing needle 134. The other probing needles 130 through 133 and 135 are situated on a circumference indicate by a one dot broken line and in a waiting mode of measurement.

As a matter of course, the same operation is applicable to any of all the probes 112 through 117. For example, the probe 115 is rotated clock wise by about 8 degrees and the probe 113 is rotated this time counter-clock wise by about 8 degrees to bring the probing needle 132 at the tip of the arm 125 to the center for enabling the probing needle 132 to perform measurement of a specimen.

By having the probe 113 prepared for measurement according to a system different from that of the probe 115 (the probe 113 for STM and the probe 115 for AFM, for instance), the same place of a specimen can be observed multi-purposely according to diversified methodology.

It has been so far indicated that the positions of the probes 112 through 117 can be controlled with considerable freedom by the drive circuits 118 through 123, though a detailed description will be given to the rotating motion of the probes later. Besides, any positions can be taken by a probe as far as the positions fall on the path of its rotating motion and six different probing needles 130 through 135 can be moved to various places on a specimen at the same time.

In FIG. 38, how this is performed will be shown by an expanded illustration. The arms 124 through 129 fix individually the positions of the corresponding probing needles 130 through 135 and even if all the probes 112 through 117 function according to the same measurement system, an extremely dynamic observation of an object can be realized. (In FIG. 38, the probes 114 and 115 are in the same state as were in FIG. 37 and the probe 114, e.g. the probing needle 133 at the tip of the arm 126 only is still in a waiting mode of measurement.)

Next, with the help of FIG. 39 through FIG. 41, a detailed description of the structure of each of the probes 112 through 117 will be made. Since all the probes 112 through 117 have the same structure, an explanation will be made on the probe 112 on behalf of all of the other probes. Also, as stated before, each respective probe is essentially of the same construction as the microactuator of the third exemplary embodiment of the present invention and the explanation of the probes will be made as simple as possible.

Figure 39:
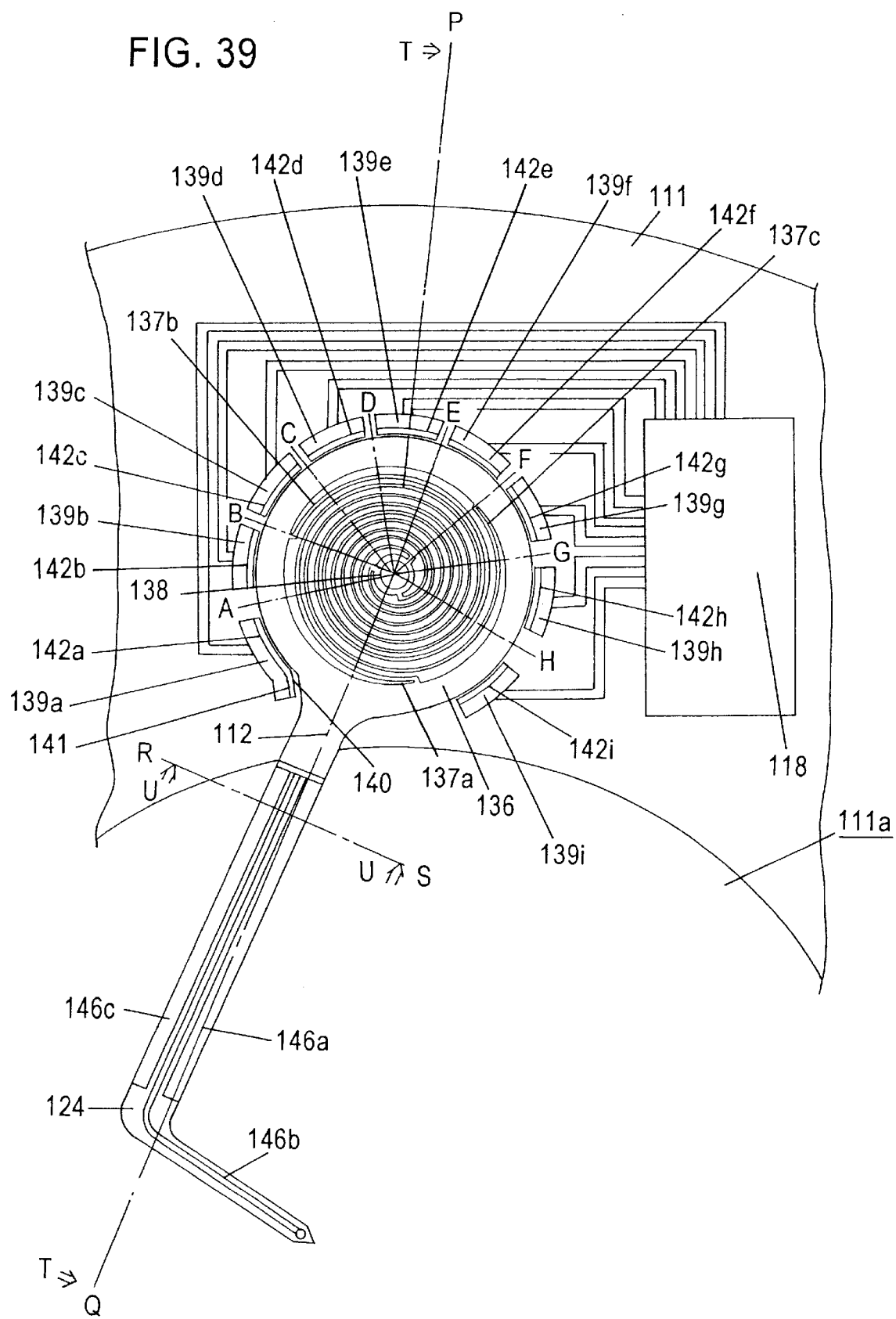
FIG. 39 is a schematic plan view to show the component elements of the probe of the microactuator of Example 5.

FIG. 39 is a schematic plan view to show the structure of the probe 112. FIG. 40 is a longitudinal sectional view of said probe along the broken line of POQ and looked in the direction T as shown in FIG. 39. FIG. 41 is a traverse sectional view of said probe along the broken line of RS and looked in the direction U as shown in FIG. 39.

Figure 40:
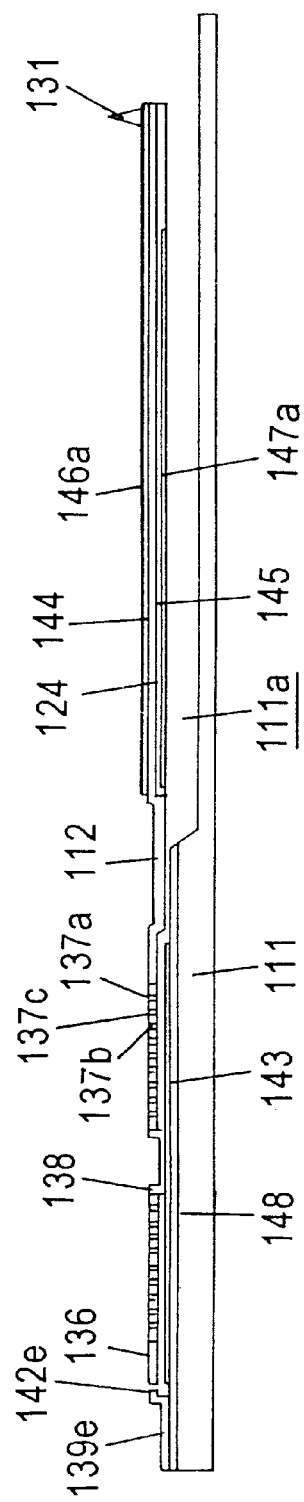
FIG. 40 is a longitudinal sectional view along the broken line of POQ and looked in the direction of an arrow T as shown in FIG. 39.
Figure 41:
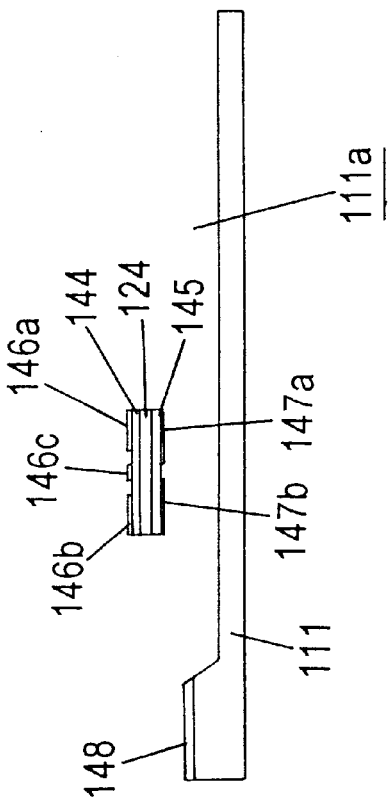
FIG. 41 is a traverse sectional view along the broken line RS as shown in FIG. 39.

As illustrated in FIG. 39 through FIG. 41, the probe 112 is formed of an electroconducting thin plate-like material and comprised of a gaff-like arm 124 and a ring 136, both being put together. As mentioned before, the probe 112 is as a whole rotated and this is due to the rotational motion, which the ring 136 has been brought into electrostatically, and also the arm 124 is piezoelectrically driven by piezo elements as explained later.

There are three narrow beams 137*a* through 137*c* of an identical spiral configuration attached to the inner circumference of the ring 136 at three different positions thereof separated from each other by 120 degrees and located symmetrically from each other. One end of these beams is fixed to an anchor 138 which is mounted on the substrate 111 and standing thereupon. In other words, the probe 112 is supported by the anchor 138 elastically by means of the beams 137*a* through 137*c*.

On an area of the silicon substrate 111 extending beyond the outer circumference of the ring 136, nine electrodes 139*a* through 139*i* (only the electrode 139*e* is shown in FIG. 40) are laid out along a circumference with a small gap left between the electrodes 139*a* through 139*i* and the ring 136. The inner circumference of each respective electrode except for the electrode 139*a* is of one identical circular arc configuration. However, each respective electrode is not located at an equal spacing pitch angle from each other. Lines OB through OH express the reference lines, with respect to which the two neighboring electrodes are symmetric and the spacing pitch angles ∠AOB, ∠BOC, ∠COD, ∠DOE, ∠EOF, ∠FOG and ∠GOH are not the same. Also, the electrodes 139*a* through 139*i* are connected by wiring with a voltage supply means (not indicated in FIG. 37) so that arbitrarily selected voltages can be applied to the electrodes.

The probe 112 has a concave position restricting member 140 at the place opposite to the electrode 139*a*. The electrode 139*a*, instead, has a convex guide member 141 which comes together with the position restricting member 140 and directs the motion of the probe 112. Besides, there are insulating layers 142a through 142i formed on the inner circumference of each of the electrodes 139a through 139i to prevent the electrodes from making a direct electrical contact with the ring 136.

Also, there is an electroconducting shield layer 143 of almost the same shape as the ring 136 placed between the anchor 138 and the silicon substrate 111 so as to maintain an electrical connection with the ring 136 at all times. Besides, an insulating layer 148 is formed over the surface of the silicon substrate 111.

The arm 124 is sandwiched between thin film piezo elements 144 and 145. In addition, electrodes 146a through 146c are formed on the thin film piezo element 144 and electrodes 147a and 147b of almost the same shape as the electrodes 146a and 146c are formed on the bottom of the thin film piezo element 145. Further, a cone shaped probing needle 131 is created on the electrode 146c.

Besides, the electrodes 146a through 146c and 147a through 147c can be applied with arbitrarily selected voltages through wirings from a voltage supply means although it is not shown in the drawings.

Since the fabrication processes for said probe 112 are the same as employed for the third exemplary embodiment of the present invention, the explanation thereof will be omitted.

Next, the operation of the probe 112 thus structured will be described hereunder with the help of FIG. 42 through FIG. 44.

Figure 42:
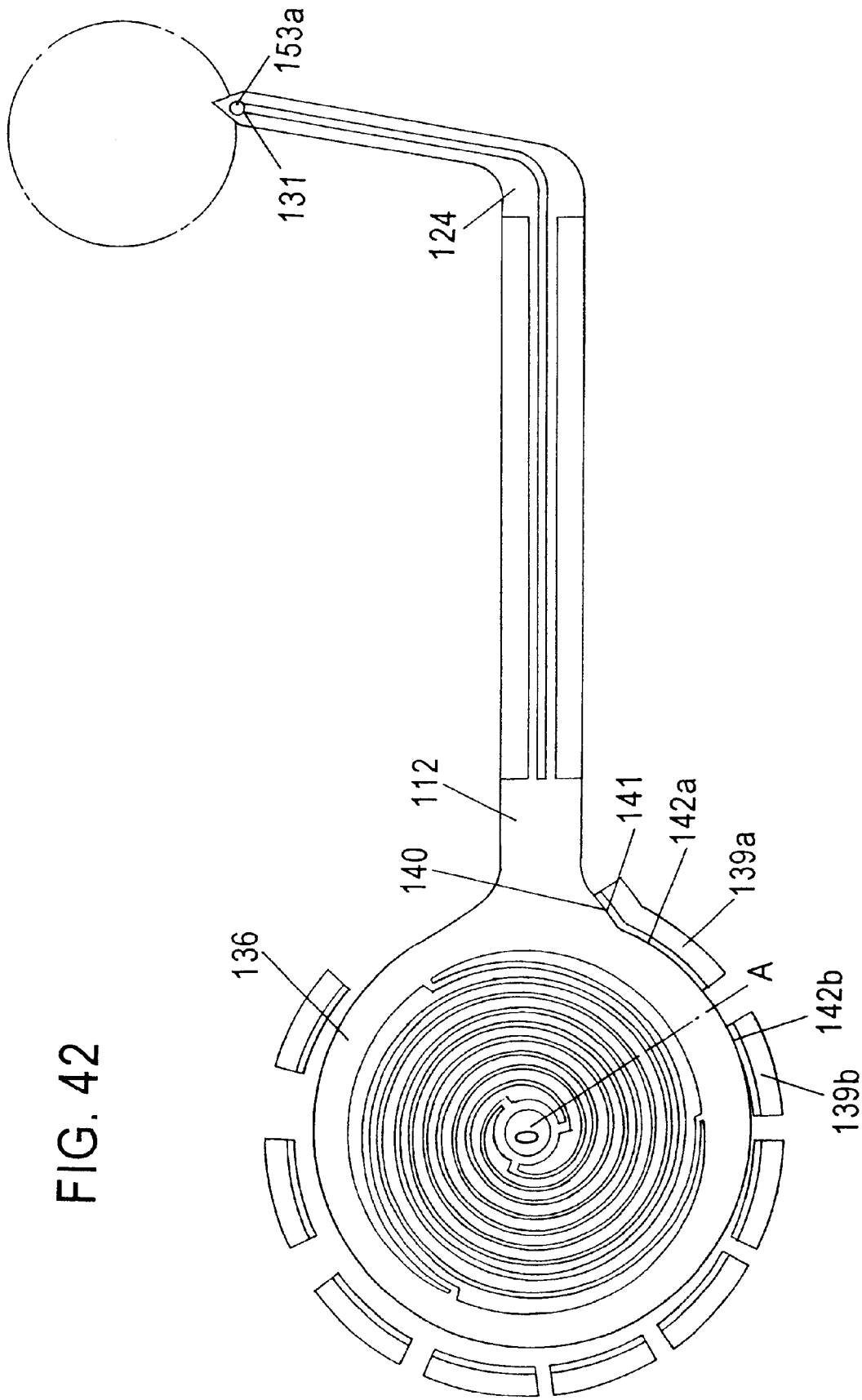
FIG. 42 through FIG. 44 are schematic plan views to explain the operation of the probe head of Example 5 for a scanning probe microscope.

When the electrodes 139a and 139b are excited by application of voltages of the same magnitude, the ring 136 of the probe 112 will be attracted electrostatically by said two electrodes 139a and 139b simultaneously and moved in the direction of OA as indicated in FIG. 42 until it comes into contact with the insullating layers 142a and 142b. At this time, the position restricting member 140 of the probe 112 hits and comes into contact with the guiding member 141 on the electrode 139a and also the periphery of the ring 136 comes into close contact with the electrodes 139a and 139b. As a result, the probe 112 will be guided to a specified position for its initialization. Consequently, the probing needle 131 mounted at the tip of the arm 124 will be guided to a position 153a as indicated in FIG. 42, e.g. a position (located on a circumference indicate by a one dot broken line) of a waiting mode for measurement in FIG. 37 and FIG. 38.

Figure 43:
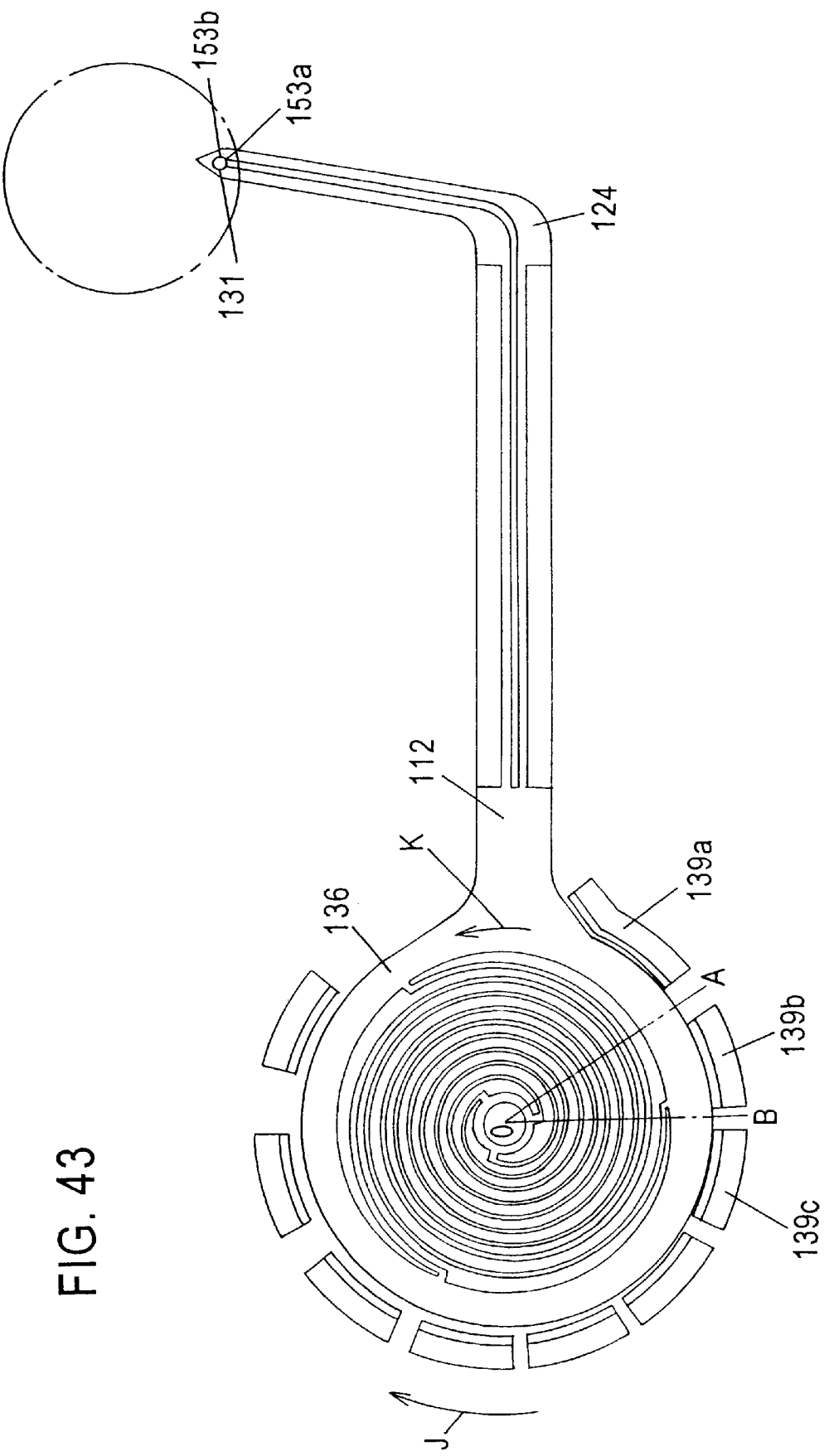

Next, when the excitation of the electrode 139a is removed and voltages are applied to the electrodes 139b and 139c, the ring 136 will be attracted electrostatically by the two newly excited electrodes 139b and 139c as shown in FIG. 43 and moved by rotating to a position which is symmetric with respect to the line OB. Then, the probing needle 131 will be guided to a position 153b as indicated in FIG. 43, e.g. a position (located inside a circle indicated by a one dot broken line) of a ready mode for measurement in FIG. 37 and FIG. 38.

As the pair of electrodes to be excited is shifted by one electrode length alternatingly, the ring 136 will be revolving in the direction of an arrow J by being attracted by the excited two electrodes successively. However, as the ring 136 is moved while it is in rolling contact with the electrodes 139a through 139i, it will be rotating by the difference in length between its outer circumference and the inner circumference laid out by the electrodes 139a through 139i. The direction of its rotation will be in the direction of an arrow K or in the direction opposite to its revolution.

This performance represents what is referred to as the wobble driving system, which is characterized by realizing a torque of revolution enlarged proportionately according to the ratio of speed reduction since the speed of revolution is greatly reduced in comparison with that of rotation, achieving the same effect as speed reduction.

Figure 44:
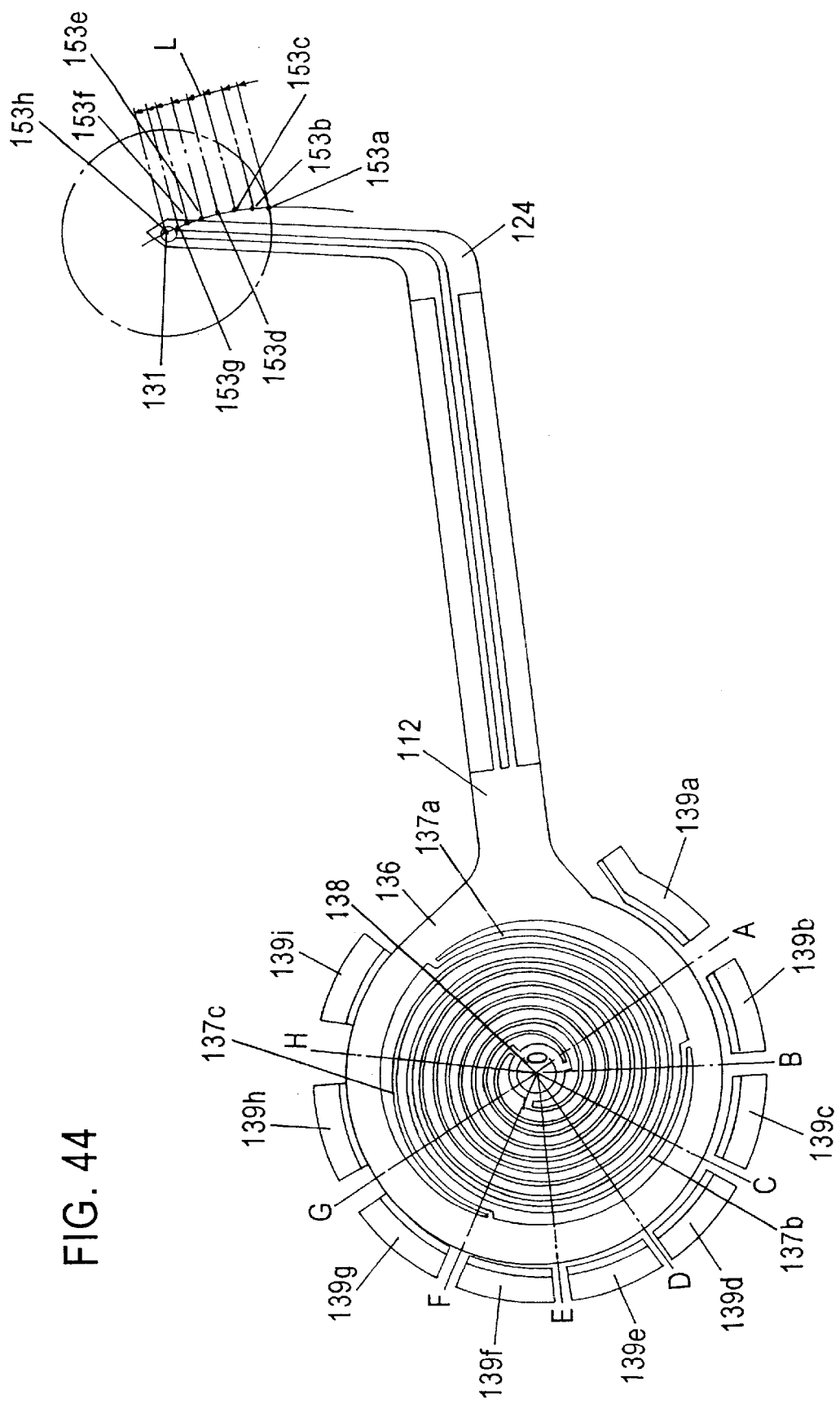

When voltages are lastly applied to the electrodes 139h and 139i, the ring 136 will be moved to a position which is symmetric with respect to the line OH as indicated in FIG. 44. Then, the probing needle 131 will be guided to a position 153h as indicated in FIG. 44, e.g. the center position (the center of a circle indicated by a one dot broken line) where the probing needle is ready for measurement. Thus, the rotational motion of the ring 136 is efficiently converted to an almost linear motion of the tip of the arm 124.

On account of the identical circular arc configuration that each respective circumference of the electrodes 139a through 139i assumes, the ring 136 will be attracted electrostatically to the center of two neighboring electrodes upon application of voltages of the same magnitude to said two electrodes. Therefore, by shifting the electrode pairs to be excited by one electrode length successively, it will be possible to give a step-like rotating motion to the ring 136.

Further, by having the rotational angle of the ring 136 varied most suitably through alteration of spacing pitch angles between two neighboring electrodes, it will be made possible to have the tip of the arm 124 shifted at an equal pitch in a specified direction (the direction L in FIG. 44, for example). Accordingly, it will be possible to realize a high accuracy and highly dependable positioning mechanism, whereby the probing needle 131 can be guided at an equal pitch with respect to the line L to the position 153a (in a waiting mode for measurement) through the position 153h (the center position) as illustrated in FIG. 44.

The features associated with the foregoing structure are common to some extent with those as described in the third exemplary embodiment of the present invention and only a brief explanation will be given here.

On account of the wobble driving system as employed with said structure, the adverse effect due to friction has been made extremely small with a resultant contribution to reduced deterioration in performance and longer life.

Also, the stabilized motion due to an appropriate application of holding force and the motion of recovering the initial position upon removal of electrical excitation can be achieved with said structure.

In addition, said structure has the advantage of gaining highly reliable driving characteristics.

Besides, by having the arm 124 grounded and the voltages across the electrodes 146a, 146b, 147a and 147b controlled, it will be possible to deform the thin film piezo elements 144 and 145 with much freedom, enabling the probing needle 131 on the tip of the arm 124 to adjust its position finely. A detailed explanation of above will be omitted.

As explained in the foregoing, the structure of the fifth exemplary embodiment of the present invention includes a multi-probe head, wherein a plurality of probes, each having a probing needle on the tip thereof, are arranged along a circumference and each respective probe comprises:

a displacement plate put together with a ring member and an arm member, which extends outwards from said ring member, has piezo elements deposited on the both sides and has said probing needle on the tip;

a plurality of electrodes arranged on a substrate along the outer circumference of said ring member except for the place where said arm member is located;

a voltage application means whereby voltages are applied selectively to said electrodes to have said ring member attracted electrostatically by the electrodes imposed with said voltages and moved by rotating; and a means to drive said piezo elements so as to have a specimen scanned by said probing needles.

The foregoing structure has the operational effects as follows:

According to the present invention, an actuator as used as the probe is as a whole moved by rotating through selective application of voltages to the electrodes arranged along the outer circumference of the ring member. At this time, the probing needle on the tip of the arm member will be moved following an almost linear path. Accordingly, it will be made possible for the probing needle to move easily on a specimen. This makes it also possible to have the plurality of probes arranged in circle exchanged efficiently or to have them moved on the specimen for scanning a plurality of places thereupon.

EXAMPLE 6

A sixth exemplary embodiment of the present invention will be explained hereunder.

Figure 45:
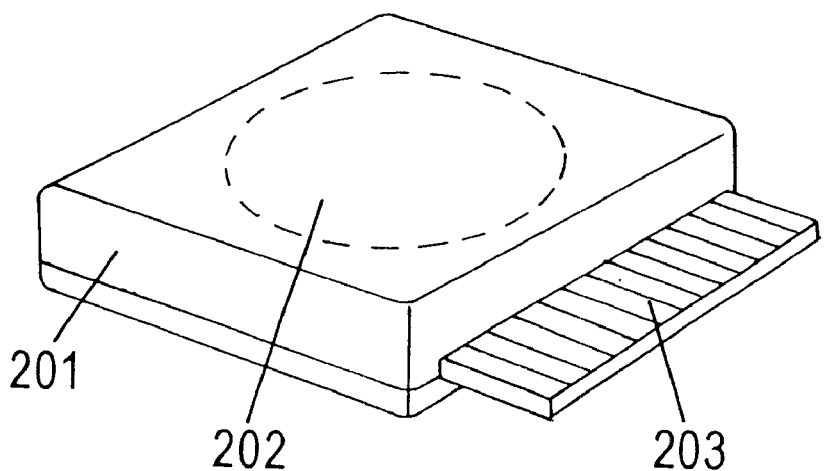
FIG. 45 is a Perspective view of the recording and reproducing equipment that comprises pickup heads as a sixth exemplary embodiment (Example 6) of the present invention's microactuator.

FIG. 45 is a perspective view of recording and reproducing equipment which uses pickup heads composed of a microactuator as described in the exemplary embodiments of the present invention.

A 7.2 mm diameter disc composed of polysilicon with boron added is contained inside a casing 201 of about 10 mm square and a terminal board 203 only extends out of the casing. The total thickness of the casing is about 2 mm. The whole structure looks like a hard disc unit but there exists no concept of an assembly unit. On account of the dimension of 10 mm square, it is inherently impossible for the concept of assembly, adjustment, or the like to get in.

When a charge injection recording of probing needle system as was introduced as the conventional technology is performed with the foregoing equipment, it will be possible to record about 800 M byte on a disc measuring 7.2 mm in diameter. The equipment is extremely simple in construction on account of a mere probing needle used as a head, enabling us to build such an extremely compact disc drive.

Figure 46:
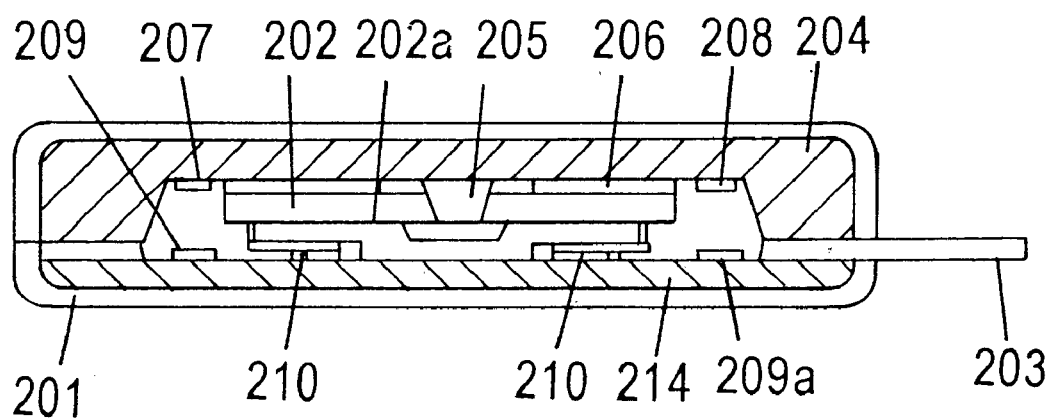
FIG. 46 is a cross-sectional illustration of the recording and reproducing equipment that consists of pickup heads of Example 6.

Now, the internal structure of said recording and reproducing equipment is shown in FIG. 46.

There are an upper substrate 204 and a lower substrate 214, both formed of single silicon crystal, inside the casing 201. These two substrates are joined with each other with a terminal board 203 held between said two substrates and covered by the casing 201 completely and sealed off from outside. Therefore, the inside of the casing 201 can be kept in arbitrary conditions, such as under reduced ambient pressure or in vacuum or in nitrogen gas.

A disc 202 is held on the upper substrate 204 by means of a center bush 205 so that it can rotate. a piezoelectric thin film 206 is formed on the upper substrate 204 and when it is driven by ultrasonic waves, the disc 202 can be rotated. An oxide layer and a nitride layer are formed on the surface 202a of the disc 202 so that a charge injection recording of probing needle system can be performed. Control circuits 207 and 208 are created on the upper substrate 204.

A plurality of a pickup head 210 is formed on the lower substrate 214 opposite to the surface 202a of the disc 202. The pickup head 210 is of the same structure as described in the third exemplary embodiment of the present invention and an explanation thereof will be reduced to a minimum as was in the fifth exemplary embodiment of the present invention.

Also, control circuits 209 and 209a are created on the lower substrate 214.

Figure 47:
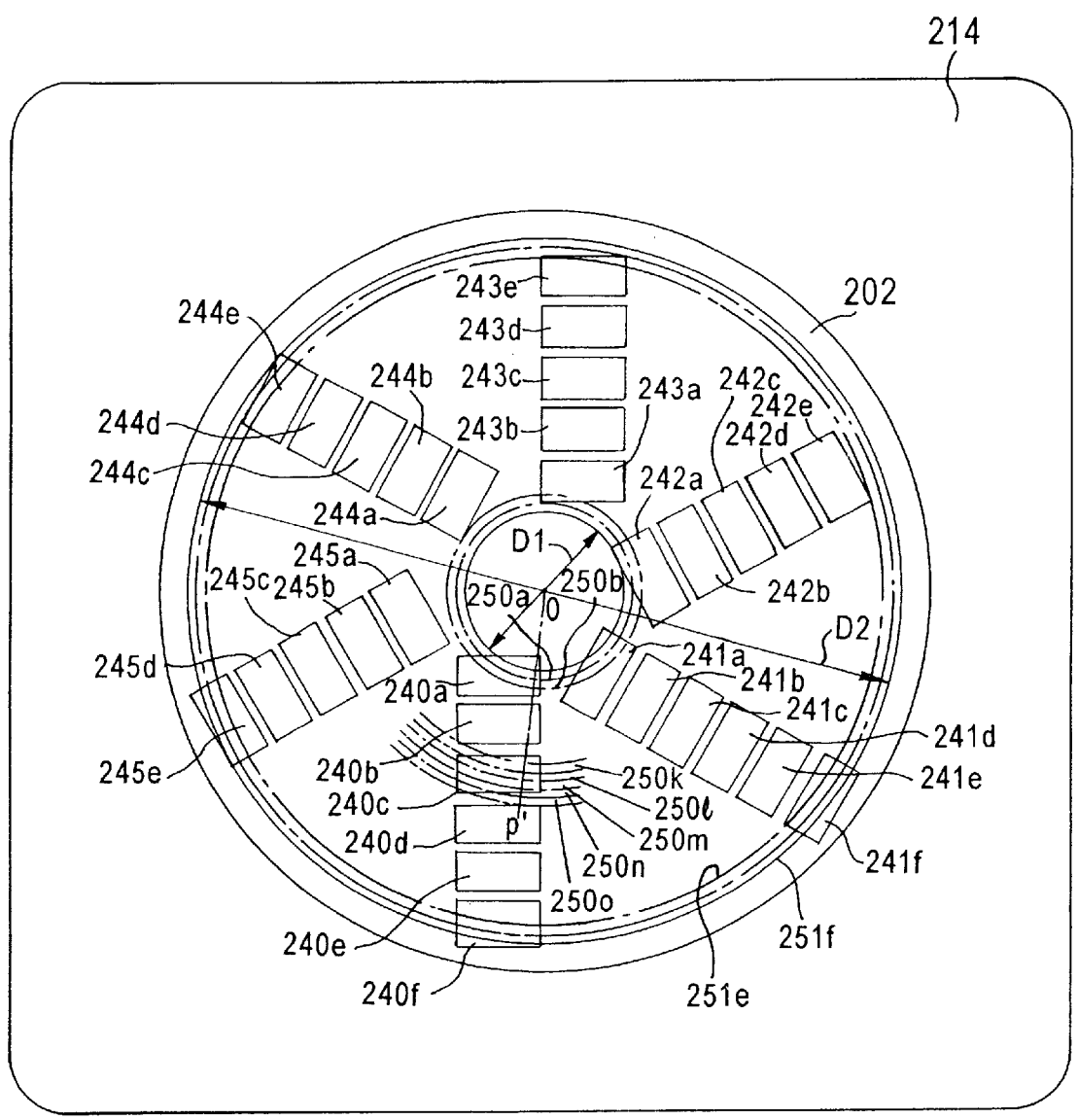
FIG. 47 is a plan view to show how the pickup heads of Example 6 are put in position.

How the pickup heads using microactuators of the present exemplary embodiment are arranged and also how the pickup heads make access to the disc will be explained hereunder with the help of drawings. FIG. 47 is a schematic plan view to show the positional relationship between the disc 202 and each respective pickup head and FIG. 48 is a partially enlarged plan view to show the pickup head 240c of FIG. 47 and its vicinity.

As the recording method, a charge injection recording of probing needle system is to be employed here. According to this method, the recording pit diameter measures 75 nm and a recording density per area corresponding to 180 bit/$\mu m^2$ can be gained. When recording and reproducing are performed on one side of a 7.2 mm dia. disc, for instance, the recording capacity will be as much as 800 M byte, provided the recordable area extends from an inner diameter D1 (1.6 mm) to an outer diameter D2 (6.72 mm).

To begin with, the physical format on the disc 202 as used with the present exemplary embodiment will be briefly explained. As shown in FIG. 47, the disc 202 is divided into 32 areas (referred to as cylinders hereafter) 250a through 250z and 251a through 251f, which are equally spaced in the radius direction, within the limits of the aforementioned recordable area. Incidentally, the width of each respective cylinder is 80 $\mu$m. Further, each cylinder is divided into 8 areas (referred to as sectors hereafter), each measuring 10 $\mu$m in width and being equally spaced from one another in the radius direction of the disc 202.

Figure 48:
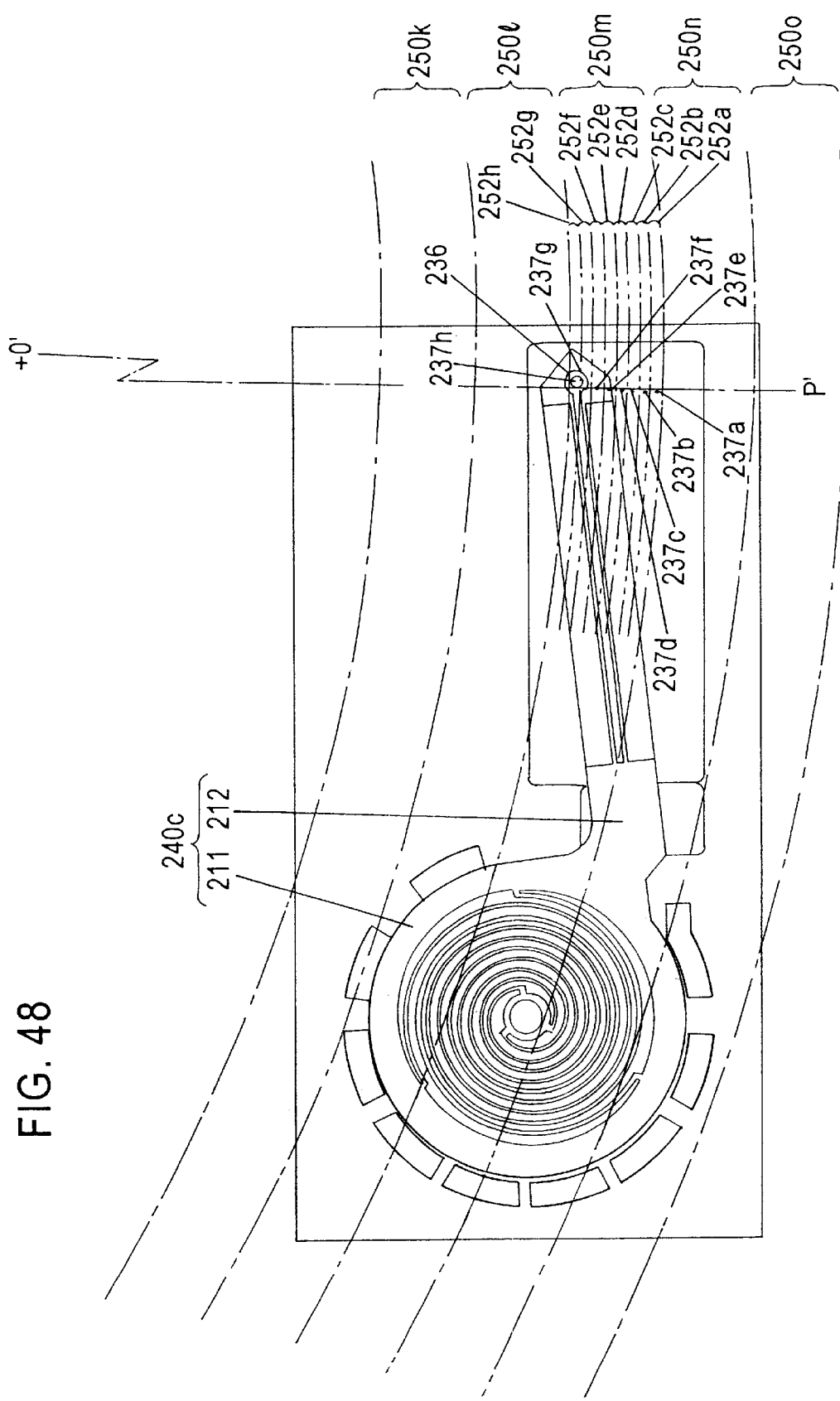
FIG. 48 is a partially enlarged plan view to show a positional relationship between the pickup head of Example 6 and the disc.

As illustrated in FIG. 48, the cylinder 250m, for instance, is divided into sectors 252a through 252h. Furthermore, each sector is divided into 132 tracks, which are again equally spaced in the same direction as above (75 nm in width, not shown in FIG. 48).

Now, six blocks of pickup heads, each consisting of 240a through 240f, 241a through 241f, 242a through 242e, 243a through 243e, 244a through 244e, and 245a through 245e, respectively, are arranged on the substrate along six different radii, which extend from the center of the disc 202 in six radial directions, at an equal pitch (480 $\mu$m) between one pickup head and another in the quantities of 5 or 6. All of these pickup heads have a probing needle 236 for recording and reproducing, and also created by integration on the lower substrate 214. In addition, the positions of the pickup heads of the neighboring blocks, 240a through 240f and 241a through 241f for example, are shifted by 80 $\mu$m in the distance away from the center of the disc 202 between one another. In other words, the pickup heads 240a, 241a, 242a, 243a, 244a, 245a, 240b, 241b . . . are located in this order by 80 $\mu$m away from the center of the disc 202 in the radial directions and 32 pickup heads all together are arranged in this way.

Therefore, by selecting any arbitrary pickup head electrically, it will be possible to make an automatic access to each respective cylinder. For example, the pickup head 240c is responsible for recording and reproducing in the cylinder 250m. The explanation that follows hereunder will be made in relative to said pickup head 240c.

The access to the eight sectors 252a through 252h in the cylinder 250m is conducted by applying a wobble drive electrostatically to the ring member 211 of the pickup head 240c, as explained before. The positions 237a through 237h in FIG. 48 show how the probing needle changes its position and the path thereof is almost the same as the line O'P' passing through the center O' of the disc 202. Besides, each of said positions is located almost in the center of the sectors 252a through 252h, respectively. At this time, the movement pitch of the probing needle 236 is 10 um, which is the same as the width of the sector, and the movement range is ±35 μm.

Figure 49:
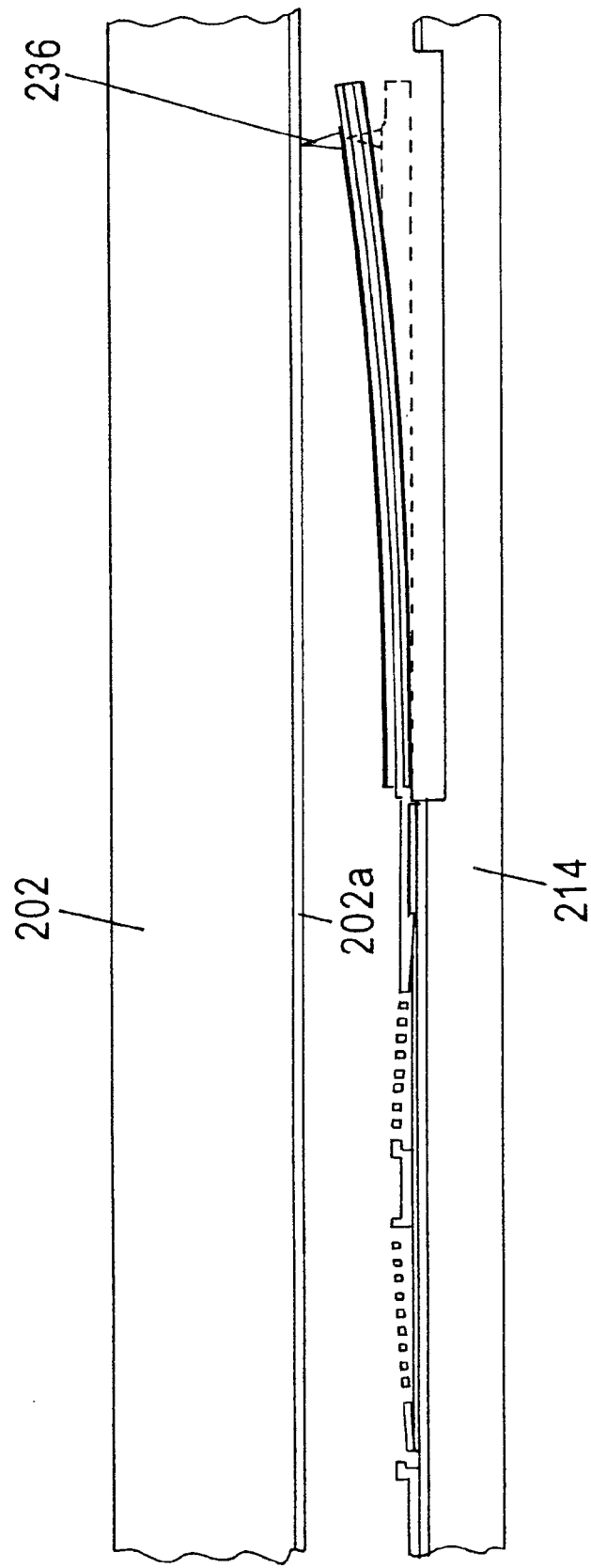
FIG. 49 is a cross-sectional view of the pickup head of Example 6.
Figure 50:
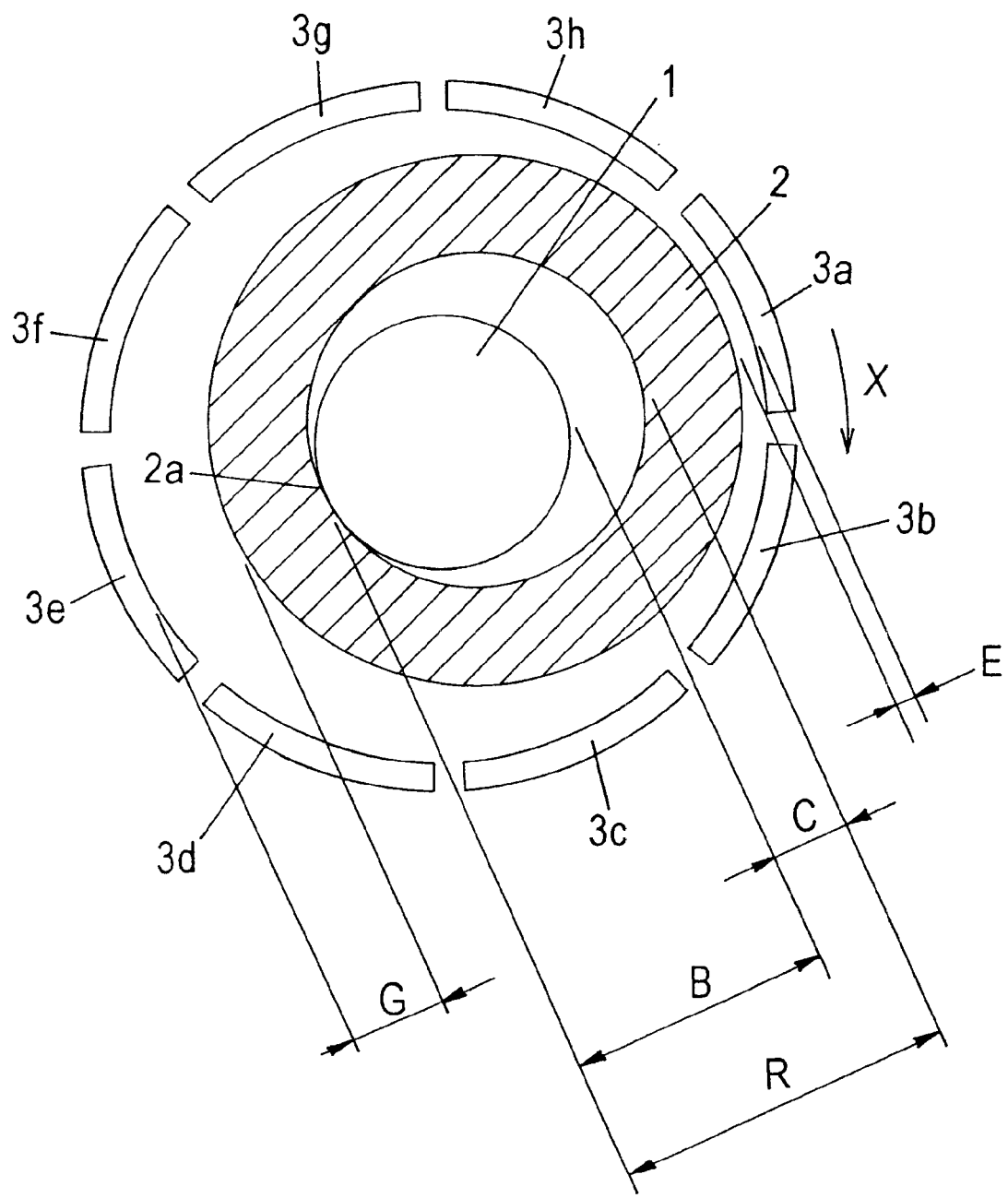
FIG. 50 is a schematic plan view to show the structure of an electrostatic micro wobble motor as a first prior art example.
Figure 51:
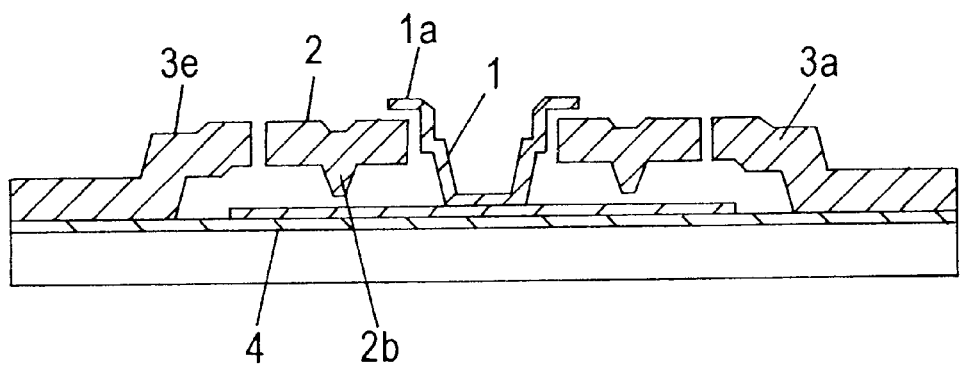
FIG. 51 is a cross-sectional illustration to show the structure of the electrostatic micro wobble motor of the first prior art example.
Figure 52:
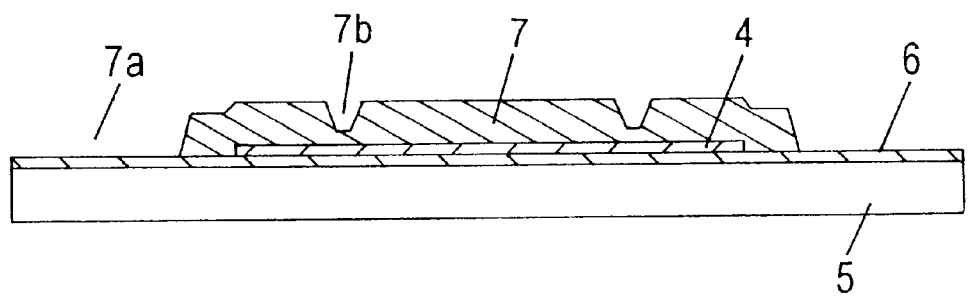
FIG. 52 through FIG. 56 are cross-sectional illustrations to explain the fabrication processes for the electrostatic micro wobble motor of the first prior art example.
Figure 53:
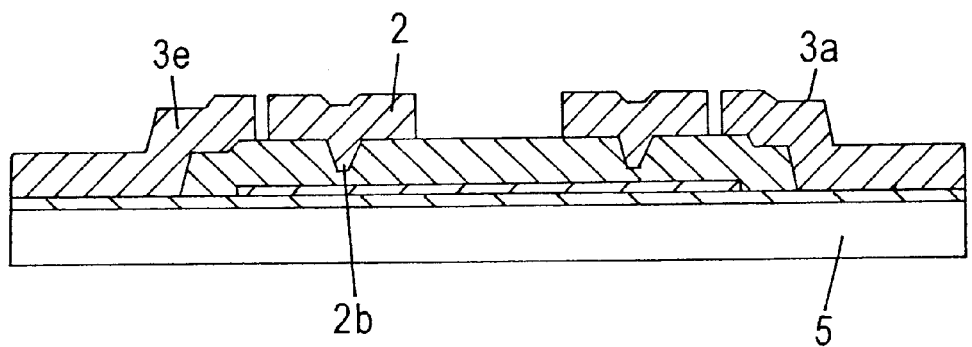
Figure 54:
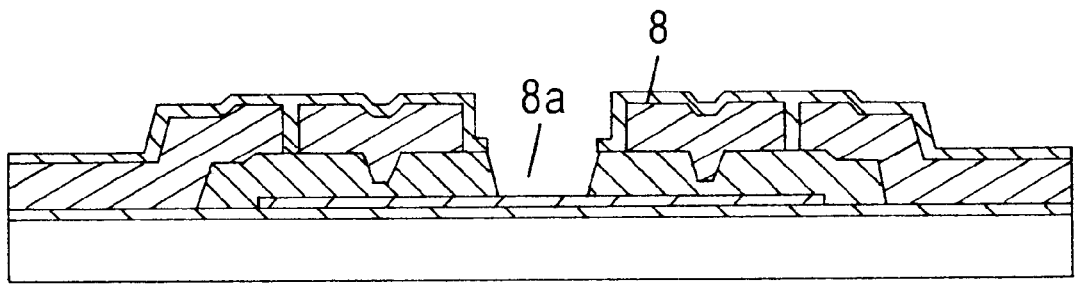
Figure 55:
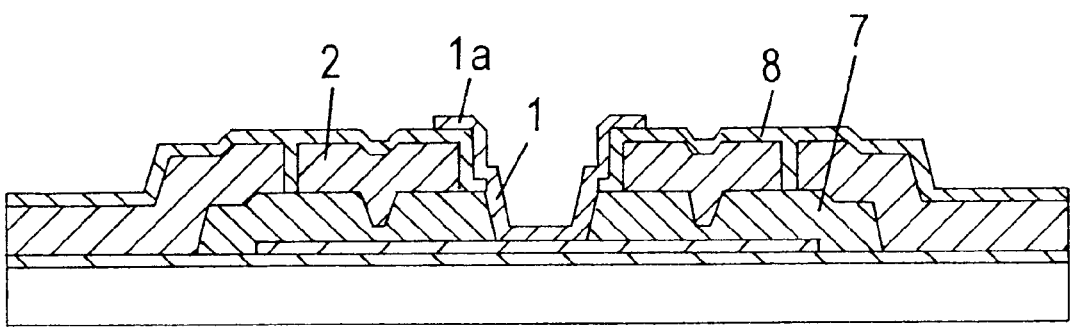
Figure 56:
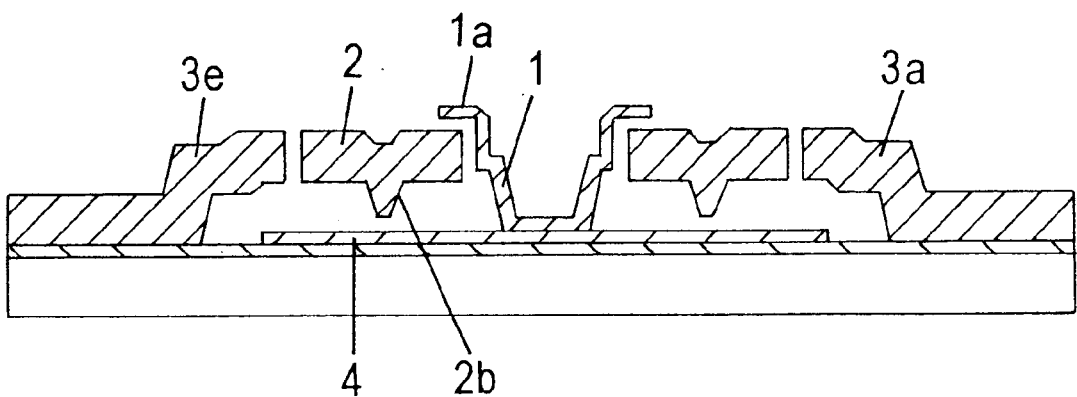
Figure 57:
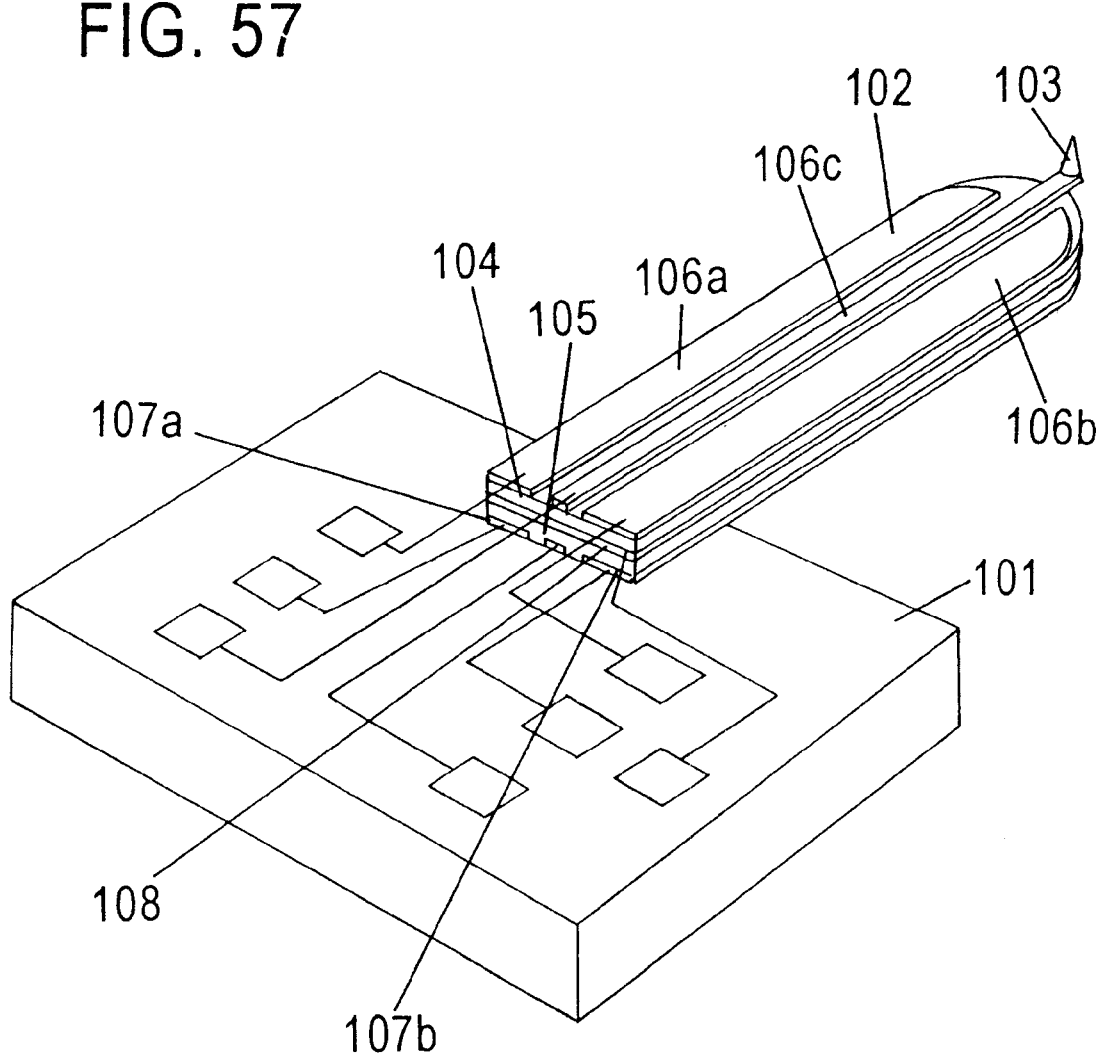
FIG. 57 is an illustration to show the structure of a thin film probe as a second prior art example.
Figure 58:
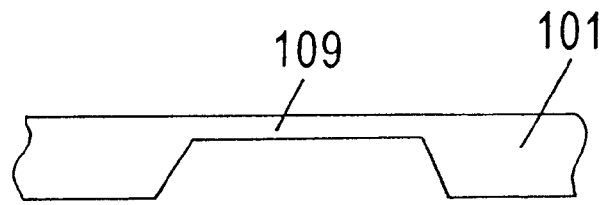
FIG. 58 through 62 are cross-sectional illustrations to explain the fabrication processes for the thin film probe of the second prior art example.
Figure 59:
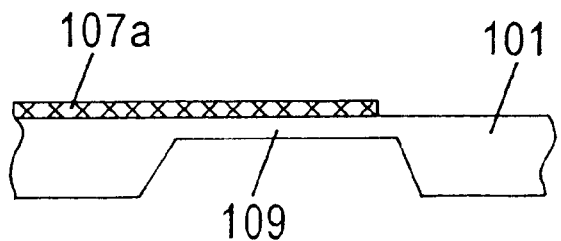
Figure 60:
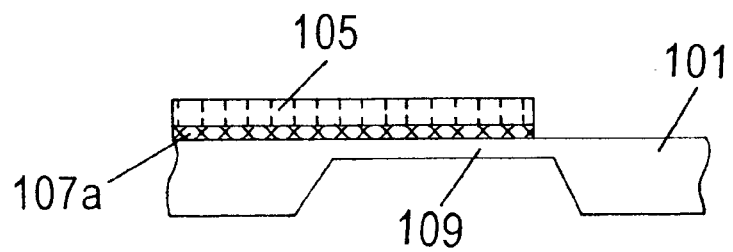
Figure 61:
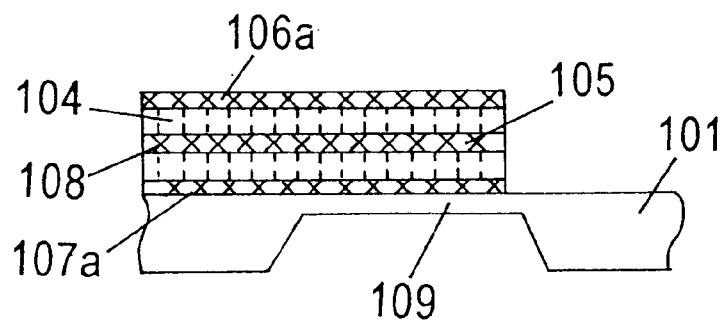
Figure 62:
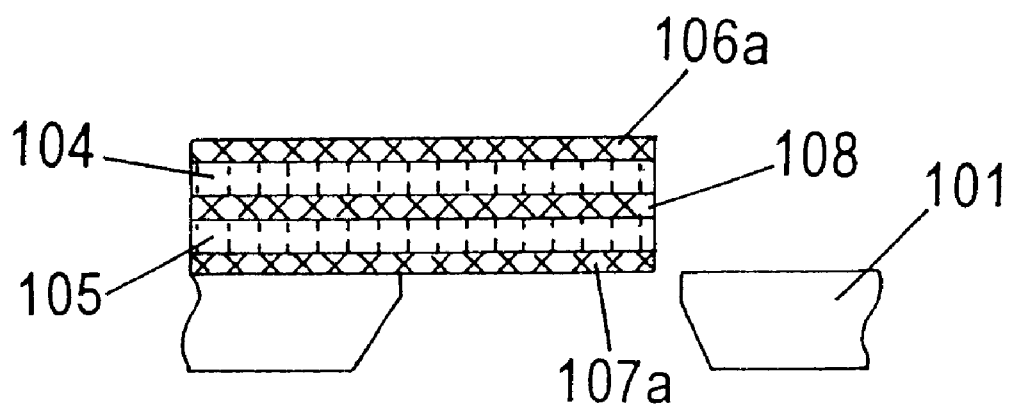
Figure 63:
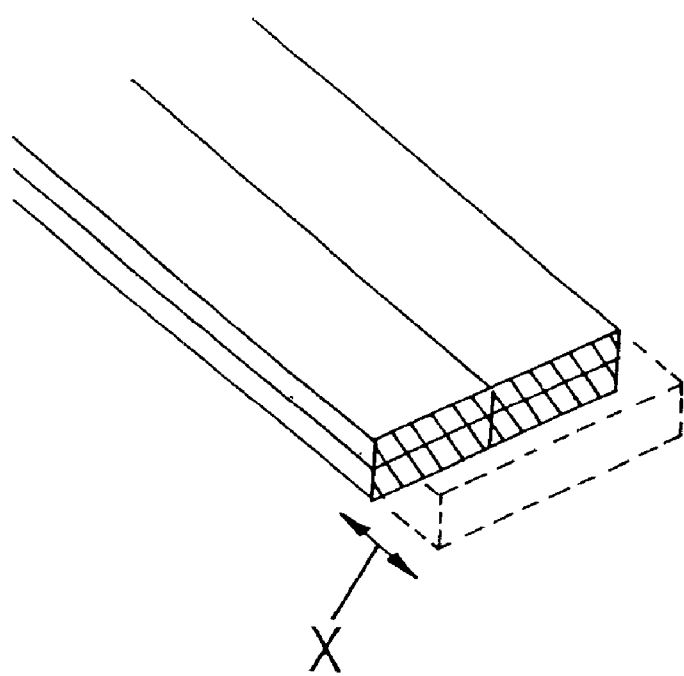
FIG. 63 through FIG. 66 are illustrations to explain the operation of the thin film probe of the second prior art example.
Figure 64:
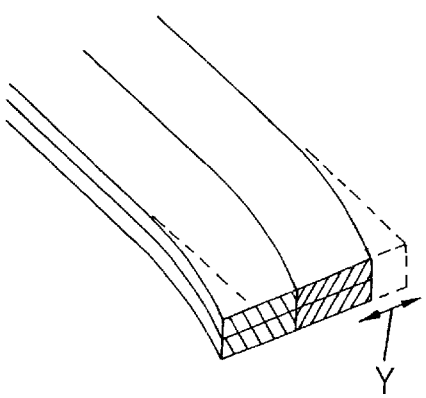
Figure 65:
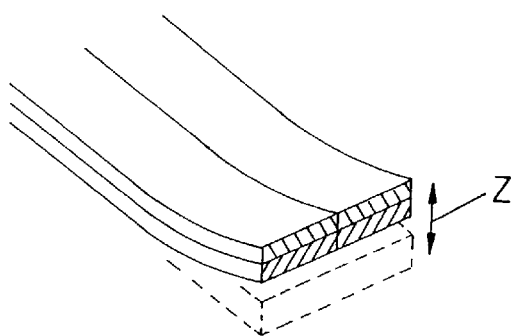
Figure 66:
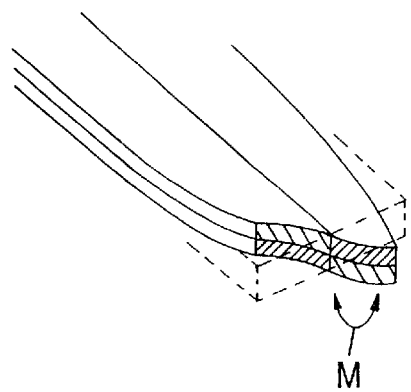

Also, access to 132 tracks within each sector is performed by applying a specified voltage to each respective electrode of the arm member 212 of the pickup head 240c and having the thin film piezo elements 217 and 218 deformed freely to move the probing needle 236 slightly. At this time, the movement pitch of the probing needle 236 is 75 nm, which is the same as the width of the track, and the movement range is ±5 μm. In addition, in case where the probing needle 236 is to be moved in the direction perpendicular to the disc surface 202a, the arm member 212 of the pickup head 240c should be deformed piezoelectrically as illustrated in FIG. 49.

The foregoing is summarized as follows: By selecting the pickup head 240c electrically from a plurality of pickup heads placed in order, access to the cylinder 250m is first performed. Next, access of the probing needle 236 to the sector 252a is achieved through a coarse electrostatic wobble movement of the ring member 211 of the pickup head 240c.

Further, access to each respective track is conducted by having the arm member 212 of the pickup head 240c finely moved by means of the piezoelectric bimorphs. Accordingly, each respective pickup head can put its probing needle 236 at an arbitrary position on the disc 202 accurately for recording or reproducing upon application of bias voltages.

Besides, use of the so called Zone-CAV system, whereby the angular velocity is kept constant for each sector, as the method of rotating the disc 202 makes it possible to achieve recording of higher density.

Thus, according to the present invention, all the component elements from pickup head to disc can be fabricated by the semiconductor processes which excel in microminiaturization and mass-productivity, and also microactuators that are prepared in batches, not one by one through a conventional assembly work, can be provided for achieving remarkable micro-miniaturization and high performance with recording and reproducing equipment.

Also, according to the present invention, recording and reproducing equipment, whereby simultaneous recording and reproducing with extremely high accessibility is achieved on account of arrangement of a plurality of pickup heads, each mounted with a probing needle serving as a head, can be provided.

As explained in the foregoing, a first structure of the sixth exemplary embodiment of the present invention comprises:
 a disc-like rotational recording medium and a driving means thereof;
 a pickup head composed of a ring member and an arm member, which has piezo elements deposited thereupon and a probing needle mounted on the tip thereof;
 fixed electrodes arranged along the outer circumference of said ring member; and
 a driving means to have said probing needle positioned on said disc-like rotational recording medium through coarse movement of said arm member due to the rotation of said ring member caused by the electrostatic attracting force working between said fixed electrodes and said ring member upon application of voltages to said fixed electrodes and through fine movement of said arm member due to its own deformation caused by said piezo elements.

The aforementioned structure has the operational effects as follows:

According to the present invention, a position of a probing needle can be fixed on a disc-like rotational recording medium through rotational movement of a ring member and fine movement of an arm member. All the motions can be performed. by voltage application to fixed electrodes which are arranged along the outer circumference of the ring member and also by piezoelectric thin layers deposited in bimorph structure on the arm member. In addition, all the elements contributing to the above motions can be fabricated by semiconductor processes which excel in microminiaturization and mass-producibility. Besides, there is a simple probing needle as a recording and reproducing means, which changes its position just by rotational or linear movement, not by act of sliding. Therefore, a microactuator serving as a pickup head which does not require any assembly work and adjustment can be provided by the present invention.

Also, a second structure of the sixth exemplary embodiment of the present invention comprises a first substrate having a disc-like rotational recording medium and a driving means thereof, and a second substrate having pickup heads and fixed electrodes, both being put together so as to have the probing needles on said pickup heads faced to said rotational recording medium.

The above structure has the operational effects as follows:

According to the present invention, a first substrate and a second substrate, both being already equipped with the required component elements respectively, are put together for completion of equipment. Therefore, a microactuator of an entirely new fabrication method that is different from the conventional concept of assembly work can be provided by the present invention.

As explained in the foregoing, the structures according to the present invention make it possible to produce long life and excellent reliability microactuators, whereby highly accurate positioning of good repeatability can be performed and the present invention's benefit received by the industry is extremely great.

In addition, by using the microactuators in a multi-probe head of a scanning probe microscope, a plurality of movable thin film probes can be used simultaneously in observing various parts of a surface of a specimen in a diversified manner.

Furthermore, by using the microactuators, which are produced according to an entirely new fabrication method derived of the concept different from the conventional assembly work, as pickup heads of recording and reproducing equipment, it can be made possible to realize microminiaturization and high performance that have not been thought of before.

What is claimed is:

1. A microactuator characterized by comprising:
 a plurality of electrodes arranged on a substrate along a circumference;
 a ring-like displacement plate having a circular outer surface located inside said electrodes;
 beams located inside the inner circumference of said displacement plate, each of which is fixedly connected at one end with an anchor formed solidly on said substrate and at the other end with a specified place of the inner circumference of said displacement plate to support said displacement plate elastically; and
 a voltage application means for applying voltages selectively to each of said electrodes in order to have said displacement plate attracted electrostatically towards said electrodes, to which said voltages have been applied, and rotationally moved.

2. A microactuator according to claim 1, wherein the beams are in a plurality and identical with one another in configuration and also located at positions which are symmetric with respect to the center of the circumference laid out by the electrodes.

3. A microactuator according to claim 1, wherein the beams are spiral.

4. A microactuator according to claim 1, wherein an insulating layer is formed either on the outer circumference of the displacement plate or on the inner circumference of the electrodes, and through this insulating layer said displacement plate comes into contact with said electrodes.

5. A microactuator according to claim 1, wherein a shield layer having a configuration almost identical with that of said displacement plate is formed on the substrate at a place opposite to the displacement plate.

6. A microactuator according to claim 1, wherein the voltage application means comprises a power supply and a drive control circuit, whereby the voltages to be applied to the electrodes are controlled, and at least said drive control circuit is formed on the same substrate as said electrodes have been formed.

7. A microactuator characterized by having a unit which has put together:
- a plurality of electrodes arranged on a substrate along a circumference;
- a ring-like displacement plate having a circular outer surface located inside said electrodes;
- beams located inside the inner circumference of said displacement plate, each of which is fixedly connected at one end with an anchor formed solidly on said substrate and at the other end with a specified place of the inner circumference of said displacement plate to support said displacement plate elastically;
- a drive control circuit for controlling voltages to be applied to said electrodes;
- a signal detector for converting signals from outside to electrical signals; and
- a signal processing circuit for processing said electrical signals and transmitting control signals to said drive control circuit.

8. A microactuator characterized by having a plurality of the unit as cited in claim 7 formed on a single substrate.

* * * * *